US012795229B2

(12) United States Patent
Zhang et al.

(10) Patent No.: US 12,795,229 B2
(45) Date of Patent: Nov. 10, 2026

(54) VIDEO RECORDING METHOD AND ELECTRONIC DEVICE

(71) Applicant: Huawei Technologies Co., Ltd., Shenzhen (CN)

(72) Inventors: Haochen Zhang, Shenzhen (CN); Yanhui Yu, Shenzhen (CN); Qingliang Wu, Saint Petersburg (RU); Zhetao Zhang, Shenzhen (CN); Xin Zheng, Shanghai (CN); Fan Yang, Shenzhen (CN); Qiuming Peng, Shenzhen (CN); Li Cheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 613 days.

(21) Appl. No.: 18/259,230

(22) PCT Filed: Dec. 23, 2021

(86) PCT No.: PCT/CN2021/140845

§ 371 (c)(1),
(2) Date: Jun. 23, 2023

(87) PCT Pub. No.: WO2022/135527

PCT Pub. Date: Jun. 30, 2022

(65) Prior Publication Data

US 2024/0056676 A1 Feb. 15, 2024

(30) Foreign Application Priority Data

Dec. 25, 2020 (CN) ......................... 202011565521.3
Dec. 28, 2020 (CN) ......................... 202011581873.8
(Continued)

(51) Int. Cl.
*H04N 23/63* (2023.01)
*H04M 1/72442* (2021.01)

(52) U.S. Cl.
CPC ...... *H04N 23/632* (2023.01); *H04M 1/72442* (2021.01)

(58) Field of Classification Search
CPC ........... H04N 21/44016; H04N 23/631; H04N 9/8211; H04N 5/772; H04N 23/632; H04M 2250/52; H04M 1/72442
See application file for complete search history.

(56) References Cited

U.S. PATENT DOCUMENTS

2015/0318020 A1* 11/2015 Pribula ............. H04N 21/2743 386/290
2020/0186728 A1* 6/2020 Pena .................. G06F 3/04847
(Continued)

FOREIGN PATENT DOCUMENTS

CN 105959773 A 9/2016
CN 106131475 A 11/2016
CN 107959873 A 4/2018

*Primary Examiner* — Xi Wang
(74) *Attorney, Agent, or Firm* — Slater Matsil, LLP

(57) ABSTRACT

An electronic device plays, by using a first application, audio corresponding to a first media file, and displays a video recording interface of a second application; in response to an operation on a background music setting option, the electronic device sets background music as audio corresponding to a second audio file; in response to a first operation on a virtual button, the electronic device starts video recording, and processes the second audio file to obtain audio data of the second audio file; and in response to a second operation on the virtual button, the electronic device ends video recording, and generates a video file, where the video file includes the audio data of the second audio file and image data of an image captured by a camera, but does not include audio data of the first media file.

20 Claims, 49 Drawing Sheets

(30) Foreign Application Priority Data

| | | |
|---|---|---|
| Dec. 30, 2020 | (CN) | 202011601905.6 |
| Dec. 30, 2020 | (CN) | 202011604343.0 |
| Dec. 31, 2020 | (CN) | 202011626278.1 |
| Dec. 31, 2020 | (CN) | 202011628665.9 |
| Apr. 16, 2021 | (CN) | 202110411509.5 |

(56) References Cited

U.S. PATENT DOCUMENTS

| | | | | |
|---|---|---|---|---|
| 2020/0410967 | A1* | 12/2020 | Jiang | G10H 1/0025 |
| 2022/0093132 | A1* | 3/2022 | Ge | G11B 27/031 |

* cited by examiner

CONT. FROM FIG. 11A

CONT.
FROM
FIG. 16A
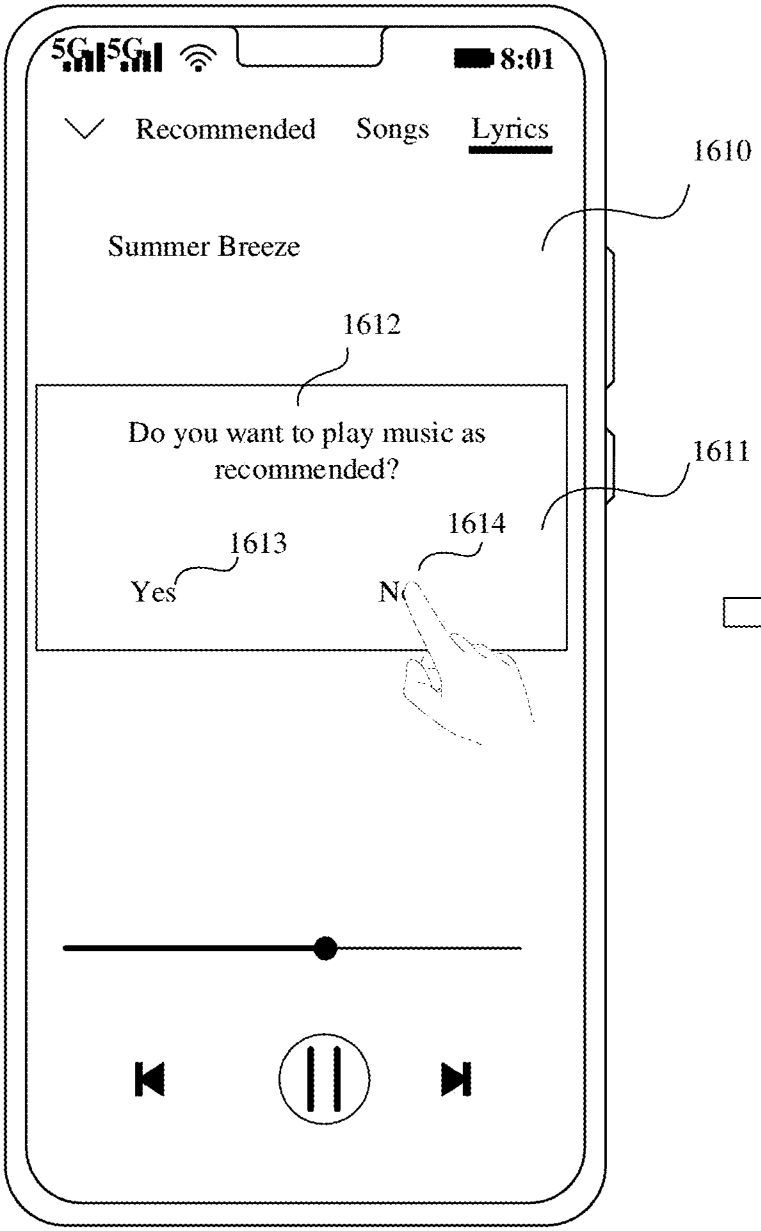
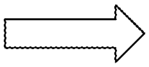
TO
FIG. 16C
FIG. 16B

CONT. FROM FIG. 16B

CONT.FROM

TO FIG.
26A-3

CONT.FROM

TO FIG.
26A-4

CONT.FROM

CONT.FROM

VIDEO RECORDING METHOD AND ELECTRONIC DEVICE

CROSS-REFERENCE TO RELATED APPLICATIONS

This application is a National Stage of International Application No. PCT/CN2021/140845, filed on Dec. 23, 2021, which claims priority to Chinese Patent Application No. 202011565521.3, filed on Dec. 25, 2020 and Chinese Patent Application No. 202011581873.8, filed on Dec. 28, 2020 and Chinese Patent Application No. 202011601905.6, filed on Dec. 30, 2020 and Chinese Patent Application No. 202011604343.0, filed on Dec. 30, 2020 and Chinese Patent Application No. 202011626278.1, filed on Dec. 31, 2020 and Chinese Patent Application No. 202011628665.9, filed on Dec. 31, 2020 and Chinese Patent Application No. 202110411509.5, filed on Apr. 16, 2021. All of the aforementioned applications are hereby incorporated by reference in their entireties.

TECHNICAL FIELD

This application relates to the field of audio technologies, and in particular, to a video recording method and an electronic device.

BACKGROUND

As a more intuitive and vivid information carrier, a video is more widely used in people's daily life. Usually, background music may be added to the video to exaggerate the atmosphere. However, in the conventional technology, a user needs to first record a video by using an electronic device, and store the recorded video in the electronic device in a form of a video file (for example, an MP4 file or a 3GP file). Then, the user performs post-processing on the stored video file by using the electronic device, to add background music to the video. Therefore, this manner for adding the background music to the video is cumbersome.

SUMMARY

Embodiments of this application provide a video recording method and an electronic device, so that in a process of recording a video by using an application, the electronic device can automatically add background music of the application, to obtain a video file that includes the background music. This facilitates use by a user and improves user experience.

According to a first aspect, a video recording method according to an embodiment of this application specifically includes: An electronic device plays, by using a first application, audio corresponding to a first media file; the electronic device displays a video recording interface of a second application, where the video recording interface includes an image preview box, a background music setting option, and a virtual button, the virtual button is used to control to start or stop video recording, and the image preview box is used to preview an image captured by a camera; and in response to an operation on the background music setting option, the electronic device sets background music as audio corresponding to a second audio file;

in response to a first operation on the virtual button, the electronic device starts video recording, and processes the second audio file to obtain audio data of the second audio file; and in response to a second operation on the virtual button, the electronic device ends video recording, and generates a video file, where the video file includes the audio data of the second audio file and image data of the image captured by the camera, but does not include audio data of the first media file.

In this embodiment of this application, when playing, by using the first application, the audio corresponding to the first audio file, and recording a video by using the second application, the electronic device may obtain, with reference to the audio data of the audio file corresponding to the background music that is set by the user in the second application, the video file that includes the audio data of the audio file corresponding to the background music that is set by the user in the second application, where the video file does not include the audio data of the first audio file. In this way, the user can add corresponding background music in a video recording process as required. This not only facilitates use by the user, but also helps avoid a copyright dispute.

In a possible design, the first media file corresponds to an identifier of the first application, and the second audio file corresponds to an identifier of the second application. In this case, in response to the first operation on the virtual button, the electronic device obtains the audio data of the second audio file based on the identifier of the second application, and performs synthesis processing based on the audio data of the second audio file and the image data of the image captured by the camera.

In a possible design, the electronic device captures a sound by using a microphone in response to the first operation on the virtual button; and the electronic device performs synthesis processing based on the audio data of the second audio file, the image data of the image captured by the camera, and audio data of the sound captured by the microphone. In this way, the recorded video file includes audio data of a sound of the user or a surrounding environment.

In a possible design, when a shooting mute function is in an enabled mode, the electronic device does not capture a sound by using a microphone.

In a possible design, the electronic device parses the second audio file, and performs audio effect processing on audio data obtained by parsing the second audio file, to obtain the audio data of the second audio file. Therefore, audio effect processing is performed on the audio data of the second audio file included in the recorded video file. This helps improve audio-visual experience of the user.

In a possible design, the electronic device plays the audio data of the second audio file.

According to a second aspect, this application provides an audio recording method. The method is applied to an electronic device, and may include: The electronic device displays a first interaction interface of a live broadcast application, where the first interaction interface includes a recording setting option; the electronic device detects an operation performed on the recording setting option; the electronic device displays a second interaction interface in response to the operation, where the second interaction interface includes a plurality of audio stream options; the electronic device detects a trigger event, where the trigger event is an event generated by determining to choose to record an audio stream with a first type mark and an audio stream with a second type mark; and the electronic device separately records the audio stream with the first type mark and the audio stream with the second type mark in response to the trigger event, to obtain first audio recording data and second audio recording data.

According to the foregoing technical solution, a user may select, in an interface of the live broadcast application, a to-be-recorded audio stream with a type mark according to a requirement, a preference, or the like of the user, thereby improving user experience. In addition, the electronic device may separately record audio streams with a plurality of type marks, to obtain a plurality of audio recording files. In this way, it can be convenient for the user to process different audio streams, so that user experience is improved.

In a possible design, that the electronic device separately records the audio stream with the first type mark and the audio stream with the second type mark includes: The electronic device performs type marking on a first audio stream to obtain at least two type marks, where the first audio stream includes an audio stream played by an application corresponding to live content of the live broadcast application and an audio stream played by a music application; the electronic device detects the at least two type marks included in the first audio stream, and obtains the first type mark and the second type mark from the at least two type marks through screening; and the electronic device records audio streams respectively corresponding to the first type mark and the second type mark.

According to the foregoing technical solution, the electronic device may perform type marking on the first audio stream, then obtain, from a plurality of type marks through screening, a type mark selected by the user, and record an audio stream with the type mark selected by the user. Audio streams of a same type can be further divided by using a type marking method, so that the user can select more types, and user experience can be improved.

It should be understood that the first audio stream may be understood as a currently played audio stream, and may include at least the audio stream played by the application corresponding to the live content of the live broadcast application. For example, if the live broadcast application broadcasts a game, the first audio stream may include an audio stream played by a game application (for example, Arena of Valor). Certainly, if a streamer opens a music application and plays music, the first audio stream may further include an audio stream played by the music application.

In a possible design, that the electronic device performs type marking on a first audio stream includes: The electronic device performs type marking on the first audio stream based on an audio parameter of the first audio stream, where the audio parameter includes at least the following information: an audio stream type and an audio stream length.

According to the foregoing technical solution, the electronic device may perform type marking on different audio streams based on features, functions, and the like of the audio streams, so that type division of the audio streams is more detailed. For example, an audio stream of a game may be marked as a game voice communication audio stream (or referred to as a game team voice audio stream), a background sound audio stream, a spell casting audio stream, and the like.

It should be noted that, when audio stream types are the same, lengths of different audio streams may correspond to different type marks. When audio stream lengths are the same, different audio stream types may correspond to different type marks. This is not limited in this application.

In a possible design, after the electronic device obtains the first type mark and the second type mark from the at least two type marks through screening, the method further includes: The electronic device performs audio mixing processing on the first audio stream to obtain mixed audio, and plays the mixed audio.

It should be noted that in this application, after obtaining the at least two type marks of the first audio stream, an audio service (AudioService) of the electronic device may divide the audio stream into two channels for transmission, where one channel is used to record the audio stream with the first type mark and the audio stream with the second type mark, and the other audio stream is sent to an audio mixing thread (MixerThread) of the electronic device for audio mixing.

According to the foregoing technical solution, the electronic device may perform audio mixing processing on the audio stream after obtaining a required audio stream type mark through screening. In other words, before audio mixing processing, the electronic device may perform recording for the audio stream type mark selected by the user. In this way, recorded audio data is independent audio data, instead of mixed audio data.

According to a third aspect, this application further provides an audio recording method. The method includes: An electronic device displays a first interaction interface of a live broadcast application, where the first interaction interface includes a recording setting option; the electronic device detects at least one operation performed on the recording setting option; and the electronic device records an audio stream based on specified audio type marks in response to the at least one operation, where the specified audio type marks include a first type mark and a second type mark.

According to the foregoing technical solution, the electronic device may automatically record the audio stream based on the specified audio type marks. The specified audio type mark may be an audio type mark specified by a user last time, an audio type mark configured by a live broadcast application, or the like.

For example, the user may double-tap the recording setting option in the first interaction interface, and then the electronic device may automatically record a corresponding audio stream based on the audio type mark configured by the live broadcast application. Alternatively, the user may first tap the recording setting option in the first interaction interface, and then the second interaction interface is displayed. In this case, the user taps a confirmation option, and the electronic device may record a corresponding audio stream based on the audio type mark specified by the user last time.

In a possible design, that the electronic device records an audio stream based on specified audio type marks includes: The electronic device performs type marking on a first audio stream to obtain at least two type marks, where the first audio stream includes an audio stream played by an application corresponding to live content of the live broadcast application and an audio stream played by a music application; the electronic device detects the at least two type marks included in the first audio stream, and obtains the first type mark and the second type mark from the at least two type marks through screening; and the electronic device records audio streams respectively corresponding to the first type mark and the second type mark.

According to the foregoing technical solution, the electronic device may perform type marking on the first audio stream, then obtain, from a plurality of type marks through screening, a specified type mark, and record an audio stream with the specified type mark. Audio streams of a same type can be further divided by using a type marking method, so that the user can select more types, and user experience can be improved.

According to a fourth aspect, this application further provides an audio playing method. The method includes: An electronic device plays first audio by using a first application; the electronic device switches, in response to a first operation performed by a user on the first application, the first application to a background for running; in response to a second operation performed by the user on a second application, the electronic device runs the second application in a foreground, and plays second audio by using the second application; the electronic device determines a play policy of the first audio and the second audio; and the electronic device plays the first audio and the second audio according to the play policy. It should be understood that the first application and the second application are installed on the electronic device; or at least one of the first application and the second application is installed on the electronic device, and the other application is an online application accessed by using a network; or both the first application and the second application are online applications, and the electronic device accesses the two applications by using a network.

According to the foregoing technical solution, when all applications running in the foreground and the background are sound-producing applications, a corresponding audio play policy may be provided for audio played in the foreground and background, so that the electronic device can play the audio according to the audio play policy. This avoids noise and chaos when a plurality of sound-producing applications are opened at the same time, and improves user experience.

In a possible implementation, that the electronic device determines a play policy of the first audio and the second audio includes: The electronic device classifies the first audio and the second audio, and determines categories respectively corresponding to the first audio and the second audio; and the electronic device determines the play policy of the first audio and the second audio based on the categories respectively corresponding to the first audio and the second audio.

According to the foregoing technical solution, audio played by foreground and background applications may be separately classified, and then an audio play policy is determined according to a classified category. In this way, a corresponding play policy can be provided according to a specific category, so that a case of sound chaos is avoided when the electronic device simultaneously plays a plurality of pieces of audio. Therefore, user experience can be improved.

In a possible implementation, that the electronic device classifies the first audio and the second audio includes: The electronic device separately obtains an audio attribute of the first audio and an audio attribute of the second audio; and the electronic device separately determines, based on a first mapping relationship, a category corresponding to the audio attribute of the first audio and an audio category corresponding to the audio attribute of the second audio, where the first mapping relationship is a correspondence between an audio attribute and an audio category.

According to the foregoing technical solution, an audio category may be determined according to an audio attribute of audio, so that specific classification can be performed on the audio. In this way, a subsequent play policy is more appropriate.

In a possible implementation, that the electronic device determines a play policy of the first audio and the second audio includes: The electronic device determines, based on a second mapping relationship, an audio play policy corresponding to the first audio and the second audio in a same category or different categories, where the second mapping relationship includes a correspondence between an audio play policy and both a category of the first audio and a category of the second audio.

According to the foregoing technical solution, the electronic device may provide, according to a pre-stored mapping relationship (a correspondence between an audio category and a play policy), a play policy corresponding to an audio category for audio played by foreground and background applications, thereby improving user experience when the electronic device simultaneously plays a plurality of pieces of audio.

In a possible implementation, the audio categories of the first audio and the second audio each include any one of the following categories: voice call, alarm, voice navigation, media tone, game, movie, music, dial tone, incoming call ringtone, operation/event tone, notification tone, and other.

It should be noted that in this embodiment of this application, categories classified based on audio attributes are more specific. In this way, an appropriate play policy can be provided based on a specific scenario, thereby improving user experience.

In a possible implementation, the play policy of the first audio and the second audio includes any one of the following policies: playing the first audio, playing the second audio, or simultaneously playing the first audio and the second audio.

It should be noted that the play policy provided by the electronic device in this embodiment of this application may include but is not limited to the foregoing several policies.

In a possible implementation, the method further includes: When the first audio is of a first category and the second audio is of a second category, the electronic device determines that the first audio is of a third category, where the third category is a subset of the first category.

According to the foregoing technical solution, if a category of audio is a specific category (for example, music), more specific classification may be performed for the category of the audio, so that a scenario after the classification is more specific, and a play policy is more appropriate. This improves user experience.

In a possible implementation, the method further includes: displaying first prompt information, where the first prompt information is used to prompt the user whether to play the first audio and the second audio according to the play policy. According to the foregoing technical solution, a user can select a play policy according to a preference, a requirement, or the like of the user, thereby improving user experience.

According to a fifth aspect, this application further provides an audio effect processing method, applied to a first electronic device connected to a second electronic device. The method includes:

the first electronic device displays an interface of a media application, where the interface of the media application includes an identifier of a to-be-played audio file, a first control, and a second control, the first control is used to control audio playing, and the second control is used to control playing of the to-be-played audio file on the second electronic device;

when the second control is selected, the first electronic device parses the to-be-played audio file in response to an operation on the first control, to obtain first audio data;

the first electronic device performs audio effect processing on the first audio data based on first audio effect configuration information, to obtain second audio data; and performs audio effect processing on the first audio data based on second audio effect configuration information, to obtain third audio data;

the first electronic device sends the third audio data to the second electronic device, and triggers the second electronic device to play the third audio data; and the first electronic device plays the second audio data after first duration starting from a moment of sending the third audio data to the second electronic device, where the first duration is a time period required for sending the third audio data from the first electronic device to the second electronic device for playing.

The first audio configuration information indicates a first audio effect algorithm, a first audio effect mode, a first equalizer setting, a first gain setting, and a first audio effect parameter; the second audio configuration information indicates the first audio effect algorithm, the first audio effect mode, the first equalizer setting, the first gain setting, and a second audio effect parameter; the first audio effect parameter is an audio effect parameter used by the first electronic device in the first audio effect algorithm with respect to the first audio effect mode, the first equalizer setting, and the first gain setting; and the second audio effect parameter is an audio effect parameter used by the second electronic device in the first audio effect algorithm with respect to the first audio effect mode, the first equalizer setting, and the first gain setting.

In this embodiment of this application, the first electronic device may perform, based on the first audio effect configuration information, audio effect processing on the first audio data obtained by parsing the to-be-played audio file, to obtain the second audio data, and perform audio effect processing on the first audio data based on the second audio effect configuration information, to obtain the third audio data, so that the first electronic device can play the second audio data after the first duration starting from the moment of sending the third audio data to the second electronic device. This helps reduce a difference between play effect on the first electronic device for the to-be-played audio file and play effect on the second electronic device for the to-be-played audio file when the first electronic device and the second electronic device synchronously play the to-be-played audio file, thereby improving user experience.

In a possible design, the first electronic device is in an audio effect enabled state. When the first electronic device is in the audio effect enabled state, the first electronic device performs an audio effect processing process. This helps simplify an implementation.

In a possible design, the first electronic device sends an audio effect disabling message or instruction to the second electronic device when the second electronic device is in an audio effect enabled state. This helps prevent the second electronic device from performing repeated audio effect processing on the third audio data from the first electronic device.

In a possible design, the first electronic device sends the first audio data and an audio effect disabling message or instruction to the second electronic device when the first electronic device is in an audio effect disabled state, to trigger the second electronic device to disable an audio effect and play the first audio data; and the first electronic device plays the first audio data after the first duration starting from a moment of sending the first audio data to the second electronic device, where the first duration is a time period required for sending the first audio data from the first electronic device to the second electronic device for playing. This not only helps keep consistent audio play effect of the first electronic device and the second electronic device, but also helps prevent the second electronic device from performing audio effect processing on the first audio data from the first electronic device.

In a possible design, the first audio effect configuration information is audio effect configuration information currently used by the first electronic device, or the second audio effect configuration information is audio effect configuration information currently used by the second electronic device.

According to a sixth aspect, this application further provides an audio effect processing method, applied to a first electronic device connected to a second electronic device. The method specifically includes: The first electronic device displays an interface of a media application, where the interface of the media application includes an identifier of a to-be-played audio file, a first control, and a second control, the first control is used to control audio playing, and the second control is used to control playing of the to-be-played audio file on the second electronic device;

when the second control is selected, the first electronic device parses the to-be-played audio file in response to an operation on the first control, to obtain first audio data;

the first electronic device performs audio effect processing on the first audio data based on first audio effect configuration information, to obtain second audio data;

the first electronic device performs audio effect processing on the first audio data based on second audio effect configuration information, to obtain third audio data;

the first electronic device sends the third audio data and play time information to the second electronic device, and triggers the second electronic device to play the third audio data based on the play time information; and the first electronic device plays the second audio data based on the play time information.

The play time information indicates a play start time point; the first audio configuration information indicates a first audio effect algorithm, a first audio effect mode, a first equalizer setting, a first gain setting, and a first audio effect parameter; the second audio configuration information indicates the first audio effect algorithm, the first audio effect mode, the first equalizer setting, the first gain setting, and a second audio effect parameter; the first audio effect parameter is an audio effect parameter used by the first electronic device in the first audio effect algorithm with respect to the first audio effect mode, the first equalizer setting, and the first gain setting; and the second audio effect parameter is an audio effect parameter used by the second electronic device in the first audio effect algorithm with respect to the first audio effect mode, the first equalizer setting, and the first gain setting.

In this embodiment of this application, the first electronic device may perform, based on the first audio effect configuration information, audio effect processing on the first audio data obtained by parsing the to-be-played audio file, to obtain the second audio data, and perform audio effect processing on the first audio data based on the second audio effect configuration information, to obtain the third audio data. In addition, the first electronic device plays the second audio data based on the play time information, and the second electronic device plays the third audio data based on the same play time information. This helps reduce a difference between play effect on the first electronic device for the to-be-played audio file and play effect on the second electronic device for the to-be-played audio file when the first electronic device and the second electronic device synchronously play the to-be-played audio file, thereby improving user experience.

In a possible design, the first audio effect configuration information is audio effect configuration information currently used by the first electronic device, or the second audio effect configuration information is audio effect configuration information currently used by the second electronic device.

According to a seventh aspect, this application provides a volume adjustment method. The method is applied to a first device and may include: The first device plays first audio; the first device switches, in response to a first operation of a user, the first audio to a second device for playing; and the first device sends volume adjustment information to the second device in response to a second operation of the user, so that the second device adjusts volume to a second volume level based on the volume adjustment information, where the volume adjustment information includes a first volume level, the first volume level is a volume level corresponding to the first audio on the first device, and the second volume level is a volume level corresponding to the first audio on the second device.

According to the foregoing technical solution, the first device may switch audio to the second device, and when volume adjustment is performed on the audio on the first device, the volume adjustment information may be sent to the second device, so that the second device can perform volume adjustment based on the volume adjustment information.

In a possible design, before the first device sends the volume adjustment information to the second device in response to the second operation of the user, the method further includes: The first device obtains a third volume level of the second device; and the first device determines a fourth volume level corresponding to the third volume level, where the first volume level is a volume level obtained through adjustment based on the fourth volume level, and the second volume level is a volume level obtained through adjustment based on the third volume level.

According to the foregoing technical solution, before adjusting the volume, the first device may perform initial volume conversion on the volume level on the first device based on the volume level on the second device, to subsequently perform volume adjustment based on the volume level.

In a possible design, the method further includes: The first device determines to adjust the volume of the second device based on absolute volume. According to the foregoing technical solution, when adjusting the volume of the audio played on the second device, the first device may perform processing based on the absolute volume.

According to an eighth aspect, this application further provides a volume adjustment method. The method includes: A second device receives volume adjustment information sent by a first device, where the volume adjustment information includes a first volume level, and the first volume level is a volume level corresponding to first audio on the first device; the second device determines, based on a volume level mapping relationship, a second volume level corresponding to the first volume level, where the second volume level is a volume level corresponding to the first audio on the second device, and the volume level mapping relationship is a volume level conversion relationship between the first device and the second device at same volume; and the second device adjusts volume based on the second volume level.

According to the foregoing technical solution, after receiving the volume adjustment information sent by the first device, the second device may determine, according to a pre-stored volume level mapping relationship, a volume level corresponding to a volume level included in the volume adjustment information. In this way, the first device and the second device implement collaborative volume adjustment when adjusting the volume, and volume of the two devices can be consistent.

In a possible design, before the second device receives the volume adjustment information sent by the first device, the method further includes: The second device sends a third volume level to the first device, where the third volume level is a volume level used by the second device before the second device adjusts the volume to the second volume level.

According to the foregoing technical solution, a volume level may be sent to the first device before the volume is adjusted, so that the first device performs initial volume conversion on the volume, to subsequently perform volume adjustment based on this.

In a possible design, the method further includes: The second device plays the first audio based on absolute volume corresponding to the second volume level.

In a possible design, the volume adjustment information further includes an audio type of the first audio; and the method further includes: The second device determines, based on the audio type of the first audio, a volume level mapping relationship corresponding to the audio type of the first audio.

According to the foregoing technical solution, different audio types may be corresponding to one volume level mapping relationship. Therefore, when determining a volume level, the second device may first determine a volume level mapping relationship corresponding to an audio type, and then determine a volume level corresponding to a volume level on the first device.

According to a ninth aspect, this application further provides an audio and vibration synchronized playing method, applied to a scenario in which a first electronic device is connected to a second electronic device, and specifically including: The first electronic device receives a first trigger event, where the first trigger event is used to trigger playing of an audio and vibration file, and the audio and vibration file includes audio data and vibration data; the first electronic device parses the audio and vibration file in response to the first trigger event, to obtain the audio data and the vibration data; and the first electronic device sends the audio data and the vibration data to the second electronic device.

In this embodiment of this application, after receiving the first trigger event, the first electronic device may parse the audio and vibration file in response to the first trigger event, and send the audio data and the vibration data that are obtained through parsing to the second electronic device, so that the second electronic device does not need to parse an audio file, but directly plays the audio data and the vibration data. Therefore, the second electronic device may not have an audio and vibration file parsing capability.

In a possible design, the first electronic device plays the audio data and the vibration data in a first synchronous playing manner when an audio device capability of the first electronic device indicates that an audio hardware abstraction layer supports audio data and vibration data distribution, where when playing is performed in the first synchronous playing manner, the audio data is distributed by the audio hardware abstraction layer of the first electronic device to a speaker of the first electronic device, and the vibration data is distributed by the audio hardware abstraction layer of the first electronic device to a motor of the first electronic device. This helps implement synchronous playing of a sound and vibration.

In a possible design, the first electronic device plays the audio data and the vibration data in a second synchronous playing manner when an audio device capability of the first electronic device indicates that an audio hardware abstraction layer does not support vibration data distribution, where when playing is performed in the second synchronous playing manner, the audio data is distributed by the audio hardware abstraction layer of the first electronic device to a speaker of the first electronic device, and the vibration data is distributed by a vibrator hardware abstraction layer of the first electronic device to a motor of the first electronic device; and a difference between a moment at which the vibrator hardware abstraction layer distributes the vibration data and a moment at which the audio hardware abstraction layer distributes the audio data is a difference between a first transmission delay and a second transmission delay, the first transmission delay is duration in which the audio data arrives at the speaker from the audio hardware abstraction layer, and the second transmission delay is duration in which the vibration data arrives at the motor from the vibrator hardware abstraction layer.

According to the foregoing technical solution, the difference between the moment at which the vibrator hardware abstraction layer distributes the vibration data and the moment at which the audio hardware abstraction layer distributes the audio data is the difference between the first transmission delay and the second transmission delay. Therefore, when the audio device capability of the first electronic device indicates that the audio hardware abstraction layer does not support vibration data distribution, synchronous playing of a sound and vibration may be implemented in the second synchronous playing manner.

In a possible design, the connection between the first electronic device and the second electronic device may be implemented in the following manner:

- the first electronic device is connected to the second electronic device through Wi-Fi or Bluetooth, or the first electronic device is bound to the second electronic device by using an application.

According to a tenth aspect, this application further provides an audio and vibration synchronized playing method, applied to a scenario in which a first electronic device is connected to a second electronic device, and specifically including:

- the second electronic device receives audio data and vibration data that are sent by the first electronic device; and the second electronic device plays the audio data and the vibration data in a first synchronous playing manner when an audio device capability of the second electronic device indicates that an audio hardware abstraction layer supports audio data and vibration data distribution, where when playing is performed in the first synchronous playing manner, the audio data is distributed by the audio hardware abstraction layer of the second electronic device to a speaker of the second electronic device, and the vibration data is distributed by the audio hardware abstraction layer of the second electronic device to a motor of the second electronic device.

In this embodiment of this application, when receiving the audio data and the vibration data from the first electronic device, the second electronic device may play the audio data and the vibration data in a corresponding synchronous playing manner with reference to the audio device capability of the second electronic device, so that the second electronic device does not need to parse an audio file. Synchronous playing of the audio data and the vibration data is implemented. Therefore, the second electronic device may not have an audio and vibration file parsing capability.

In a possible design, the second electronic device plays the audio data and the vibration data in a second synchronous playing manner when the audio device capability of the second electronic device indicates that the audio hardware abstraction layer does not support vibration data distribution, where when playing is performed in the second synchronous playing manner, the audio data is distributed by the audio hardware abstraction layer of the second electronic device to the speaker of the second electronic device, and the vibration data is distributed by a vibrator hardware abstraction layer of the second electronic device to the motor of the second electronic device; and a difference between a moment at which the vibrator hardware abstraction layer distributes the vibration data and a moment at which the audio hardware abstraction layer distributes the audio data is a difference between a first transmission delay and a second transmission delay, the first transmission delay is duration in which the audio data arrives at the speaker from the audio hardware abstraction layer, and the second transmission delay is duration in which the vibration data arrives at the motor from the vibrator hardware abstraction layer.

According to the foregoing technical solution, the difference between the moment at which the vibrator hardware abstraction layer distributes the vibration data and the moment at which the audio hardware abstraction layer distributes the audio data is the difference between the first transmission delay and the second transmission delay. Therefore, when the audio device capability of the first electronic device indicates that the audio hardware abstraction layer does not support vibration data distribution, synchronous playing of a sound and vibration may be implemented in the second synchronous playing manner.

In a possible design, the connection between the first electronic device and the second electronic device may be implemented in the following manner:

- the first electronic device is connected to the second electronic device through Wi-Fi or Bluetooth, or the first electronic device is bound to the second electronic device by using an application.

According to an eleventh aspect, an electronic device is provided. The electronic device includes modules/units for performing the method in any one of the first aspect or the possible designs of the first aspect. The modules/units may be implemented by hardware, or may be implemented by hardware executing corresponding software.

According to a twelfth aspect, an electronic device is provided. The electronic device includes modules/units for performing the method in any one of the second aspect and the third aspect or the possible designs of the second aspect and the third aspect. The modules/units may be implemented by hardware, or may be implemented by hardware executing corresponding software.

According to a thirteenth aspect, an electronic device is provided. The electronic device includes modules/units for performing the method in any one of the fourth aspect or the possible designs of the fourth aspect. The modules/units may be implemented by hardware, or may be implemented by hardware executing corresponding software.

According to a fourteenth aspect, an electronic device is provided. The electronic device includes modules/units for performing the method in any one of the fifth aspect and the sixth aspect or the possible designs of the fifth aspect and the sixth aspect. The modules/units may be implemented by hardware, or may be implemented by hardware executing corresponding software.

According to a fifteenth aspect, an electronic device is provided. The electronic device includes modules/units for performing the method in any one of the seventh aspect or the possible designs of the seventh aspect. The modules/units may be implemented by hardware, or may be implemented by hardware executing corresponding software.

According to a sixteenth aspect, an electronic device is provided. The electronic device includes modules/units for performing the method in any one of the eighth aspect or the possible designs of the eighth aspect. The modules/units may be implemented by hardware, or may be implemented by hardware executing corresponding software.

According to a seventeenth aspect, an electronic device is provided. The electronic device includes modules/units for performing the method in any one of the ninth aspect or the possible designs of the ninth aspect. The modules/units may be implemented by hardware, or may be implemented by hardware executing corresponding software.

According to an eighteenth aspect, an electronic device is provided. The electronic device includes modules/units for performing the method in any one of the tenth aspect or the possible designs of the tenth aspect. The modules/units may be implemented by hardware, or may be implemented by hardware executing corresponding software.

According to a nineteenth aspect, an electronic device is provided. The electronic device includes a memory, a processor, and a computer program, the computer program is stored in the memory, and when the computer program is executed, the electronic device is enabled to perform the technical solution in any one of the first aspect and the possible designs of the first aspect.

According to a twentieth aspect, an electronic device is provided. The electronic device includes a memory, a processor, and a computer program, the computer program is stored in the memory, and when the computer program is executed, the electronic device is enabled to perform the technical solution in any one of the second aspect and the third aspect and the possible designs of the second aspect and the third aspect.

According to a twenty-first aspect, an electronic device is provided. The electronic device includes a memory, a processor, and a computer program, the computer program is stored in the memory, and when the computer program is executed, the electronic device is enabled to perform the technical solution in any one of the fourth aspect and the possible designs of the fourth aspect.

According to a twenty-second aspect, an electronic device is provided. The electronic device includes a memory, a processor, and a computer program, the computer program is stored in the memory, and when the computer program is executed, the electronic device is enabled to perform the technical solution in any one of the fifth aspect and the sixth aspect and the possible designs of the fifth aspect and the sixth aspect.

According to a twenty-third aspect, an electronic device is provided. The electronic device includes a memory, a processor, and a computer program, the computer program is stored in the memory, and when the computer program is executed, the electronic device is enabled to perform the technical solution in any one of the seventh aspect and the possible designs of the seventh aspect.

According to a twenty-fourth aspect, an electronic device is provided. The electronic device includes a memory, a processor, and a computer program, the computer program is stored in the memory, and when the computer program is executed, the electronic device is enabled to perform the technical solution in any one of the eighth aspect and the possible designs of the eighth aspect.

According to a twenty-fifth aspect, an electronic device is provided. The electronic device includes a memory, a processor, and a computer program, the computer program is stored in the memory, and when the computer program is executed, the electronic device is enabled to perform the technical solution in any one of the ninth aspect and the possible designs of the ninth aspect.

According to a twenty-sixth aspect, an electronic device is provided. The electronic device includes a memory, a processor, and a computer program, the computer program is stored in the memory, and when the computer program is executed, the electronic device is enabled to perform the technical solution in any one of the tenth aspect and the possible designs of the tenth aspect.

According to a twenty-seventh aspect, an apparatus is provided. The apparatus includes a memory, a processor, and a computer program, the computer program is stored in the memory, and when the computer program is executed, the apparatus is enabled to perform the technical solution in any one of the first aspect and the possible designs of the first aspect. It should be understood that the apparatus includes a chip system, an integrated circuit, a chip, or the like.

According to a twenty-eighth aspect, an apparatus is provided. The apparatus includes a memory, a processor, and a computer program, the computer program is stored in the memory, and when the computer program is executed, the apparatus is enabled to perform the technical solution in any one of the second aspect and the third aspect and the possible designs of the second aspect and the third aspect. It should be understood that the apparatus includes a chip system, an integrated circuit, a chip, or the like.

According to a twenty-ninth aspect, an apparatus is provided. The apparatus includes a memory, a processor, and a computer program, the computer program is stored in the memory, and when the computer program is executed, the apparatus is enabled to perform the technical solution in any one of the fourth aspect and the possible designs of the fourth aspect. It should be understood that the apparatus includes a chip system, an integrated circuit, a chip, or the like.

According to a thirtieth aspect, an apparatus is provided. The apparatus includes a memory, a processor, and a computer program, the computer program is stored in the memory, and when the computer program is executed, the apparatus is enabled to perform the technical solution in any one of the fifth aspect and the sixth aspect and the possible designs of the fifth aspect and the sixth aspect. It should be understood that the apparatus includes a chip system, an integrated circuit, a chip, or the like.

According to a thirty-first aspect, an apparatus is provided. The apparatus includes a memory, a processor, and a computer program, the computer program is stored in the memory, and when the computer program is executed, the apparatus is enabled to perform the technical solution in any one of the seventh aspect and the possible designs of the seventh aspect. It should be understood that the apparatus includes a chip system, an integrated circuit, a chip, or the like.

According to a thirty-second aspect, an apparatus is provided. The apparatus includes a memory, a processor, and a computer program, the computer program is stored in the memory, and when the computer program is executed, the apparatus is enabled to perform the technical solution in any one of the eighth aspect and the possible designs of the eighth aspect. It should be understood that the apparatus includes a chip system, an integrated circuit, a chip, or the like.

According to a thirty-third aspect, an apparatus is provided. The apparatus includes a memory, a processor, and a computer program, the computer program is stored in the memory, and when the computer program is executed, the apparatus is enabled to perform the technical solution in any one of the ninth aspect and the possible designs of the ninth aspect. It should be understood that the apparatus includes a chip system, an integrated circuit, a chip, or the like.

According to a thirty-fourth aspect, an apparatus is provided. The apparatus includes a memory, a processor, and a computer program, the computer program is stored in the memory, and when the computer program is executed, the apparatus is enabled to perform the technical solution in any one of the tenth aspect and the possible designs of the tenth aspect. It should be understood that the apparatus includes a chip system, an integrated circuit, a chip, or the like.

According to a thirty-fifth aspect, a computer-readable storage medium is provided. The computer-readable storage medium includes a computer program, and when the computer program is run on an electronic device, the electronic device is enabled to perform the technical solution in any one of the foregoing aspects and the possible designs of the aspects.

According to a thirty-sixth aspect, a computer program product is provided. When the computer program product runs on a computer, the computer is enabled to perform the technical solution in any one of the foregoing aspects and the possible designs of the aspects.

According to a thirty-seventh aspect, an embodiment of this application further provides a volume adjustment system, including the electronic device according to the fifteenth aspect and the electronic device according to the sixteenth aspect.

According to a thirty-eighth aspect, an embodiment of this application further provides an audio and vibration synchronized playing system, including the electronic device according to the seventeenth aspect and the electronic device according to the eighteenth aspect.

According to a thirty-ninth aspect, a graphical user interface (graphical user interface, GUI) on an electronic device is provided. The electronic device includes a display, a camera, a memory, and one or more processors. The one or more processors are configured to execute one or more computer programs stored in the memory. The graphical user interface includes a graphical user interface displayed when the electronic device performs the technical solution in any one of the first aspect and the possible designs of the first aspect.

For each aspect in the eleventh aspect to the thirty-ninth aspect and possible technical effects of each aspect, refer to the description of technical effects that can be achieved in the possible solutions of the first aspect to the tenth aspect. Details are not described herein again.

BRIEF DESCRIPTION OF THE DRAWINGS

FIG. 16A to FIG. 16C are a schematic diagram of a user interface according to an embodiment of this application;

FIG. 23B-1 and FIG. 23B-2 are a schematic diagram of an audio effect configuration information transmission procedure according to an embodiment of this application;

FIG. 26A-1 to FIG. 26A-4 are a schematic diagram of a user interface according to an embodiment of this application;

DETAILED DESCRIPTION OF ILLUSTRATIVE EMBODIMENTS

Figure 1:
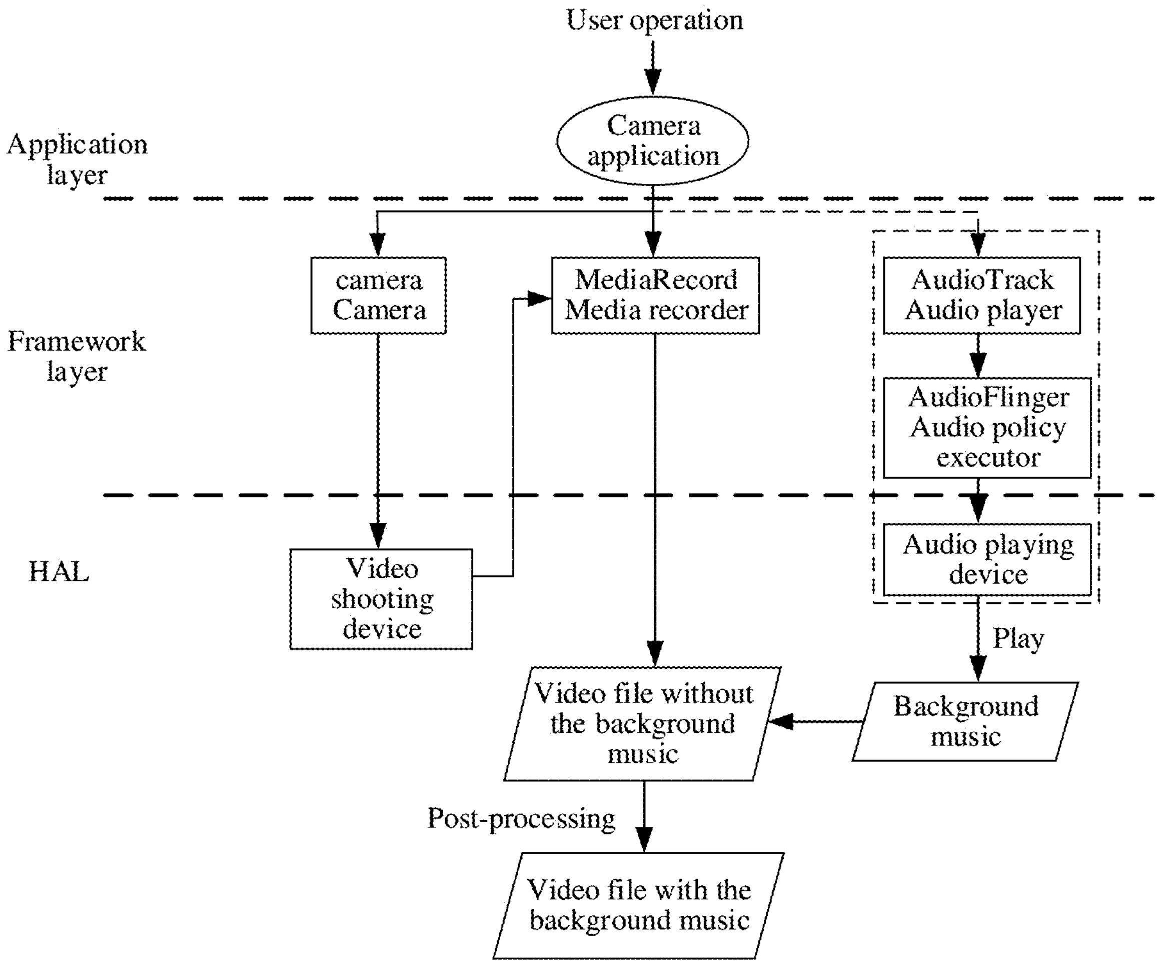
FIG. 1 is a schematic diagram of video recording.

Some terms in embodiments of this application are first explained, to facilitate understanding of a person skilled in the art.

1. Electronic device: The electronic device in embodiments of this application may be a portable terminal, for example, a mobile phone, a tablet computer, a portable computer, a wearable electronic device (for example, a smartwatch, smart glasses, a smart helmet, or a smart band), or an augmented reality (augmented reality, AR)/virtual reality (virtual reality, VR) device. For example, the portable terminal includes but is not limited to running iOS®, Android®, Harmony OS®, or another operating system. Alternatively, the electronic device in embodiments of this application may not be a portable terminal, for example, may be a desktop computer or a large-screen device (for example, a Huawei smart screen, a smart television, a smart display, or a smart projection system). This is not limited.

2. Application program: is referred to as an application for short, and is a software program that can implement one or more specific functions. Usually, a plurality of applications may be installed on an electronic device, for example, a camera application, a messaging application, a mailbox application, TikTok, Arena of Valor, WeChat (WeChat), and WeLink. An application mentioned below may be an application installed before an electronic device is delivered from a factory, or may be an application downloaded from a network or obtained from another electronic device by a user in a process of using the electronic device.

3. Audio data: In embodiments of this application, the audio data (audio data) may also be referred to as sound data, is used to represent a sound, and is obtained by processing an audio file (such as an ogg file). For example, processing such as decoding, decompression, or audio effect processing is performed on an audio file to obtain audio data. The audio file includes the audio data, and may be an MP3 file, an MP4 file, or a file in another format. This is not limited. That is, an electronic device can play a sound based on audio data.

Currently, an electronic device provides a corresponding function for a user by using an application. For example, the electronic device may provide a video recording function, a photographing function, and the like for the user by using a camera application. Generally, the user may perform an operation on the camera application, so that the electronic device can record a video in response to the operation of the user on the camera application. After the video recording ends, the electronic device stores the recorded video in a form of a video file (for example, an MP4 file or a 3GP file). Then, the user performs post-processing on the stored video file by using the electronic device, to add background music to the video. In some embodiments, the electronic device may record a video and play music in response to an operation of the user on the camera application. In this case, a video added to the video may be audio played in response to the operation of the user on the camera application.

For example, as shown in FIG. 1, a camera application starts a camera in response to receiving a video recording operation of a user, and transfers a corresponding video recording parameter configuration (such as a video resolution and a video frame rate) to media record. The camera invokes a video shooting device (that is, a video hardware abstraction layer) to capture a video image. Then, the video shooting device processes, for example, encodes or compresses, the captured image to obtain image data, and outputs the image data to media record, until the video recording ends. In addition, media record processes the image data from the video shooting device based on the video recording parameter configuration, and generates a video file. However, the video file does not include background music. Finally, the electronic device processes the obtained video file and an audio file of the background music, to synthesize the background music into a video. In some embodiments, the camera application sends the audio file of the background music to audio track in response to receiving the video recording operation of the user. Then, audio track outputs the audio file to audio flinger, and audio flinger invokes an audio playing device (that is, an audio hardware abstraction layer (audio HAL)) to play the background music.

However, in the video recording method shown in FIG. 1, post-processing is required to obtain a video file that includes the background music. Therefore, obtaining the video file that includes the background music is relatively cumbersome.

In view of this, embodiments of this application provide a video recording method, to enable an electronic device to add corresponding background music in a video recording process, so that after video recording ends, a video file that includes the background music can be directly obtained. This helps simplify an implementation, facilitates use by a user, and helps improve user experience.

It should be understood that, in embodiments of this application, "at least one" refers to one or more. "A plurality of" means two or more than two. "And/or" describes an association relationship between associated objects, and indicates that three relationships may exist. For example, A and/or B may indicate the following three cases: Only A exists, both A and B exist, and only B exists. A and B may be singular or plural. The character "/" usually indicates an "or" relationship between the associated objects. "At least one of the following items (pieces)" or a similar expression thereof refers to any combination of these items, including a single item (piece) or any combination of a plurality of items (pieces). For example, at least one of a, b, or c may indicate the following seven cases: a, b, c, a and b, a and c, b and c, or a, b, and c. Each of a, b, and c may be an element, or may be a set that includes one or more elements.

In this application, "for example", "in some embodiments", "in some other embodiments", and the like are used to represent giving an example, an illustration, or a description. Any embodiment or design scheme described as an "example" in this application should not be explained as being more preferred or having more advantages than another embodiment or design scheme. Specifically, the term "example" is used to present a concept in a specific manner.

It should be noted that in embodiments of this application, words such as "first" and "second" are merely used for distinguishing, and cannot be understood as an indication or implication of relative importance or an indication or implication of a sequence.

Figure 2:
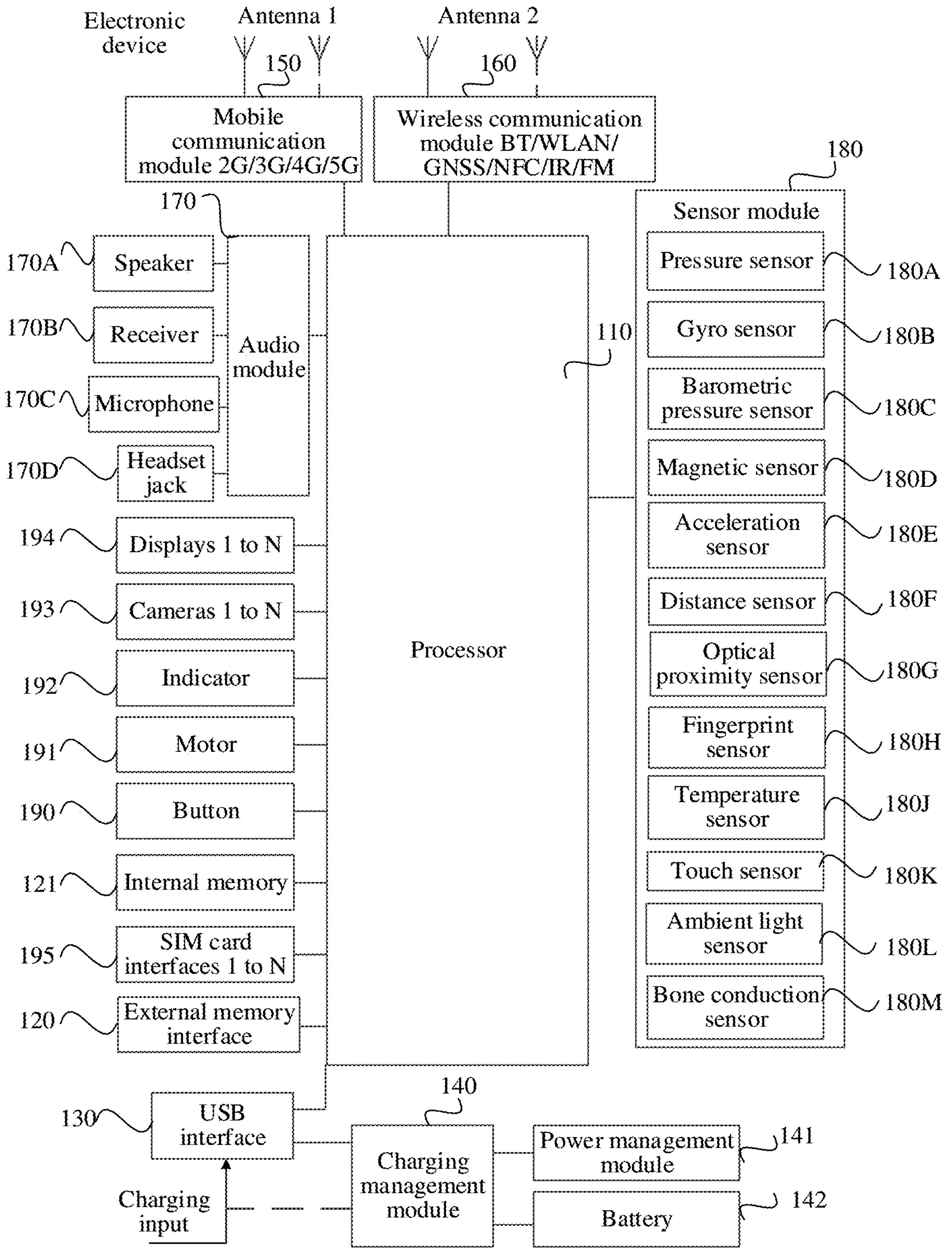
FIG. 2 is a diagram of a hardware structure of an electronic device according to an embodiment of this application.

For example, FIG. 2 is a schematic diagram of a hardware structure of an electronic device according to an embodiment of this application. Specifically, as shown in FIG. 2, the electronic device includes a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem (modem), a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or two or more different processing units may be integrated into one component. The controller may be a nerve center and a command center of the electronic device. The controller may generate an operation control signal based on instruction operation code and a time sequence signal, to complete control of instruction fetching and instruction execution.

A memory may be further disposed in the processor 110, to store a computer program and/or data. In some embodiments, the memory in the processor 110 is a cache. The memory may store a computer program and/or data just used or cyclically used by the processor 110. If the processor 110 needs to use the computer program and/or data again, the computer program and/or data may be directly invoked from the memory. This avoids repeated access, and reduces waiting time of the processor 110, so that system efficiency is improved.

In some embodiments, the processor 110 may include one or more interfaces. For example, the processor 110 includes a universal serial bus (universal serial bus, USB) interface 130 and a subscriber identity module (subscriber identity module, SIM) interface 195. For another example, the processor 110 may further include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), and/or a general-purpose input/output (general-purpose input/output, GPIO) interface.

It may be understood that the interface connection relationship between the modules shown in this embodiment of this application is merely an example, and does not constitute a limitation on the structure of the electronic device. In some other embodiments of this application, the electronic device may alternatively use an interface connection manner different from that in the foregoing embodiment, or a combination of a plurality of interface connection manners.

The USB interface 130 is an interface conforming to a USB standard specification, and may be specifically a mini USB interface, a micro USB interface, a USB Type-C interface, or the like. The USB interface 130 may be configured to connect to a charger to charge the electronic device, or may be configured to transmit data between the electronic device and a peripheral device, or may be configured to connect to a headset to play audio by using the headset. The interface may alternatively be configured to connect to another electronic device, such as an augmented reality (augmented reality, AR) device.

The SIM card interface 195 is configured to connect to a SIM card. The SIM card may be inserted into the SIM card interface 195 or pulled out of the SIM card interface 195, to implement contact with or separation from the electronic device. The electronic device may support two or N SIM card interfaces, and N is a positive integer greater than 2. The SIM card interface 195 can support a nano-SIM card, a micro-SIM card, a SIM card, and the like. A plurality of cards may be simultaneously inserted into a same SIM card interface 195. The plurality of cards may be of a same type or different types. The SIM card interface 195 may also be compatible with different types of SIM cards. The SIM card interface 195 may also be compatible with an external memory card. The electronic device interacts with a network by using a SIM card, to implement functions such as conversation and data communication. In some embodiments, the electronic device uses an eSIM, namely, an embedded SIM card. The eSIM card may be embedded in the electronic device, and cannot be separated from the electronic device.

The charging management module 140 is configured to receive charging input from a charger. The charger may be a wireless charger, or may be a wired charger. In some wired charging embodiments, the charging management module 140 may receive charging input from a wired charger through the USB interface 130. In some wireless charging embodiments, the charging management module 140 may receive wireless charging input through a wireless charging coil of the electronic device. When charging the battery 142, the charging management module 140 may further supply power to the electronic device through the power management module 141.

The power management module 141 is configured to connect the battery 142, the charging management module 140, and the processor 110. The power management module 141 receives input from the battery 142 and/or the charging management module 140, and supplies power to the processor 110, the internal memory 121, the external memory, the display 194, the camera 193, the wireless communication module 160, and the like. The power management module 141 may be further configured to monitor parameters such as a battery capacity, a battery cycle count, and a battery health status (leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device may be implemented by using the antenna 1, the antenna 2, the mobile communication module 150, the wireless communication module 160, the modem, the baseband processor, and the like.

The antenna 1 and the antenna 2 are configured to transmit and receive electromagnetic wave signals. Each antenna in the electronic device may be configured to cover one or more communication bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communication module 150 may provide a solution for wireless communication, including a standard such as 2G/3G/4G/5G/a subsequent evolved standard such as 6G, that is applied to the electronic device. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send a processed electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 may be disposed in a same component as at least some modules of the processor 110.

The wireless communication module 160 may provide a solution for wireless communication that is applied to the electronic device and that includes a wireless local area network (wireless local area networks, WLAN) (such as a Wi-Fi network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communication module 160 may be one or more components that integrate at least one communication processing module. The wireless communication module 160 receives an electromagnetic wave through the antenna 2, performs frequency modulation and filtering on an electromagnetic wave signal, and sends a processed signal to the processor 110. The wireless communication module 160 may further receive a to-be-sent signal from the processor 110, perform frequency modulation and amplification on the to-be-sent signal, and convert the to-be-sent signal into an electromagnetic wave for radiation through the antenna 2. For example, in embodiments of this application, a communication connection may be established between different electronic devices through BT or a WLAN.

In some embodiments, in the electronic device, the antenna 1 is coupled to the mobile communication module 150, and the antenna 2 is coupled to the wireless communication module 160, so that the electronic device can communicate with a network and another device according to a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), a 5th generation (the fifth generation, 5G) mobile communication system, a future communication system such as a 6th generation (6th generation, 6G) system, BT, GNSS, WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device implements a display function by using the GPU, the display 194, the application processor, and the like. The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diodes, QLED), or the like. In some embodiments, the electronic device may include one or N displays 194, where N is a positive integer greater than 1.

The electronic device may implement a photographing function by using the ISP, the camera 193, the video codec, the GPU, the display 194, the application processor, and the like. The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 193 is configured to capture a still image or a video. An optical image of an object is generated by using a lens and projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for conversion into a digital image signal. The ISP outputs the digital image signal to the DSP for processing. The DSP converts the digital image signal into a standard image signal in a format such as RGB or YUV. In some embodiments, the electronic device may include one or N cameras 193, where N is a positive integer greater than 1.

The external memory interface 120 may be configured to connect to an external memory card, such as a micro SD card, to extend a storage capability of the electronic device. The external memory card communicates with the processor 110 through the external memory interface 120, to implement a data storage function. For example, files such as audio or videos are stored in the external memory card.

The internal memory 121 includes running memory (memory) and a built-in memory. The running memory may be configured to store a computer program, data, and/or the like. The processor 110 performs various function applications of the electronic device and data processing by running the computer program stored in the running memory. For example, the running memory may include a high-speed random access memory. The built-in memory may also be referred to as a built-in external memory or the like, and may be configured to store a computer program and/or data. For example, the built-in memory may store an operating system, an application, and the like. Usually, after the electronic device loads the computer program and/or data in the built-in memory to the running memory, the processor 110 runs the corresponding computer program and/or data to implement a corresponding function. In addition, the internal memory 121 may include a non-volatile memory, such as at least one magnetic disk storage component, a flash memory component, and a universal flash storage (universal flash storage, UFS).

The external memory interface 120 may be configured to connect to an external memory card, such as a micro SD card, to extend a storage capability of the electronic device. The external memory card communicates with the processor 110 through the external memory interface 120, to implement a data storage function. For example, files such as pictures or videos are stored in the external memory card.

The electronic device may implement an audio function, such as music playing and recording, by using the audio module 170, the speaker 170A, the receiver 170B, the microphone 170C, the headset jack 170D, the application processor, and the like.

The pressure sensor 180A is configured to sense a pressure signal, and may convert the pressure signal into an electrical signal. In some embodiments, the pressure sensor 180A may be disposed on the display 194. The gyro sensor 180B may be configured to determine a motion gesture of the electronic device. In some embodiments, angular velocities of the electronic device around the three axes (that is, the x-axis, the y-axis, and the z-axis) may be determined by using the gyro sensor 180B.

The gyro sensor 180B may be used for image stabilization during photographing. The barometric pressure sensor 180C is configured to measure barometric pressure. In some embodiments, the electronic device calculates an altitude based on a barometric pressure value measured by the barometric pressure sensor 180C, to assist in positioning and navigation. The magnetic sensor 180D includes a Hall sensor. The electronic device may detect opening and closing of a flip cover by using the magnetic sensor 180D. In some embodiments, when the electronic device is a flip phone, the electronic device may detect opening and closing of a flip cover based on the magnetic sensor 180D. Further, a feature such as automatic unlocking upon opening of the flip cover is set based on a detected opening or closing state of the flip cover. The acceleration sensor 180E may detect values of acceleration of the electronic device in all directions (usually on three axes). When the electronic device is static, magnitude and a direction of gravity may be detected. The acceleration sensor may be further configured to recognize a posture of the electronic device, and is applied to applications such as switching between landscape mode and vertical mode and a pedometer.

The distance sensor 180F is configured to measure a distance. The electronic device may measure a distance through infrared or laser. In some embodiments, in a photographing scenario, the electronic device may measure a distance by using the distance sensor 180F, to implement quick focusing. The optical proximity sensor 180G may include, for example, a light-emitting diode (LED) and a light detector such as a photodiode. The light-emitting diode may be an infrared light-emitting diode. The electronic device emits infrared light by using the light-emitting diode. The electronic device detects infrared reflected light from a nearby object by using the photodiode. When sufficient reflected light is detected, the electronic device may determine that there is an object near the electronic device. When insufficient reflected light is detected, the electronic device may determine that there is no object near the electronic device. The electronic device may detect, by using the optical proximity sensor 180G, that a user holds the electronic device close to the ear for a call, to automatically turn off a screen to save power. The optical proximity sensor 180G may also be used in a flip cover mode or a pocket mode to automatically perform screen unlocking or locking.

The ambient light sensor 180L is configured to sense ambient light brightness. The electronic device may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device is in a pocket, to prevent an accidental touch. The fingerprint sensor 180H is configured to collect a fingerprint. The electronic device may implement fingerprint-based unlocking, application lock access, fingerprint-based photographing, fingerprint-based call answering, or the like based on a feature of the collected fingerprint.

The temperature sensor 180J is configured to detect a temperature. In some embodiments, the electronic device executes a temperature processing policy based on the temperature detected by the temperature sensor 18J. For example, when the temperature reported by the temperature sensor 180J exceeds a threshold, the electronic device reduces performance of a processor near the temperature sensor 180J, to reduce power consumption and implement thermal protection. In some other embodiments, when the temperature is lower than another threshold, the electronic device heats the battery 142 to avoid abnormal shutdown of the electronic device that is caused due to a low temperature. In some other embodiments, when the temperature is lower than still another threshold, the electronic device boosts an output voltage of the battery 142, to avoid an abnormal shutdown caused by a low temperature.

The touch sensor 180K is also referred to as a "touch panel". The touch sensor 180K may be disposed on the display 194. The touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of a touch event. Visual output related to the touch operation may be provided by using the display 194. In some other embodiments, the touch sensor 180K may alternatively be disposed on a surface of the electronic device at a position different from that of the display 194.

The bone conduction sensor 180M may obtain a vibration signal. In some embodiments, the bone conduction sensor 180M may obtain a vibration signal of a vibration bone of a human vocal cord part. The bone conduction sensor 180M may also be in contact with a human pulse, and receive a blood pressure beating signal.

The button 190 includes a power button, a volume button, and the like. The button 190 may be a mechanical button, or may be a touch button. The electronic device may receive button input, and generate button signal input related to user settings and function control of the electronic device.

The motor 191 may generate a vibration prompt. The motor 191 may be used for an incoming call vibration prompt, or may be used for touch vibration feedback. For example, touch operations performed on different applications (for example, photo taking and audio playing) may be corresponding to different vibration feedback effects. The motor 191 may also correspond to different vibration feedback effects for touch operations performed in different regions of the display 194. Different application scenarios (for example, a time reminder, information receiving, an alarm clock, and a game) may also be corresponding to different vibration feedback effects. A touch vibration feedback effect may be further customized.

The indicator 192 may be an indicator light, and may be used to indicate a charging status or a power change, or may be used to indicate a message, a missed call, a notification, or the like.

It may be understood that the structure shown in this embodiment of this application does not constitute a specific limitation on the electronic device. In some other embodiments of this application, the electronic device may include more or fewer components than those shown in the figure, or combine some components, or split some components, or have different component arrangements. The components shown in the figure may be implemented by hardware, software, or a combination of software and hardware.

A software system of the electronic device in embodiments of this application may use a layered architecture, an event-driven architecture, a microkernel architecture, a micro-service architecture, a cloud architecture, or the like. In embodiments of this application, a Harmony operating system with a layered architecture is used as an example to describe the software system of the electronic device.

Figure 3:
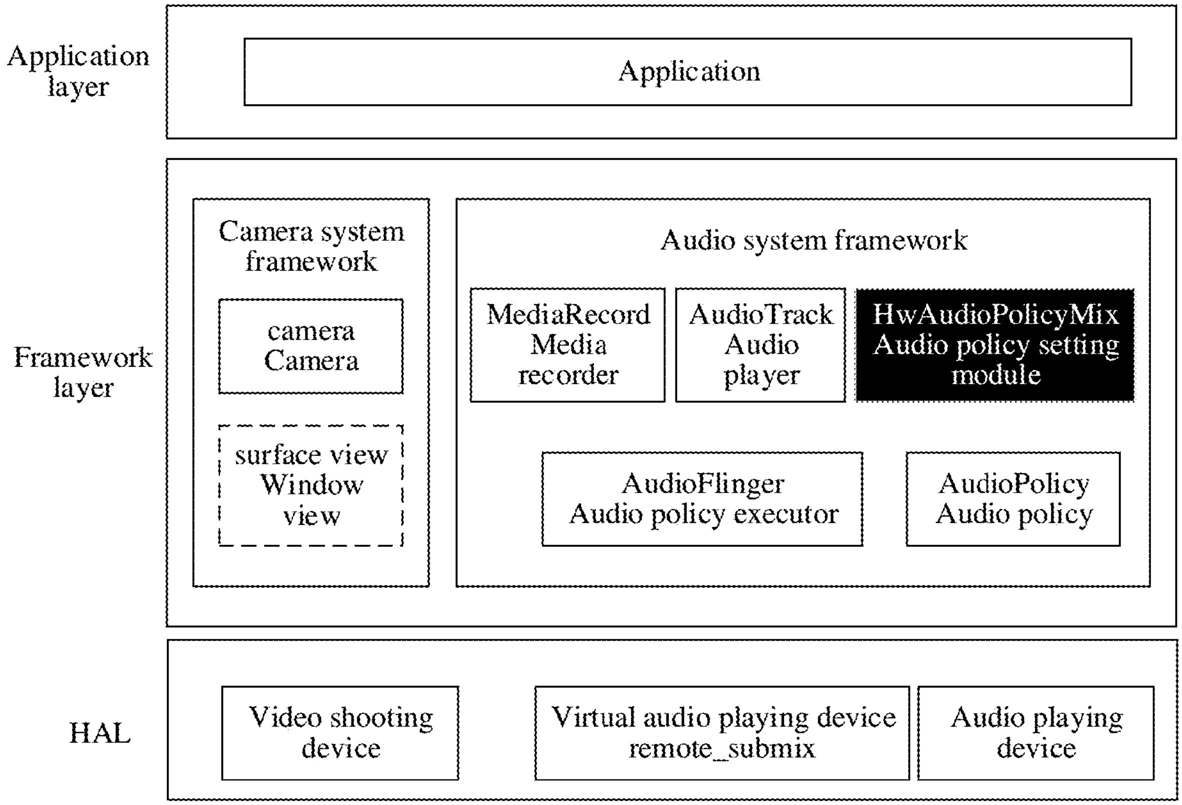
FIG. 3 is a schematic diagram of a structure of a software system of an electronic device according to an embodiment of this application.

For example, FIG. 3 is a diagram of a structure of a software system of an electronic device according to an embodiment of this application. As shown in the figure, the software system of the electronic device includes an application layer, a framework layer, a hardware abstraction layer (hardware abstraction layer, HAL), and the like.

The application layer includes applications, for example, a camera application, a short video application, a gallery application, a map application, a game application, and a music application. The application may be configured to provide a graphical user interface (graphical user interface, GUI) for a user, provide an operation interface for the user, and the like.

The framework layer provides an application programming interface (application programming interface, API) framework for the applications at the application layer.

For example, the API framework may include a camera system framework and an audio system framework. The camera system framework includes a camera (camera). The audio system framework includes a media recorder (MediaRecord), an audio player (AudioTrack), an audio policy executor (AudioFlinger), an audio policy (AudioPolicy), and the like.

The camera is an interface used by an application (for example, a camera application) to invoke a video shooting device. For example, the camera system framework further includes a surface view, and the camera may invoke the video shooting device by using the surface view.

MediaRecord is configured to generate a video file. For example, the audio system framework further includes a writer, and MediaRecord may generate the video file by invoking the writer.

In some embodiments, the audio system framework further includes HwAudioPolicyMix (audio policy setting module), configured to customize different audio policies for different applications. For example, an application may transfer a corresponding parameter such as an application identifier (uid) to HwAudioPolicyMix, so that HwAudioPolicyMix generates a corresponding audio policy for the application, and transfers the corresponding audio policy to AudioPolicy.

The hardware abstraction layer includes an audio playing device (such as an audio HAL), a video shooting device (such as a video hardware abstraction layer), and the like. The audio playing device is configured to invoke a sound hardware playing device such as a speaker to play audio. The video shooting device is configured to invoke the camera to capture an image. In some embodiments, the hardware abstraction layer may further include a virtual audio playing device (remote_submix). In addition, remote_submix is configured to receive audio data that is sent by AudioFlinger and that is of an audio file meeting an audio policy generated by HwAudioPolicyMix for an application, and transfer the audio data of the audio file to MediaRecord through AudioFlinger. Then, MediaRecord may synthesize a corresponding video file based on the audio data of the audio file meeting the audio policy generated for the application and image data captured by the video shooting device, so that the synthesized video file may include background music.

It may be understood that the software system of the electronic device shown in FIG. 3 is merely a schematic description, and does not constitute a limitation on the software system of the electronic device. In some other embodiments of this application, the software system of the electronic device may further include a kernel layer. Alternatively, a module included in the framework layer, the hardware abstraction layer, or the like is not limited. In addition, in some embodiments, the software system of the electronic device shown in FIG. 3 may alternatively be an Android operating system.

A camera application that supports recording of a video with background music is used as an example. In response to an operation of a user for recording a video with background music, the camera application starts the camera, transfers a corresponding video recording parameter configuration (such as a video resolution and a video frame rate) to MediaRecord, and transfers an audio file of the background music to AudioTrack. The camera invokes the video shooting device to capture an image. Then, the camera transfers image data of the captured image to MediaRecord, and AudioTrack processes the audio file of the background music to obtain audio data of the background music, and transfers the audio data to AudioFlinger. AudioFlinger separately distributes the audio data to the virtual audio playing device and the audio playing device. The virtual audio playing device transfers the audio data to MediaRecord through AudioFlinger. Then, MediaRecord may perform corresponding processing on the image data and the audio data based on the video recording parameter configuration until the video recording ends, to obtain the video file with the background music. The audio playing device may distribute the audio data from AudioFlinger to a speaker, a headset, or the like for playing.

In some other examples, after the video recording ends or in response to an operation of the user, the camera application may further obtain and play the video file with the background music.

Figure 4:
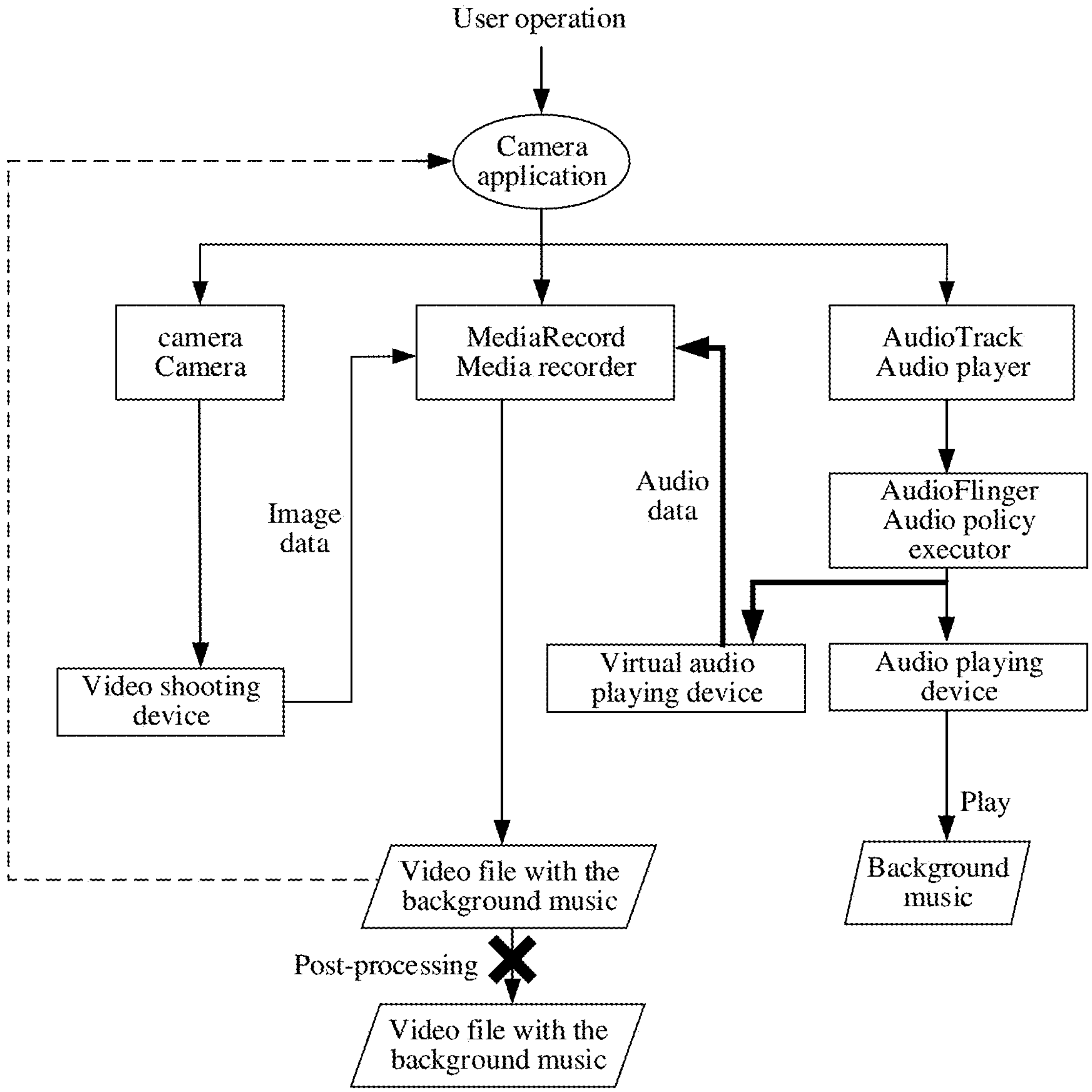
FIG. 4 is a schematic diagram of video recording according to an embodiment of this application.

In the video file recording manner shown in FIG. 4, background music is added to a video in a video recording process, so that the user does not need to perform subsequent processing on a video file. This facilitates use by the user. However, in a case in which the electronic device supports recording a video by using the camera application while playing a video or music by using another application, AudioFlinger may receive not only audio data of background music from the camera application, but also audio data from the another application. In this case, audio data transmitted by AudioFlinger to the virtual audio playing device may include not only the audio data of the background music from the camera application, but also the audio data from the another application. This affects video recording effect, and likely causes a copyright dispute.

To resolve this problem, in embodiments of this application, HwAudioPolicyMix is introduced into the software system of the electronic device. Therefore, when the electronic device supports a plurality of applications in playing audio in media files (for example, a video file or an audio file), audio data from an application that records a video can be obtained through screening, to achieve an objective of adding corresponding background music according to a user requirement in a video recording process. In addition, it is not likely to cause a copyright dispute. Further, if audio effect processing is performed on played background music when the electronic device records a video, this manner of adding background music to a video further helps ensure that audio effect of the background music played after the video recording of the electronic device ends is consistent with audio effect of the background music played when the electronic device records the video.

Figure 5:
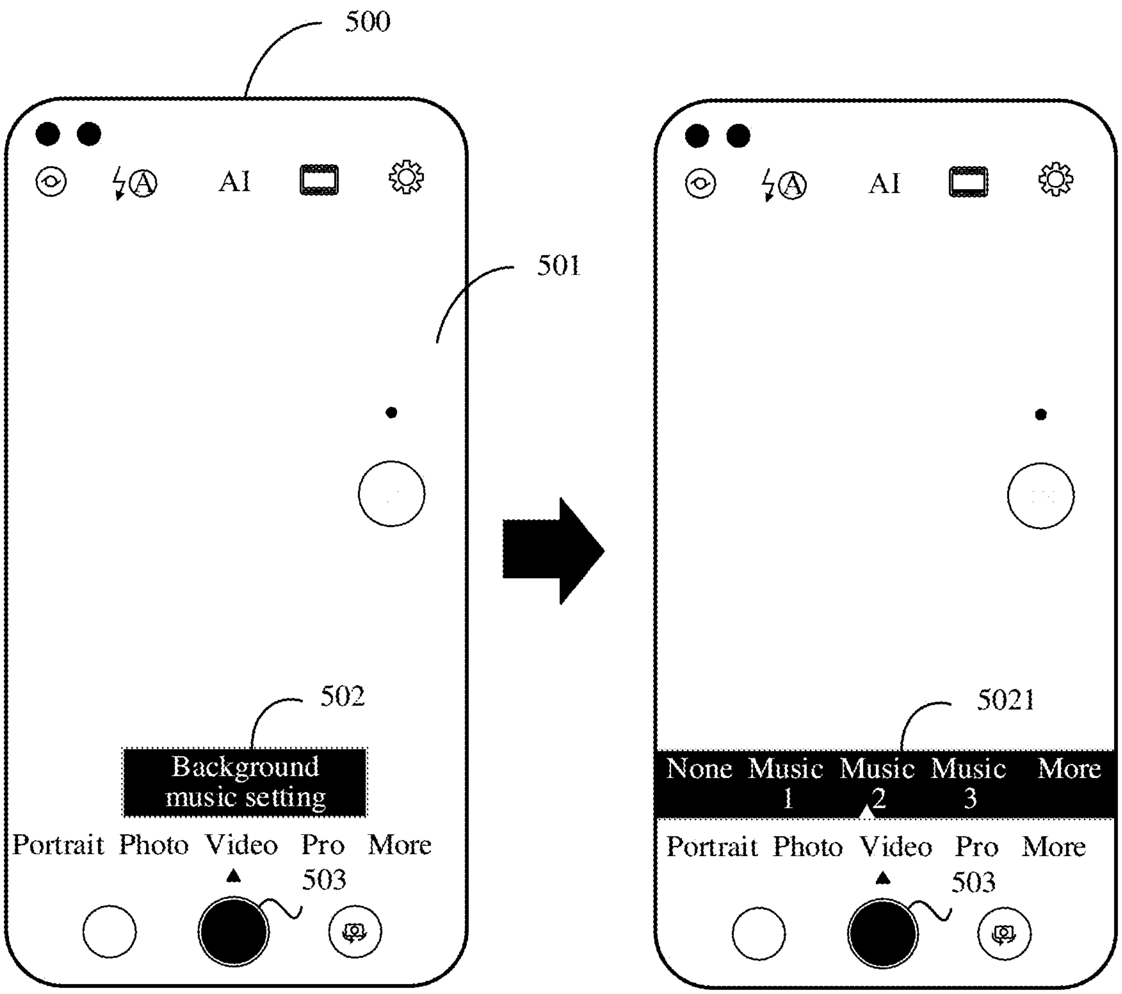
FIG. 5 is a schematic diagram of an interface according to an embodiment of this application.

As shown in FIG. 5, an electronic device displays an interface 500. The interface 500 is a video recording interface of a camera application, and includes an image preview box 501, a background music setting option 502, and a virtual button 503. The image preview box 501 is used to preview an image captured by a camera. The virtual button 503 is used to control to start or stop video recording. It may be understood that the video recording interface of the camera application may further include another control, for example, a virtual button used to control switching between a front-facing camera and a rear-facing camera. In response to an operation of tapping the background music setting option 502 by a user, a background music setting bar 5021 is displayed. The background music setting bar 5021 includes a plurality of music options, such as None, Music 1, Music 2, Music 3, and More. If the music option "None" is selected by the user, a recorded video does not include background music. If Music 1 is selected, a recorded video includes Music 1. When the user selects More, corresponding music may be selected locally or from the Internet as background music of a recorded video.

For example, the user selects Music 2. In response to tapping the virtual button 503 by the user, the electronic device starts to record a video. In response to tapping the virtual button 503 by the user, the electronic device ends video recording, and generates a video file. The video file includes background music and an image actually captured by the camera. In some embodiments, when the user selects Music 2, in response to tapping the virtual button 503 by the user, the electronic device may further play a music file indicated by Music 2.

In some other embodiments of this application, when a plurality of applications in the electronic device play audio, if the user selects Music 2, in response to tapping the virtual button 503 by the user, the electronic device selects, based on an application identifier (uid) of the camera application, audio data of audio corresponding to the application identifier of the camera application from the plurality of applications that play the audio. In response to tapping the virtual button 503 by the user, the electronic device ends video recording, and generates a video file based on the audio data of the audio corresponding to the application identifier of the camera application (that is, audio data of an audio file identified by Music 2) and image data captured by the camera.

Further, in some embodiments, when an application in the electronic device plays audio, if the user uses the camera application to record a video with background music, the camera application may not play background music used for recording the video. Therefore, a plurality of applications can be prevented from playing background music at the same time.

Figure 6A:
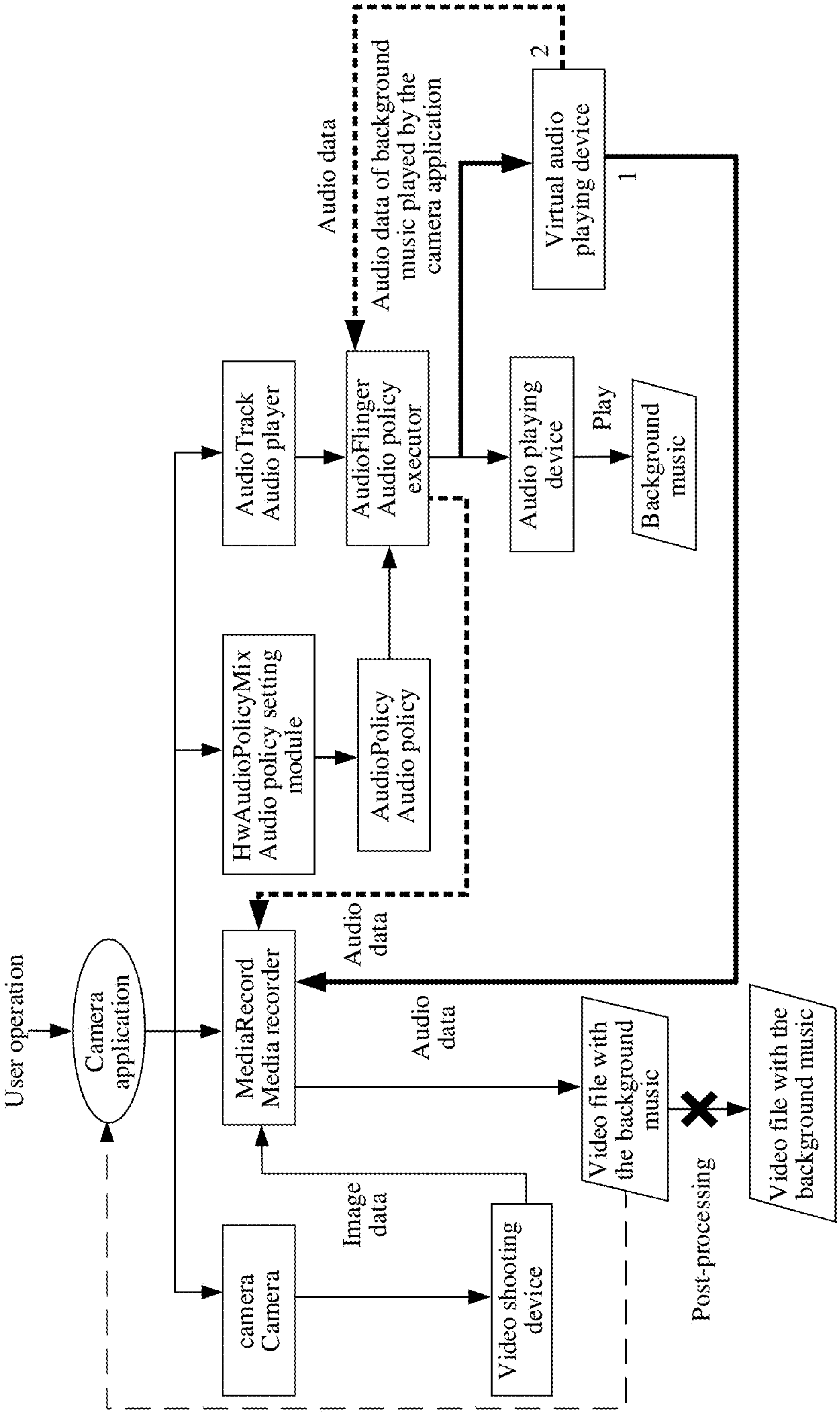
FIG. 6A is a schematic diagram of video recording according to an embodiment of this application.

For example, based on the software system shown in FIG. 3, a method for performing video recording by the electronic device may be shown in FIG. 6A, and specifically includes: In response to an operation of recording a video with background music by a user, the camera application transfers an audio policy configuration parameter of the camera application to HwAudioPolicyMix. The camera application transfers an audio file of the background music to AudioTrack. The camera application transfers a video recording parameter configuration (such as a video resolution and a video frame rate) to MediaRecord, and starts the camera. The audio policy configuration parameter of the camera application may include an application identifier (such as a uid) of the camera application, and the like. HwAudioPolicyMix generates an audio policy of the camera application based on the audio policy configuration parameter of the camera application, and transfers the audio policy of the camera application to AudioPolicy. AudioPolicy sends the policy of the camera application to AudioFlinger. AudioTrack processes the audio file of the background music to obtain audio data of the background music, and transfers the audio data to AudioFlinger. After receiving the audio policy of the camera application from AudioPolicy, AudioFlinger obtains, through screening according to the audio policy of the camera application, music data of the background music used for recording the video, and transfers the music data of the background music used for recording the video to the virtual audio playing device. The virtual audio playing device sends the music data of the background music used for recording the video to MediaRecord. In an optional implementation, the virtual audio playing device may further send, to AudioFlinger, the music data of the background music used for recording the video, and then AudioFlinger sends, to MediaRecord, the music data of the background music used for recording the video. In addition, after being started, the camera may invoke the video shooting device to capture an image. Then, the camera transfers image data of the captured image to MediaRecord. Therefore, MediaRecord may perform corresponding synthesis on the received audio data and image data based on the video recording parameter configuration. After the video recording ends, MediaRecord may generate a video file with the background music based on a synthesis result of the audio data and the image data, and store the video file.

In this embodiment of this application, HwAudioPolicyMix is added to the software system of the electronic device. Therefore, when a plurality of applications (including a camera application having a function of recording a video with background music) in the electronic device play audio, audio data of audio (that is, background music) played by the camera application is obtained, through screening according to the audio policy of the camera application, from the audio played by the plurality of applications. This helps achieve an objective of adding corresponding background music according to a user requirement in a video recording process. In addition, it is not likely to record, in a video, audio data of audio played by another application, and it is not likely to cause a copyright dispute. For example, the audio policy of the camera application may refer to obtaining, through screening, the audio data of the audio corresponding to the application identifier of the camera application.

In addition, the audio data of the background music is transferred by AudioFlinger to the virtual audio playing device, and audio effect processing on the audio data of the background music is usually performed before AudioFlinger outputs the audio data. Therefore, in this embodiment of this application, if audio effect processing is performed on the background music played when the electronic device records the video, this manner of adding background music to a video further helps ensure that audio effect of the background music played after the video recording of the electronic device ends is consistent with audio effect of the background music played when the electronic device records the video.

Figure 6B:
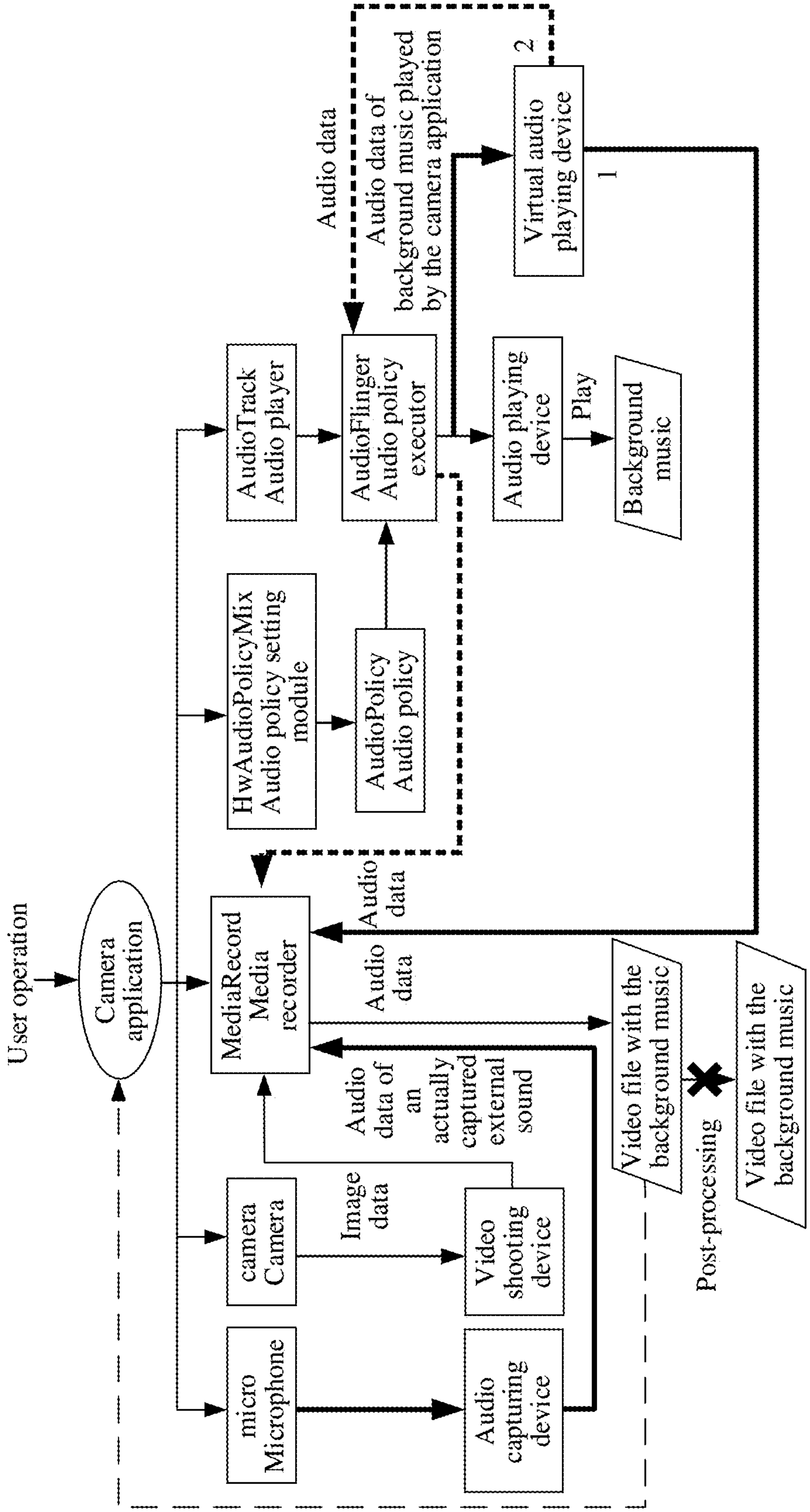
FIG. 6B is another schematic diagram of video recording according to an embodiment of this application.

It should be noted that, in this embodiment of this application, when a shooting mute function is enabled, a microphone of the electronic device does not capture an external sound (such as a user sound or a sound in a surrounding environment). In some embodiments, when the shooting mute function is disabled, the electronic device may generate a video file based on audio data of a sound captured by the microphone, the audio data of the background music, and the image data captured by the camera. For example, as shown in FIG. 6B, in response to an operation of recording a video with background music by the user, the camera application further starts the microphone, and the microphone invokes an audio capturing device to capture audio data of a sound. Then, the audio capturing device sends the captured audio data of the sound to MediaRecord. MediaRecord synthesizes the audio data of the sound captured by the audio capturing device, the audio data of the background music, and the image data captured by the camera, and when the video recording ends, generates a video file based on a synthesis result of the audio data of the sound captured by the microphone, the audio data of the background music, and the image data captured by the camera, and stores the video file.

Further, in some embodiments, after generating the video file, the electronic device may further play the video file, to facilitate preview by the user.

It should be noted that, in this embodiment of this application, the end of the video recording may be triggered by the user by using an operation, or the video recording may automatically end after preset duration starting from a moment at which the electronic device starts video recording. This is not limited.

It should be understood that the foregoing describes the video recording method in this embodiment of this application by using the camera application as an example. An application that uses the video recording method shown in FIG. 6A or FIG. 6B is not limited in this embodiment of this application. For example, the video recording method shown in FIG. 6A or FIG. 6B may also be applied to a short video application or the like. This is not limited.

In addition, the video recording method in this embodiment of this application is used to generate a video file in a live broadcast scenario or a video call scenario.

It should be further noted that the foregoing embodiments may be used independently, or may be used in combination with each other to achieve different technical effects. This is not limited herein.

The foregoing embodiment describes a process of generating a video file based on audio data and image data. When the foregoing video recording method is applied to a live broadcast scenario, for example, a live game scenario, the audio data may include a sound of a streamer, a sound of a game, background music, and the like. Therefore, how to record the audio data so that a user can select to-be-recorded audio data according to a requirement of the user is a problem to be resolved. The following uses a live broadcast scenario as an example to describe an audio data recording process in detail.

Currently, in the live broadcast scenario, such as a live game, audio data recording usually includes the following two manners.

Manner 1: A system sound is played through a speaker, and then a microphone records the sound played through the speaker.

When a streamer live-broadcasts a game, the system sound (which may also be understood as a sound of the game) is usually played through the speaker, and then the microphone records the played system sound. The microphone may directly record a sound of the streamer. In this process, audio data recorded by the microphone includes the system sound and the sound of the streamer, that is, one piece of audio data includes a plurality of types of audio data.

Manner 2: A system sound is recorded in an internal recording mode.

It should be understood that internal recording means that a sound does not need to be played through a speaker and then picked up by a microphone.

For ease of description, an application used for live broadcast is denoted as a "live broadcast application", an application to which live content belongs is denoted as a "game application", and an application providing background music (for example, music played by a streamer) in a live broadcast scenario is denoted as a "music application" below.

Figure 7:
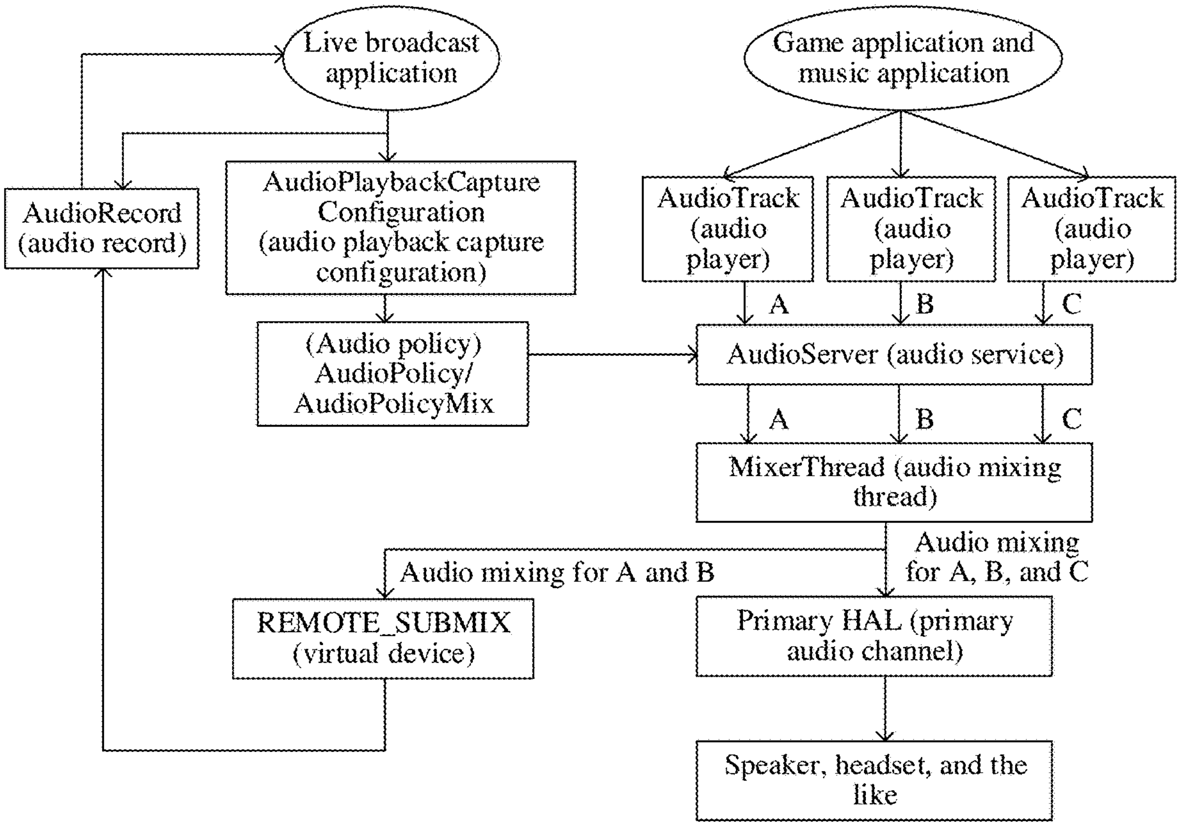
FIG. 7 is a flowchart of implementation of an audio data recording method according to an embodiment of this application.

FIG. 7 is a flowchart of implementation of an audio data recording method. As shown in FIG. 7, the method may include the following steps: A live broadcast application creates a class (AudioPlaybackCaptureConfiguration) to request to record audio streams of types A and B, and then creates an audio recorder (AudioRecord) to record the audio streams of the types A and B. Then, AudioPlaybackCaptureConfiguration may send the request for recording the audio streams of the types A and B to an audio policy (AudioPolicy/AudioPolicyMix). After receiving the request, the audio policy (AudioPolicy/AudioPolicyMix) notifies an audio service (AudioService) to change an audio output policy (that is, during audio stream output, one audio stream is output to a speaker, a headset, or the like, and another audio stream (audio stream obtained by mixing the audio streams of the types A and B) is output to a virtual device). The audio service (AudioService) receives audio streams that are output by a game application and a music application by using a plurality of audio players (AudioTrack). Then, the audio service (AudioService) may send the audio streams to an audio mixing thread (MixerThread), and MixerThread performs audio mixing on the audio streams. An audio system may copy the audio streams and classify the audio streams into two channels for transmission. One audio stream (audio data obtained by mixing audio streams of types A, B, and C) is sent to a speaker, a headset, or the like. The other audio stream is as follows: The audio system may copy the audio streams of the types A and B, perform audio mixing, and then send an audio stream obtained by mixing the audio streams of the types A and B to a virtual device (remote_submix). Then, at least one type of audio stream is recorded by using an audio recording class (AudioRecord), and finally the recorded audio stream is sent to the live broadcast application at an application layer. It should be understood that one application may output different audio streams by using a plurality of different AudioTracks. In the figure, only three AudioTracks are used as an example. For example, there may be two AudioTracks, or there may be four AudioTracks. This is not limited in this application.

In the foregoing two manners, recording data received by the live broadcast application is data obtained by mixing a plurality of types of audio streams, and types of audio streams that can be obtained by the live broadcast application are limited. In addition, in Manner 2, mixed data of the types A and B is output to the virtual device only after the audio mixing thread (MixerThread) mixes the audio streams of the three types A, B, and C. In this case, the audio data sent to the live broadcast application is one piece of data obtained through audio mixing, instead of two pieces of audio data.

In view of this, an embodiment of this application further provides an audio recording method. A plurality of types of audio streams in a live broadcast scenario are marked, and at least one type of audio stream required by a live broadcast application is obtained from the marked audio streams through screening. Then, the audio stream obtained through screening is sent to the live broadcast application. In this way, a live broadcast application side can record a plurality of different types of audio data, instead of recording a plurality of types of mixed data, so that the audio stream can be conveniently processed.

It should be noted that the audio recording method may be applied to the electronic device shown in FIG. 2. For a block diagram of a software structure of the electronic device, refer to FIG. 8A. An Android system is used as an example. The software structure of the electronic device includes an application layer, an application framework layer, an Android runtime (Android runtime), a system library, a kernel layer, a hardware abstraction layer (hardware abstraction layer, HAL), and a hardware layer from top to bottom.

Figure 8A:
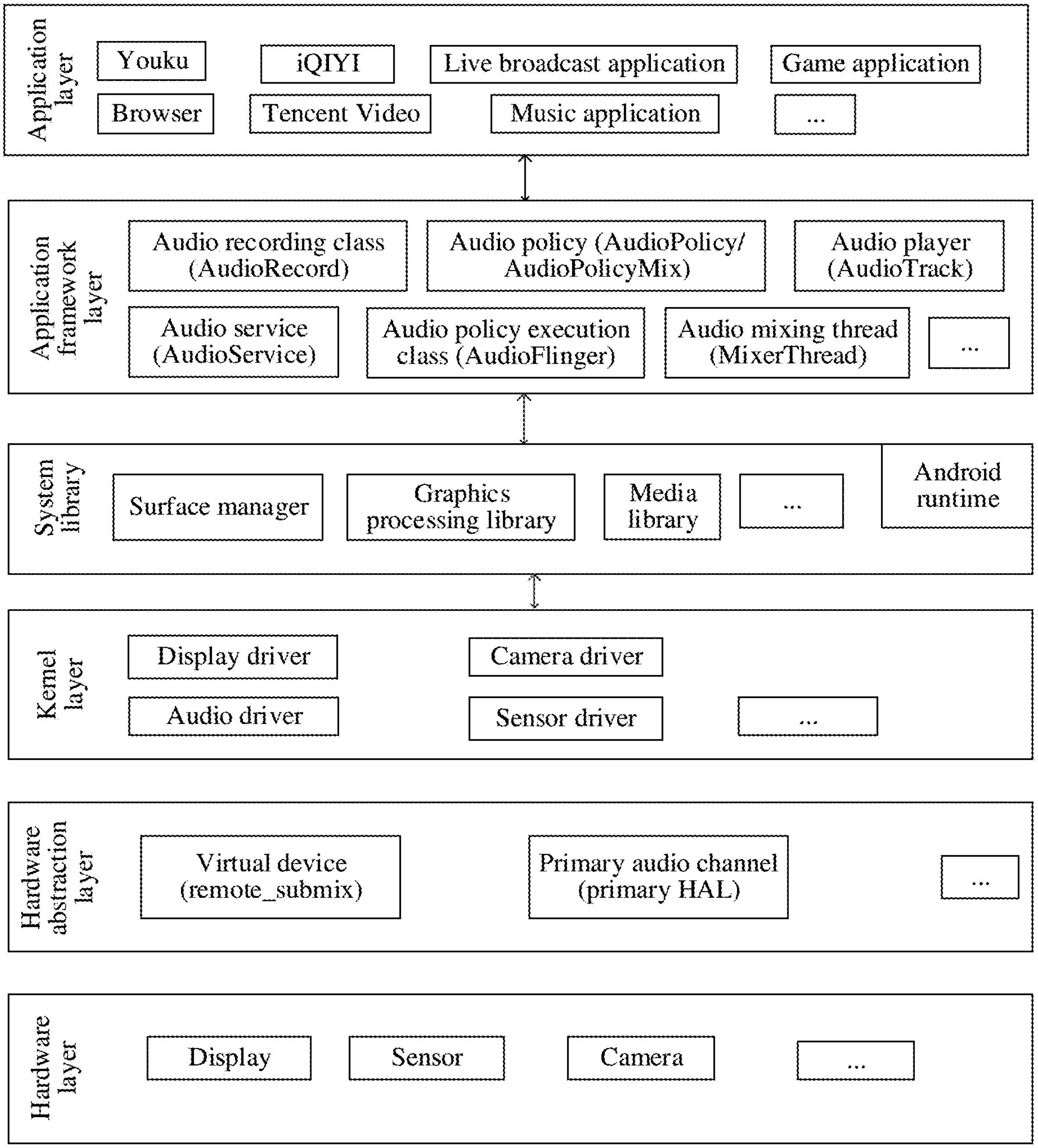
FIG. 8A is a schematic diagram of a software architecture according to an embodiment of this application.

The application layer may include a series of application packages. As shown in FIG. 8A, applications such as a browser, Youku, Tencent Video, Map, iQIYI, a game application (for example, Arena of Valor), a live broadcast application (for example, TikTok), and a music application (for example, NetEase CloudMusic) may be installed at the application layer.

The application framework layer may include an audio service (AudioService), an audio recording class (AudioRecord), an audio policy (AudioPolicy/AudioPolicyMix), an audio policy executor (AudioFlinger), an audio player (AudioTrack), and an audio mixing thread (MixerThread). Certainly, the application framework layer may further include a display strategy service (display strategy service, DSS), a power manager service (power manager service, PMS), a display manager service (display manager service, DMS), an activity manager, a window manager, a content provider, a view system, a resource manager, a notification manager, and the like.

The audio recording class (AudioRecord) is responsible for capturing recording data.

The audio policy (AudioPolicy/AudioPolicyMix) is responsible for policy selection for audio device switching, a volume adjustment policy, and the like.

The audio policy executor (AudioFlinger) is responsible for management of a stream input/output device and processing and transmission of audio stream data.

The audio player (AudioTrack) is responsible for outputting audio data.

The audio mixing thread (MixerThread) is responsible for mixing audio data and outputting mixed audio data to an audio device.

The Android runtime includes a kernel library and a virtual machine. The Android runtime is a runtime environment of the Android operating system and is responsible for scheduling and management of the Android operating system.

The kernel library includes two parts: a function that needs to be invoked by using the Java language, and a kernel library of the Android operating system.

The application layer and the application framework layer run in the virtual machine. The virtual machine executes a binary file of a Java file at the application layer and the application framework layer. The virtual machine is configured to perform functions such as object lifecycle management, stack management, thread management, security and abnormity management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of audio and videos in a plurality of formats, and supports opening of static images in a plurality of formats. The media library can support a plurality of audio and video coding formats, such as MPEG-4, H.264, MP3, AAC, AMR, JPG, and PNG.

The graphics processing library is configured to implement three-dimensional graphics drawing, image rendering, composition, layer processing, and the like. The 2D graphics engine is a drawing engine for 2D drawing.

The kernel layer is a layer between hardware and software of the electronic device. The kernel layer includes at least a display driver, a sensor driver, a camera driver, an audio driver, and the like, and is configured to drive hardware at the hardware layer.

The hardware abstraction layer HAL is an interface layer located between the kernel layer of the operating system and a hardware circuit, and aims to abstract hardware. The hardware abstraction layer hides details of a hardware interface of a specific platform and provides a virtual hardware platform for the operating system, so that the operating system is hardware-independent and can be transplanted on a plurality of platforms. From a perspective of software and hardware testing, software and hardware testing can be completed separately based on the hardware abstraction layer. This makes it possible to perform software and hardware testing in parallel.

The hardware abstraction layer HAL may include a primary audio channel (primary HAL) and a virtual device (remote_submix).

The primary audio channel (primary HAL) corresponds to a speaker, a headset, or the like, and the virtual device (remote_submix) is configured to record a system sound.

The hardware layer may include various sensors (for example, a touch sensor), a display, a camera, and the like.

Figure 8B:
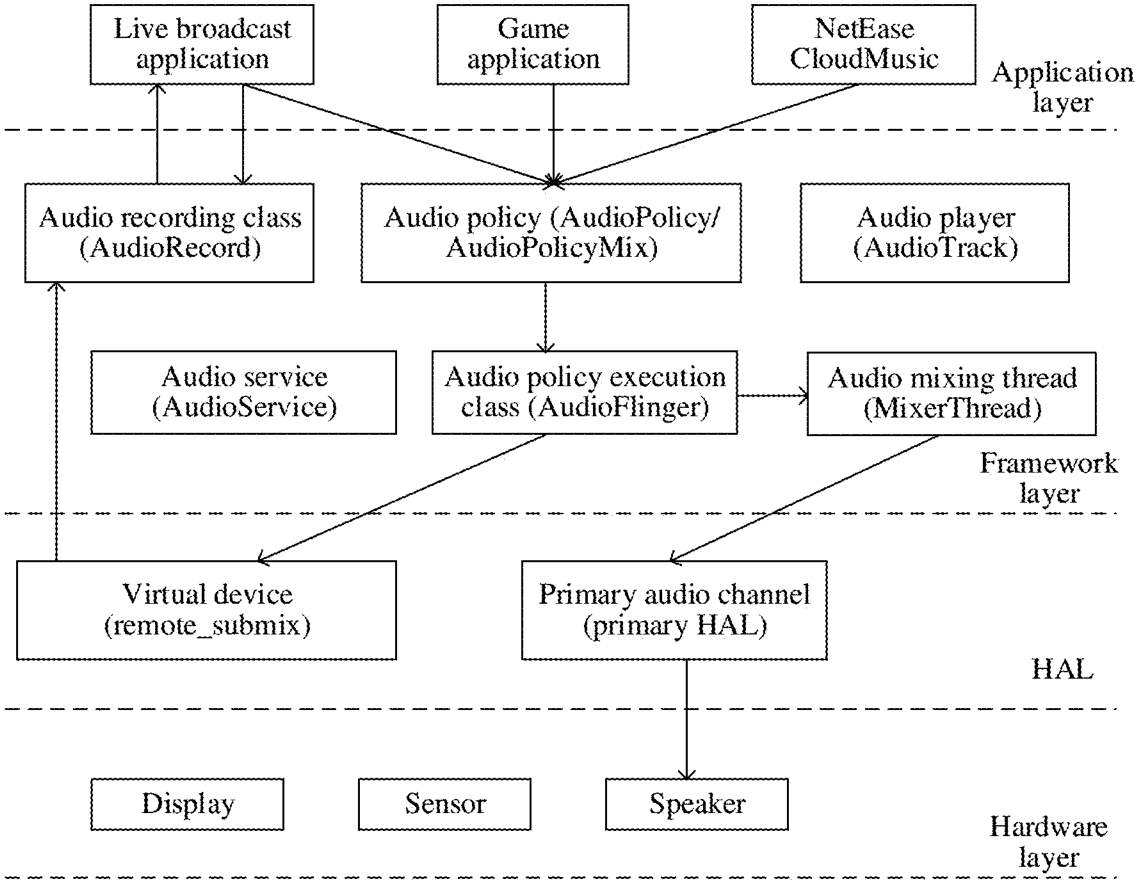
FIG. 8B is a schematic diagram of a data flow direction in an Android operating system according to an embodiment of this application.

FIG. 8B is a schematic diagram of a data flow direction in an Android operating system according to an embodiment of this application. For example, in this embodiment of this application, a live broadcast application at an application layer requests a required audio stream with at least one type mark. After receiving the request, an audio system at a framework layer marks a played audio stream. Then, the type mark required by the live broadcast application is obtained through screening from at least two type marks obtained through marking, and an audio stream with at least one type mark obtained through screening is sent to a virtual device (remote_submix) at a hardware abstraction layer HAL. Subsequently, the audio stream with the at least one type mark is recorded by using an audio recording class (AudioRecord) at the framework layer, and finally the recorded audio stream is sent to the live broadcast application at the application layer.

Figure 8C:
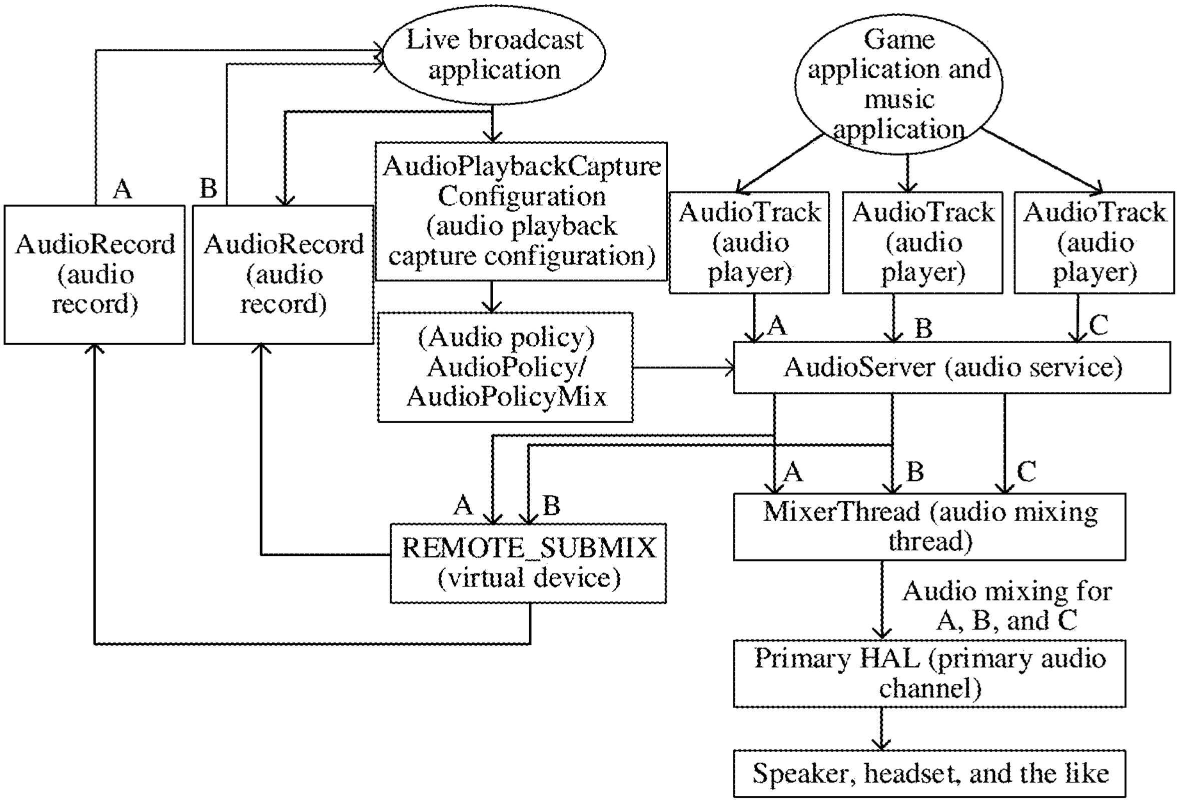
FIG. 8C is a flowchart of an audio data recording method based on an internal module of an Android operating system according to an embodiment of this application.

Similar to FIG. 8B, FIG. 8C is a flowchart of an audio data recording method based on an internal module of an Android operating system. For example, a live broadcast application creates a class (AudioPlaybackCaptureConfiguration), and the live broadcast application invokes a newly added interface (addSoundFlags) to request a required type mark. In addition, the live broadcast application creates an audio recording class (AudioRecorder) for recording. AudioPlaybackCaptureConfiguration may send the request for the required audio stream type mark to an audio policy (AudioPolicy/AudioPolicymix). After receiving the request for the audio stream type mark, the audio policy (AudioPolicy/AudioPolicyMix) notifies an audio service (AudioService) to change an audio output policy (the audio output policy is changed from outputting to only a speaker, a headset, and the like to outputting an audio stream with the audio stream type mark requested by the live broadcast application to a virtual device before audio mixing, and mixing audio streams of different types and outputting a mixed audio stream to the speaker, the headset, and the like). The audio service (AudioService) receives audio streams with different type marks that are output by a game application and a music application by using a plurality of audio players (AudioTrack), and then obtains a corresponding audio stream type mark from the audio stream type marks through screening based on the request of the live broadcast application. Then, the audio service (AudioService) may copy the audio streams and classify the audio streams into two channels for transmission. One channel of audio stream data is sent to an audio mixing thread (MixerThread) to mix various audio streams, and then a mixed audio stream is sent to the speaker, the headset, and the like. On the other channel, an audio stream with at least one type mark required by the live broadcast application is sent to a virtual device (remote_submix), then the audio stream with the at least one type mark is recorded by using an audio recording class (AudioRecord), and finally the recorded audio stream is sent to the live broadcast application at an application layer. To be specific, in the solution in this embodiment of this application, before audio streams with three type marks A, B, and C are sent to the audio mixing thread (MixerThread) for audio mixing, audio streams with type marks A and B may be obtained through screening, and then sent to the virtual device (remote_submix). In this way, audio data subsequently received by the live broadcast application is two pieces of audio data, including audio data with the type mark A and audio data with the type mark B, instead of one piece of audio data in the conventional technology.

For specific functions of the modules, refer to related descriptions in FIG. 8B. Details are not described herein again.

The following embodiments are described by using application to the architecture of the electronic device shown in FIG. 2 as an example.

Figure 9:
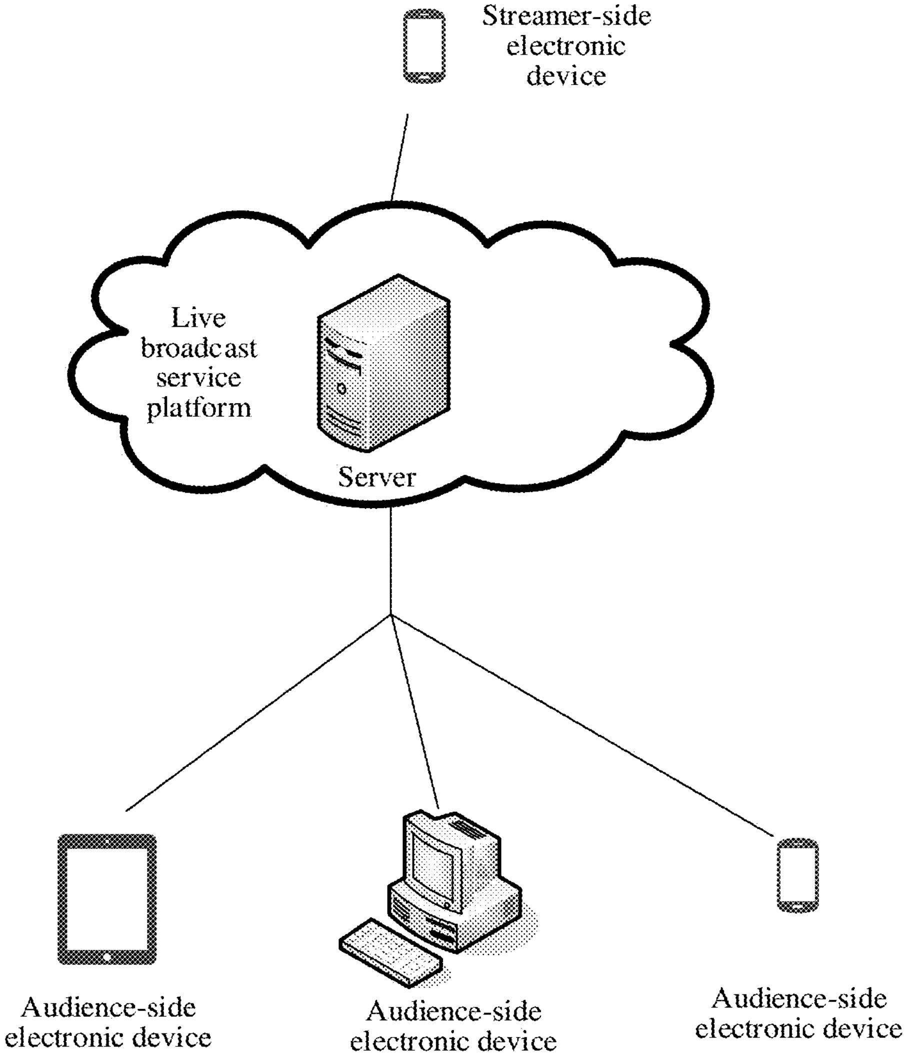
FIG. 9 is a schematic diagram of an application scenario according to an embodiment of this application.

FIG. 9 is a schematic diagram of an application scenario according to an embodiment of this application. As shown in FIG. 9, the scenario may include electronic devices and a live broadcast service platform. The electronic devices include a streamer-side electronic device and an audience-side electronic device, and the live broadcast service platform may include at least one server.

The streamer-side electronic device is configured to capture a real-time original live video, and upload the captured original live video to the server on the live broadcast service platform according to a specified video transmission protocol. For example, in a live game scenario, the original live video captured by the streamer-side electronic device includes a game video currently displayed on a display, and further includes a streamer video that includes a streamer and that is captured by a camera apparatus.

In this embodiment of this application, a live broadcast application, a music-related application, a game-related application, and the like may be installed on the streamer-side electronic device. In the live game scenario, the streamer may open the music-related application to play music while performing game live broadcast, to adjust the atmosphere and the like.

It should be noted that the application scenario in this embodiment of this application may include a music application, or may not include a music application. This is not limited in this application.

The server on the live broadcast service platform is configured to receive the original live video from the streamer-side electronic device, and perform transcoding processing on the original live video to generate a plurality of target live videos with different bit rates and formats, to play the target live videos on the audience-side electronic device.

The audience-side electronic device is configured to receive and play the target live videos. In this application scenario, the audience may send bullet comments by using the audience-side electronic device, enter comment information in a comment area, and the like. The audience-side electronic device may upload conventional comment information sent by a user to the server, and then the server distributes the comment information to another audience-side electronic device.

The following describes in detail an audio recording method in embodiments of this application with reference to the accompanying drawings.

It should be understood that "audio data" and "audio stream" in embodiments of this application may be used interchangeably sometimes, but meanings of "audio data" and "audio stream" are the same.

Figure 10:
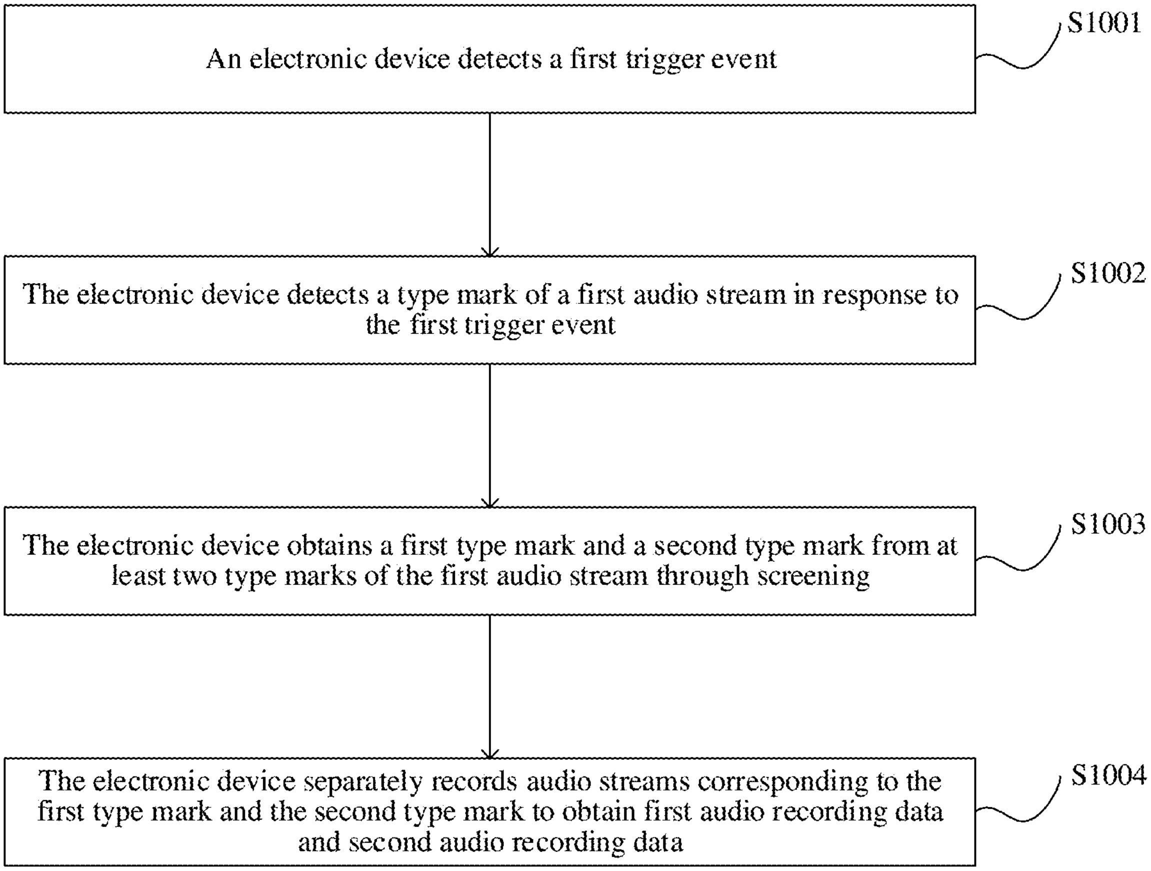
FIG. 10 is a flowchart of an audio recording method according to an embodiment of this application.

FIG. 10 is a flowchart of an audio recording method according to an embodiment of this application. As shown in FIG. 10, the method may include the following steps.

S1001: An electronic device detects a first trigger event.

It should be understood that the electronic device herein may be the streamer-side electronic device in the application scenario shown in FIG. 9.

The first trigger event may be a selection operation event performed by a user (streamer) on audio stream type marks (denoted as a first type mark and a second type mark below) in an interface of a first application, or a selection event performed by a first application on audio stream type marks according to a specified rule.

It should be understood that in this embodiment of this application, only two type marks are used as an example for description. In actual application, there may alternatively be one type mark, three type marks, or the like. This is not limited in this application.

For ease of description, in this embodiment of this application, the "first application" may be understood as a "live broadcast application", a "second application" may be understood as a "game application", and a "third application" may be understood as a "music application".

In a possible implementation, before step S1001 is performed, the streamer-side electronic device may log in to a live broadcast client based on an operation of the streamer, for example, by using a user account of the streamer, and create a live broadcast room. Then, the streamer-side electronic device obtains an original live video, and uploads the original live video to a server on a live broadcast service platform. Subsequently, the server on the live broadcast service platform performs transcoding processing on the original live video to generate a target live video, to play the target live video on an audience-side electronic device.

The following describes step S1001 in detail with reference to two possible implementations of the first trigger event.

Implementation 1: The user performs a selection operation on the first type mark and the second type mark in the interface of the first application.

In some embodiments, an application in the electronic device, for example, the first application, may provide a display interface for the user (streamer). The interface may display an audio stream and a type mark corresponding to the audio stream. Then, the streamer may perform selection in the interface according to a preference of the streamer and the like, for example, may choose to record an audio stream with a type mark A, and not to record an audio stream with a type mark B.

For example, game live broadcast is used as an example. It is assumed that a game live broadcast room has an interface 1100 shown in FIG. 11A and FIG. 11B. The interface 1100 may include an "audio recording" button 1101. After the streamer taps the "audio recording" button 1101 in the interface 1100, the electronic device may display a user interface 1110. The user interface 1110 may include a plurality of audio stream type marks, for example, may include a game audio stream 1111, a music audio stream 1112, and a streamer audio stream 1113. Certainly, the user interface 1110 may further include an OK button (or option) 1114.

In another example, after the streamer taps the "audio recording" button 1101 in the interface 100, the electronic device may display a user interface 1120. The user interface 1120 may include a plurality of audio stream type marks, for example, may include a game voice communication audio stream 1121, a spell casting audio stream 1122, a game background music audio stream 1123, a game character lines audio stream 1124, a game kill broadcast audio stream 1125, a music audio stream 1126, and a streamer audio stream 1127. Certainly, the user interface 1110 may further include an OK button (or option) 1128.

Certainly, the foregoing audio stream type mark is merely an example for description, and the audio stream type mark may alternatively be in another form. For example, the "audio recording" button 1101 may not be displayed in the user interface 1100, but a plurality of audio stream type marks are directly displayed. Alternatively, division may be performed in another manner. This is not limited.

The game background music audio stream 1123 may be understood as background music provided by a game (for example, Arena of Valor), and the music audio stream 1126 may be understood as an audio stream of music played by the streamer in the background. Certainly, it may be understood that the music played by the streamer may be music played on the streamer-side electronic device, or may be music played by the streamer on another electronic device. This is not limited in this application.

It should be noted that, a difference between the user interface 1120 and the user interface 1110 is only that the game audio stream 1111 in the user interface 1110 is specifically divided into the game voice communication audio stream 1121, the spell casting audio stream 1122, the game background music audio stream 1123, the game character lines audio stream 1124, and the game kill broadcast audio stream 1125.

In this manner, the streamer may record an audio stream according to a preference, a requirement, or the like of the streamer, to subsequently process the audio stream, so that user experience can be improved.

Implementation 2: The first application selects the first type mark and the second type mark according to the specified rule.

Figure 11A:
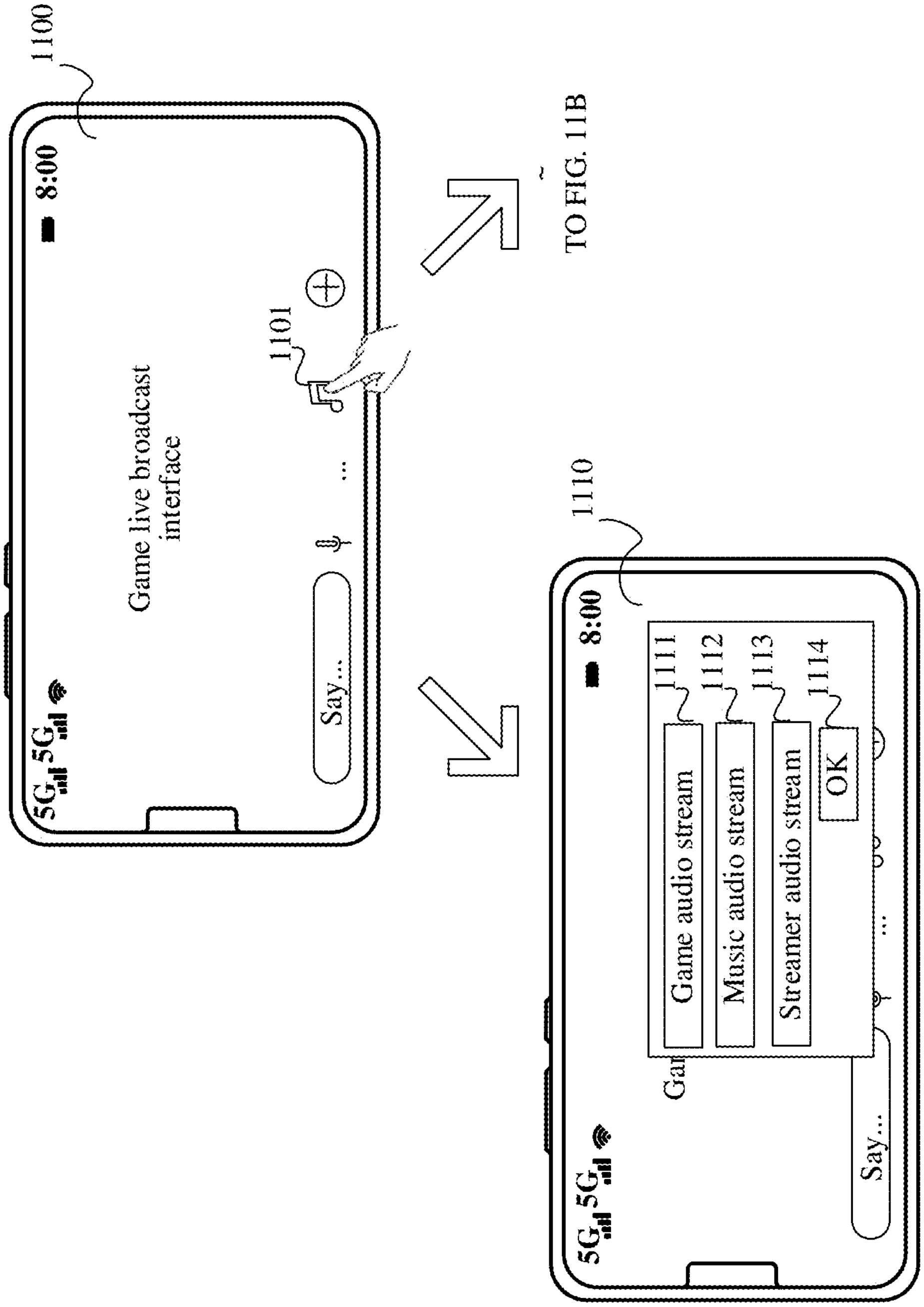
FIG. 11A and FIG. 11B are a schematic diagram of a user interface according to an embodiment of this application.
Figure 11B:
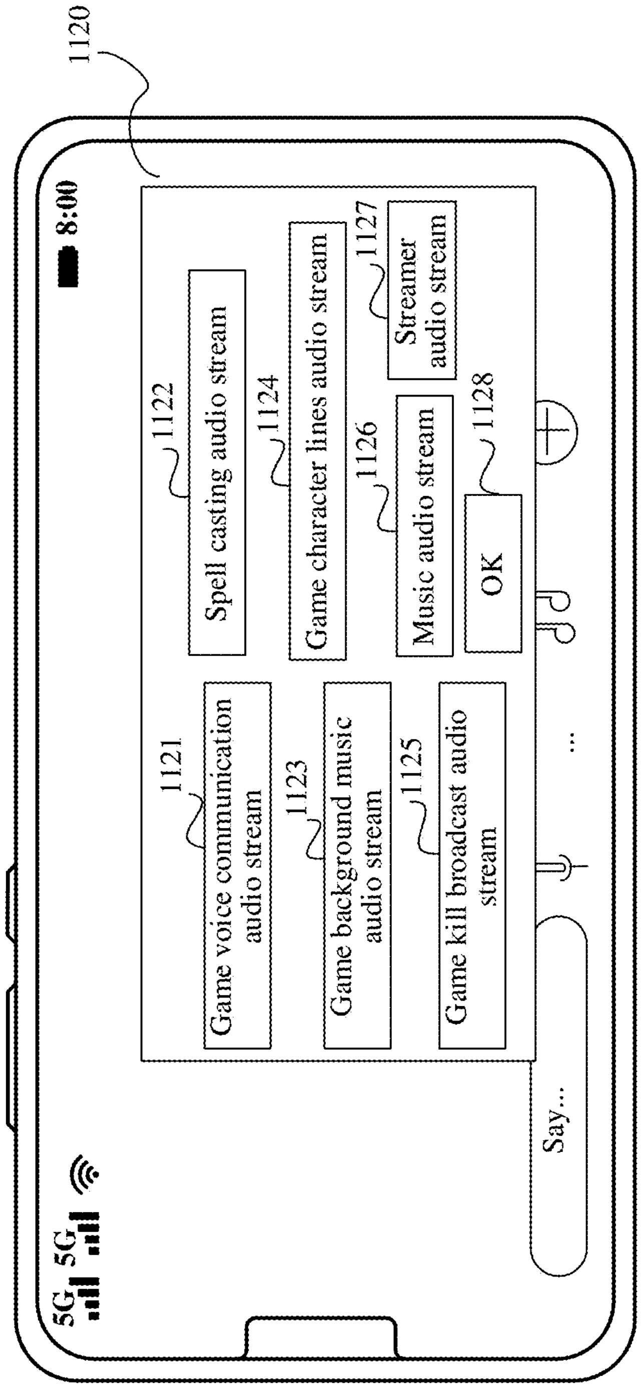

To be specific, the first type mark and the second type mark each may be a specified audio type mark, and the audio type mark may be an audio type mark specified by the user last time, or may be a configured audio type mark. For example, FIG. 11A and FIG. 11B are used as an example. After tapping the "audio recording" button 1101, the user may tap the OK button (or option) 1128 in the user interface. In this case, the electronic device uses the audio type mark specified by the user last time as the specified audio type mark.

In some other embodiments, an audio system of the electronic device may configure the specified rule for the first application. Then, after the first application is started, the first application may select a required audio stream type mark according to the rule configured by the system.

It should be noted that the rule configured by the audio system for the first application in this embodiment of this application may be a fixed rule, or may be a dynamic rule. This is not limited in this application.

In a possible implementation, the rule configured by the audio system for the first application may be configured based on a scenario. For example, for the rule configured by the audio system, refer to Table 1.

TABLE 1

| Rule configured by the audio system | |
|---|---|
| Scenario | Configured rule |
| A, B, C | A, B |
| | A, C |
| A, B | A |

It may be understood that the rule configured by the audio system and the corresponding table in this embodiment of this application are merely example descriptions. An identifier of the scenario in this application may alternatively be scenario 1, scenario 2, or the like, and a form of the rule configured by the audio system is not limited to the foregoing table.

It can be learned from the foregoing Table 1 that, for example, when a live broadcast scenario includes audio streams with three type marks A, B, and C, audio streams with the type marks A and B may be selected to be recorded, and an audio stream with the type mark C is not recorded; or audio streams with the type marks A and C may be selected to be recorded, and an audio stream with the type mark B is not recorded. When a live broadcast scenario includes audio streams with two type marks A and B, an audio stream with the type mark A may be selected to be recorded, and an audio stream with the type mark B is not recorded. Certainly, when a live broadcast scenario includes audio streams with three type marks A, B, and C, audio streams with the type marks B and C may be selected to be recorded. This is not limited in this application.

In another possible implementation, the audio system of the electronic device may configure the rule based on live broadcast duration of the streamer. For example, it is assumed that the live broadcast duration of the streamer is T. For example, when a live broadcast scenario includes audio streams with three type marks A, B, and C, for the rule configured by the audio system, refer to Table 2.

TABLE 2

| Rule configured by the audio system | |
|---|---|
| Duration | Configured rule |
| T < T1 | A, B, C |
| T1 < T < T2 | A, B |
| T > T2 | A |

For example, T1 is 20 minutes, and T2 is 40 minutes. It can be learned from Table 2 that, when the live broadcast duration of the streamer is less than 20 minutes, the configuration rule selected by the first application may be simultaneously recording audio streams with three type marks A, B, and C. When the live broadcast duration of the streamer is greater than 20 minutes and less than 40 minutes, the configuration rule selected by the first application may be recording audio streams with two type marks A and B and not recording an audio stream with a type mark C. When the live broadcast duration of the streamer is greater than 40 minutes, the configuration rule selected by the first application may be recording an audio stream with a type mark A and not recording an audio stream with a type mark B or C.

It should be understood that a value of T is merely an example, and is not limited to the foregoing value in this application.

It should be noted that the rule configured by the audio system of the electronic device for the first application is not limited to the foregoing example. For example, the audio system of the electronic device may alternatively configure the rule based on a live broadcast time period of the streamer, or certainly may configure the rule based on a quantity of audio streams. This is not limited in this application.

In this embodiment of this application, in the foregoing two implementations, a type mark of an audio stream determined to be recorded can be selected, for example, the first type mark and the second type mark. Certainly, in this application, selection of two or more type marks is used as an example.

S1002: The electronic device detects a type mark of a first audio stream in response to the first trigger event.

For ease of description, audio streams played in a current scenario are collectively referred to as "first audio stream", and an audio stream corresponding to the first type mark and an audio stream corresponding to the second type mark in step S1001 are audio streams that are selected by the streamer and that are expected to be recorded or audio streams selected by the application.

After detecting a target trigger event, the electronic device may respond to the target trigger event, and then detect a type mark of an audio stream played in the current scenario. In this embodiment of this application, the electronic device may detect the type mark of the currently played audio stream in the following two manners.

Manner 1: The electronic device invokes the audio system, and the audio system marks the first audio stream. Then, the electronic device detects, based on a marking result of the audio system, the type mark of the currently played audio stream.

For example, the first audio stream includes an audio stream in a game application and an audio stream in a music application. FIG. 8C is used as an example. After the first audio stream is played by AudioTrack, the audio system marks the first audio stream, for example, marks the first audio stream with a type A, B, or C, and then sends an audio stream with a mark to an AudioServer module.

In a possible implementation, the audio system may mark the audio stream by using audio parameters in a plurality of modules (for example, an audio attribute (AudioAttributes) module, a media session (Mediasession) module, and a media provider (MediaProvider) module). For example, a type of the audio stream, a length of the audio stream, and the like may be obtained, and then marking is performed based on the obtained audio parameters. For example, a marking rule may be shown in Table 3.

TABLE 3

Marking rule for an audio stream

| USAGE (type) | LENGTH (length) | SINGER (singer) | Mark |
|---|---|---|---|
| GAME | SHORT | / | Short sound (spell casting and the like) in a game |
| GAME | LONG | / | Long sound (background music and the like) in a game |
| MEDIA | LONG | Jay Chou | Music of a male singer |
| VOICE_COMMICATION | LONG | / | Team voice in a game |

It should be understood that the foregoing table is merely an example description. In this application, after the audio system completes marking, marked content may be stored in the audio system, for example, may be stored in the audio attribute (AudioAttributes) module.

Manner 2: The electronic device invokes an application, and the application marks the played first audio stream. Then, the electronic device detects, based on a marking result of the application, the type mark of the currently played audio stream.

For example, the first audio stream includes an audio stream in a game application and an audio stream in a music application. FIG. 8C is used as an example. Before the first audio stream is played by AudioTrack, the game application and the music application each may mark an audio stream played by the application, for example, mark the audio stream with a type A, B, or C, and then send an audio stream with a mark to an AudioServer module.

S1003: The electronic device obtains the first type mark and the second type mark from at least two type marks of the first audio stream through screening.

In this embodiment of this application, after the audio system or the application marks the audio stream, the electronic device may determine the type mark of the first audio stream, and then select the audio stream type mark required in S1001 from the type mark of the first audio stream. For example, audio stream type marks required in S1001 correspond to audio streams with type marks A and B, and types of the first audio stream that are determined in S1002 include type marks A, B, and C. That is, the first audio stream includes the audio streams corresponding to the audio stream type marks required in S1001.

S1004: The electronic device separately records audio streams corresponding to the first type mark and the second type mark, to obtain first audio recording data and second audio recording data.

For example, the user/application chooses to record audio streams corresponding to two audio stream type marks. In S1001, the user/application selects the two audio stream type marks. Then, in S1003, the electronic device selects the two audio stream type marks, and separately records audio streams corresponding to the two required audio stream type marks, to obtain two pieces of recording data. In this way, recording data of a plurality of different types of audio streams can be obtained, instead of recording data of one piece of mixed data in the conventional technology.

The foregoing process is described with respect to the streamer-side electronic device, and the following provides descriptions with reference to an audience-side electronic device.

Figure 12:
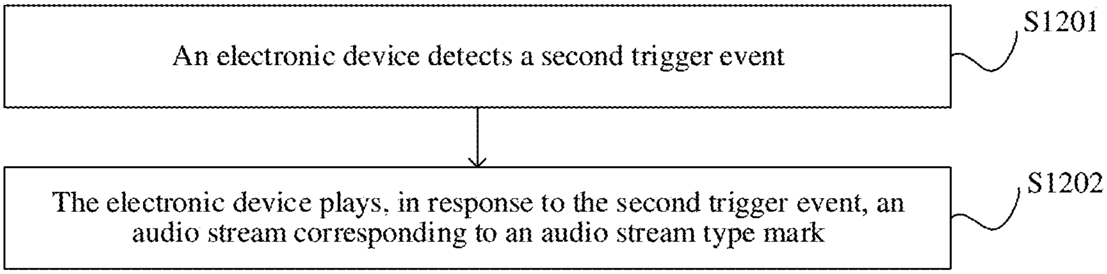
FIG. 12 is a flowchart of an audio playing method according to an embodiment of this application.

FIG. 12 is a flowchart of an audio playing method according to an embodiment of this application. As shown in FIG. 12, the method may include the following steps.

S1201: An electronic device detects a second trigger event.

The electronic device herein may be the audience-side electronic device in the application scenario shown in FIG. 9. The audience-side electronic device may log in to a live broadcast client based on an operation of an audience member, for example, by using a user account of the audience member, find a live broadcast room in the live broadcast client, and then enter the live broadcast room to watch a target live video.

The second trigger event may be a selection operation event performed by a user (audience) on an audio stream type mark in an interface of a first application, or a selection event performed by a first application on an audio stream type mark.

The following describes S1201 with reference to two possible implementations of the second trigger event.

Implementation 1: The user (audience) selects an audio stream type mark.

In some embodiments, an application in the electronic device, for example, the first application, may provide a display interface for the user (audience). The interface may display an audio stream included in a current live broadcast scenario and a type mark corresponding to the audio stream. Then, the user may perform selection in the interface according to a preference of the user and the like. For example, the user may choose to play an audio stream with a type mark A, and not to play an audio stream with a type mark B, or choose to lower volume of an audio stream with a type mark B.

For example, FIG. 11A and FIG. 11B are used as an example. It is assumed that an audience member enters a game live broadcast room. In this case, for example, the audience-side electronic device displays an interface 1100. An "audio recording" button 1101 may be included in the interface 1100. After the audience member taps the "audio recording" button 1101 in the interface 1100, the electronic device may display a user interface 1120. The user interface 1120 may include an audio stream type of a streamer in the live broadcast scenario, for example, may include a game voice communication audio stream 1121, a spell casting audio stream 1122, a game background music audio stream 1123, a game character lines audio stream 1124, a game kill broadcast audio stream 1125, a music (Media) audio stream 1126, and a streamer audio stream 1127.

It should be understood that the schematic interface diagrams of the live broadcast interface displayed on the streamer-side electronic device and the live broadcast interface displayed on the audience-side electronic device are merely example descriptions. An icon, a name, and the like displayed in the interface are not limited in this application.

Certainly, if the user selects an audio stream to be played, the interface may further include an "on" button, an "off" button, and the like. For example, after the user chooses to play the game voice communication audio stream 1121 and the spell casting audio stream 1122, the user may tap the "on" button. After the user chooses not to play the game background music audio stream 1123, the user may tap the "off" button.

Implementation 2: The first application selects an audio stream according to a specified rule.

The audience-side electronic device may configure the specified rule for the first application. Then, after the audience member starts the first application and enters the live broadcast room, the first application may select, according to the rule configured by the system, an audio stream corresponding to the required audio stream type mark. For example, the rule may be configured based on duration for which the audience member watches the live broadcast, and the first application selects the audio stream based on the watching duration. It is assumed that the duration of watching the live broadcast is T. When the duration T of watching the live broadcast is less than T1, the configuration rule selected by the first application may be playing audio streams with three type marks A, B, and C at the same time. When the duration T of watching the live broadcast is greater than T1 and less than T2, the configuration rule selected by the first application may be playing audio streams with two type marks A and B and not playing an audio stream with a type mark C. When the duration T of watching the live broadcast is greater than T2, the configuration rule selected by the first application may be playing an audio stream with a type mark A and not playing an audio stream with a type mark B or C.

Certainly, the foregoing rule is merely an example. In this embodiment of this application, the rule may alternatively be configured in another manner. For example, the rule may be configured based on a quantity of times that the audience member enters the live broadcast room. This is not limited in this application.

S1202: The electronic device plays, in response to the second trigger event, an audio stream corresponding to the audio stream type mark.

In this embodiment of this application, the electronic device may play the audio stream corresponding to the audio stream type mark. In this way, for the user, it can be convenient for the user to select an expected audio stream according to a requirement of the user, or some possible requirements may be provided for the user according to the rule configured by the audio system, for example, some audio is loud, and long-time playing may trouble the user. This improves user experience of watching the live broadcast.

In this manner, the user (audience) may set a type of a to-be-played audio stream according to a preference, a requirement, or the like of the user, so that user experience can be improved.

It can be learned from the foregoing embodiment that, in a video recording process or an audio recording process, a plurality of applications may simultaneously play audio. Currently, when a plurality of applications simultaneously play audio, audio streams of the plurality of applications are output together, that is, a user hears the audio of the plurality of applications. In this case, noise and chaos may occur. Therefore, how to avoid noise and chaos when a plurality of sound-producing applications are started at the same time is a problem to be resolved.

It should be understood that various types of applications, such as a music application, a book listening application, and a video application, may be installed on the electronic device. Some applications are related to audio, and these applications related to audio may be referred to as sound-producing applications.

The following describes an audio playing method by using two applications as an example, where one application is in the foreground, and the other application is in the background. The application running in the foreground is an application that is currently running on the electronic device and is being displayed on a display. The application running in the background is an application that is currently running on the electronic device but is not displayed on a display. Running in the foreground means that the application is running, and a display interface of the application is displayed on the display. Running in the background means that the application is running, but a display interface of the application is not displayed on the display.

A mobile phone is used as an example to explain the foregoing concepts. A display of the mobile phone is displaying a display interface of a map application (such as Amap). In this case, the map application runs in the foreground. If the mobile phone receives an incoming call in a process of displaying the display interface of the map application, the display displays an incoming call interface (an interface including a caller number and controls such as accept and decline), and does not display the display interface of the map application. In this case, the map application is switched to the background for running, and a phone application runs in the foreground.

An audio playing method is described below by using an example in which the audio playing method is applied to the architecture of the electronic device shown in FIG. 2.

Figure 13A:
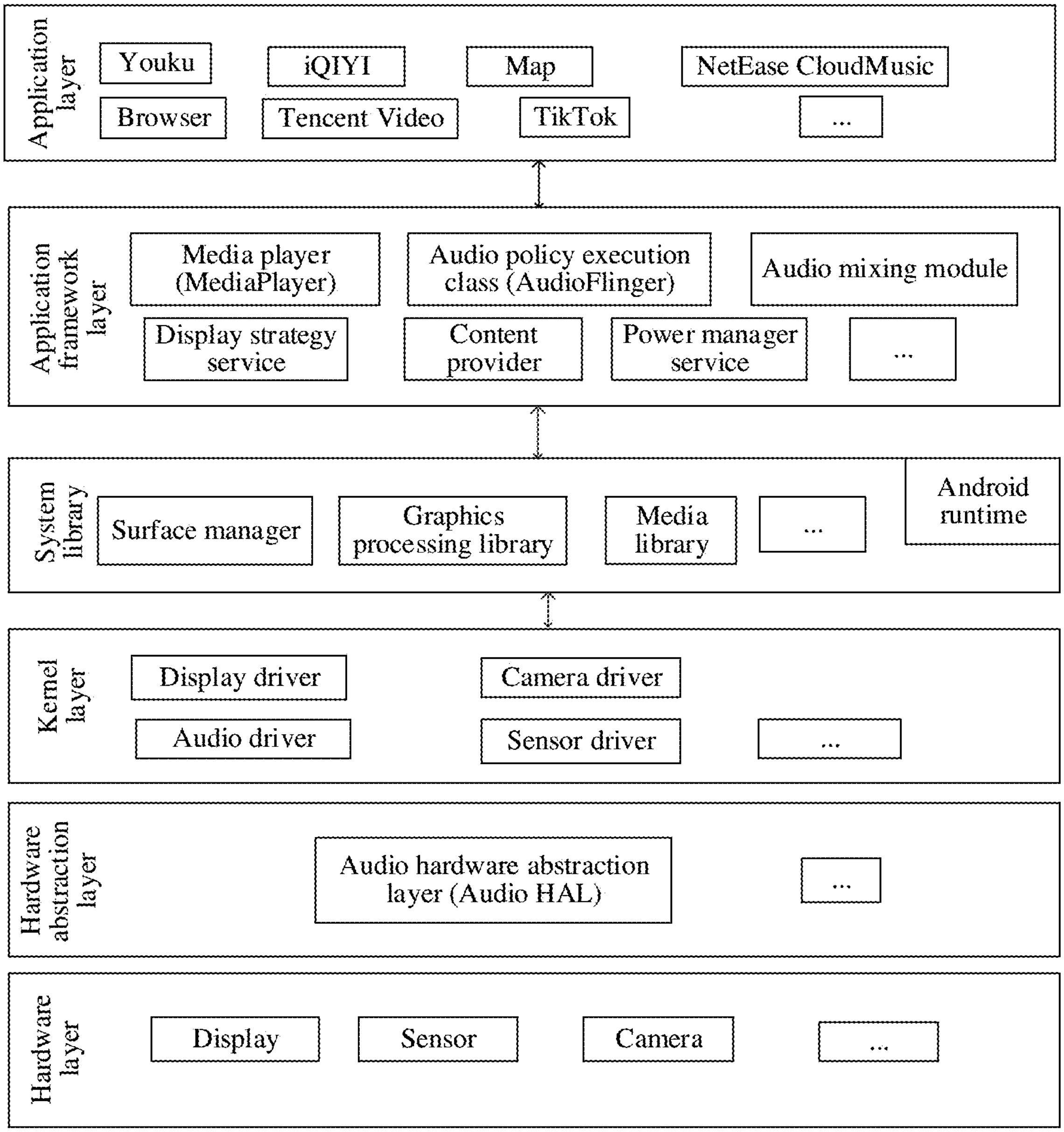
FIG. 13A is a schematic diagram of a software architecture according to an embodiment of this application.

FIG. 13A is a block diagram of a software structure of an electronic device to which an audio playing method is applied according to an embodiment of this application. An Android system is used as an example. As shown in FIG. 13A, applications such as a browser, Youku, Tencent Video, Map, iQIYI, TikTok, and NetEase CloudMusic may be installed at an application layer. An application framework layer may include a media player (MediaPlayer), an audio policy executor (AudioFlinger), and an audio mixing module.

The media player (MediaPlayer) is responsible for outputting audio data of an application running in the foreground or background. It should be understood that the media player (MediaPlayer) is merely an example, and an audio playing interface may alternatively be AudioTrack or the like. This is not limited in this application.

The audio policy executor (AudioFlinger) is responsible for management of a stream input/output device and processing and transmission of audio stream data.

The audio mixing module is responsible for mixing audio data and outputting mixed audio data to an audio device.

A hardware abstraction layer HAL may include an audio hardware abstraction layer (Audio HAL). The audio HAL is responsible for interacting with an audio hardware device, and may be directly invoked by the audio policy executor AudioFlinger at the framework layer.

It should be understood that, for descriptions of function modules such as a system library and a kernel layer in the following embodiments, refer to descriptions in the embodiment shown in FIG. 8A. Details are not described below again.

Figure 13B:
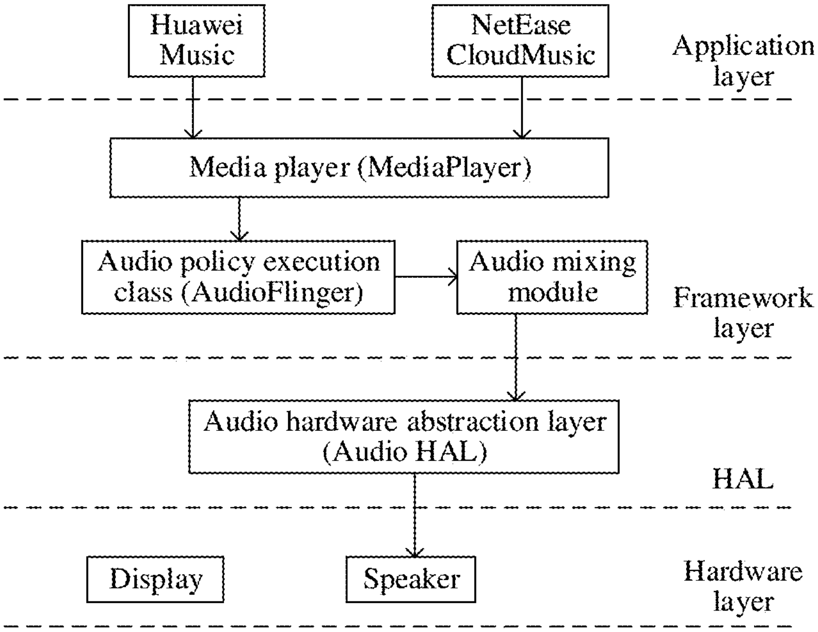
FIG. 13B is a schematic diagram of a data flow direction in an Android operating system according to an embodiment of this application.

FIG. 13B is a schematic diagram of a data flow direction in an Android operating system according to an embodiment of this application. For example, in this embodiment of this application, an application running in the foreground/background (which is referred to as a foreground/background application for short below) may invoke the media player (MediaPlayer) at the framework layer. Then, an audio stream played by the foreground/background application is output, and the output audio stream is sent to AudioFlinger. AudioFlinger sends the audio stream to the audio mixing module. The audio mixing module processes the audio stream and provides a corresponding audio mixing policy. Finally, the audio mixing module at the framework layer invokes AudioHAL at the hardware abstraction layer HAL, and AudioHAL sends the output audio stream to a device at the hardware layer for playing.

Figure 13C:
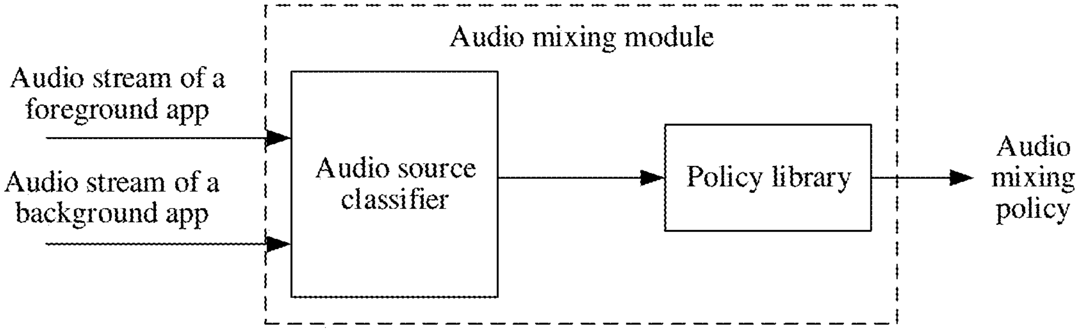
FIG. 13C is a schematic diagram of a software module according to an embodiment of this application.

FIG. 13C is a schematic diagram of a software module according to an embodiment of this application. Specifically, foreground and background applications may send respective audio streams to the audio mixing module, and an audio source classifier in the audio mixing module identifies and classifies the audio streams of the foreground and background applications, and then sends the audio streams to a policy library of the audio mixing module. The policy library provides a corresponding audio mixing policy based on an identification and classification result of the audio streams. It should be noted that, in the schematic diagram shown in FIG. 13C, the audio mixing module in the schematic diagram shown in FIG. 13B is specifically subdivided into the audio source classifier and the policy library.

It should be noted that the audio playing method in this embodiment of this application is applicable to a single device, and is also applicable to a multi-device distributed collaboration scenario. For example, audio (such as navigation and music) on a mobile phone may be projected onto an in-vehicle head unit, and the in-vehicle head unit determines how to play the audio.

Figure 14:
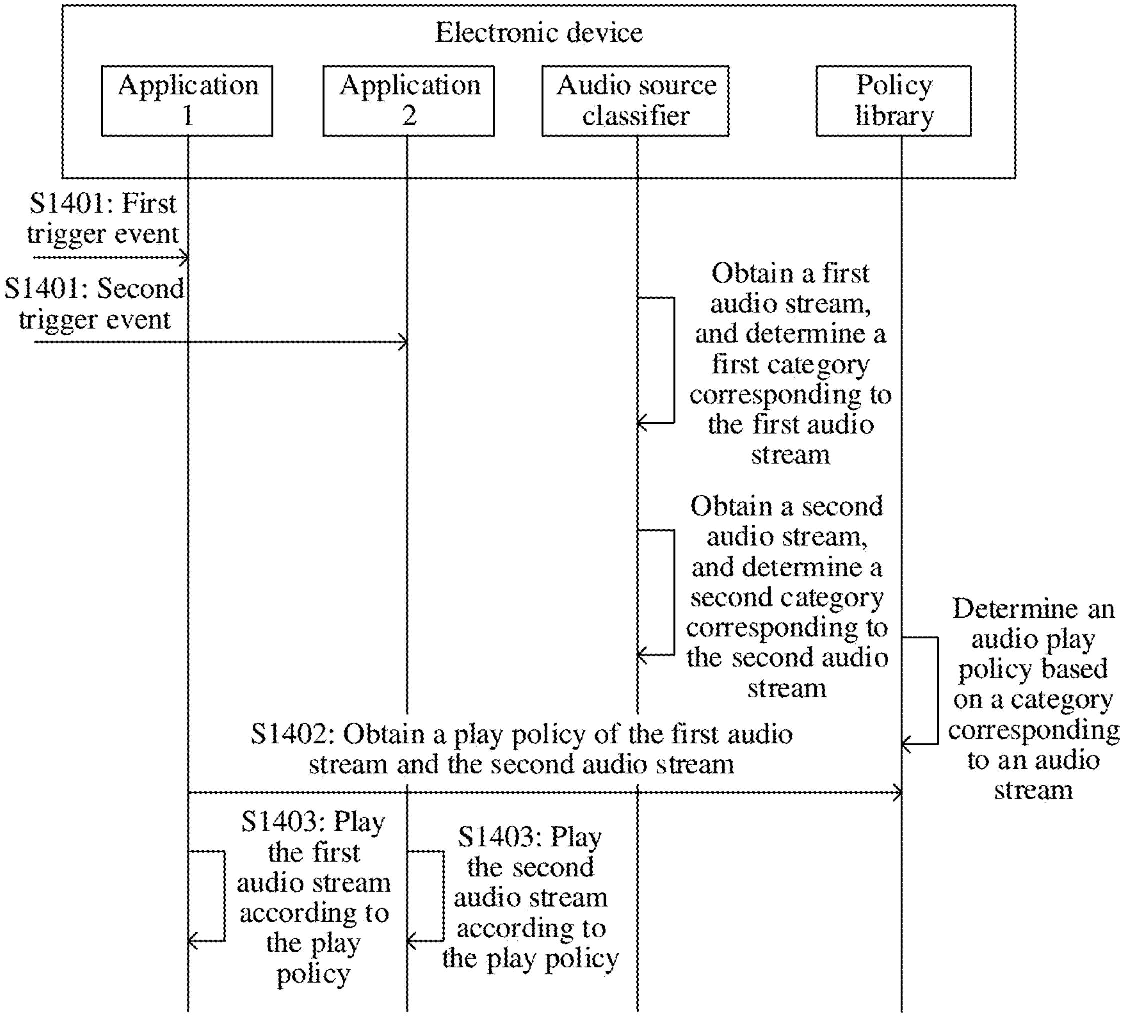
FIG. 14 is a flowchart of an audio playing method according to an embodiment of this application.

FIG. 14 is a flowchart of an audio playing method according to an embodiment of this application. As shown in FIG. 14, the method may include the following steps.

S1401: An electronic device receives a first trigger event and a second trigger event.

A trigger event may be an operation event that a user taps an icon of an application, or may be a tap operation event that a user plays music on an application, or may be an operation event that a user opens an application and plays music in a voice manner.

For example, the first trigger event may be an operation event of switching an application running in the foreground to the background for running, and the second trigger event may be an operation event of starting an application and displaying the application in the foreground.

S1402: The electronic device obtains an audio play policy of a first audio stream and a second audio stream in response to the first trigger event and the second trigger event.

It should be noted that the first audio stream and the second audio stream in this embodiment of this application are from different applications.

For ease of description, in this embodiment of this application, an audio stream played by a foreground application may be denoted as the "first audio stream", and an audio stream played by a background application may be denoted as the "second audio stream".

The following describes in detail a process of determining the audio play policy. The process may specifically include two steps: audio stream classification and play policy determining.

How to classify audio streams is first described.

In this embodiment of this application, an audio source classifier (which may also be referred to as an audio classification system or a classification module) in the electronic device may obtain a first audio attribute of the first audio stream from an application (a foreground application and a background application), and classify the first audio stream based on the first audio attribute, to obtain a first category corresponding to the first audio stream. Similarly, a second audio attribute of the second audio stream may be obtained, and the second audio stream is classified based on the second audio attribute, to obtain a second category corresponding to the second audio stream.

It should be understood that classification for the first audio stream and classification for the second audio stream may be performed in sequence, or may be performed simultaneously. This is not limited in this application.

For ease of description, in this embodiment of this application, an audio attribute of the first audio stream may be denoted as the "first audio attribute", an audio attribute of the second audio stream may be denoted as the "second audio attribute", a category corresponding to the first audio stream may be denoted as the "first category", and a category corresponding to the second audio stream may be denoted as the "second category".

In some embodiments, audio attributes (AudioAttributes) of an audio stream may include two attributes: a usage (USAGE) attribute and a content type (CONTENT_TYPE) attribute. It should be understood that the USAGE attribute and the CONTENT_TYPE attribute are audio attributes obtained by dividing the audio stream from different perspectives.

It should be noted that an audio attribute of an audio stream is configured by an application, and different audio streams may correspond to a same audio attribute or different audio attributes. Different audio streams from a same application may be configured with different audio attributes.

Figure 15A:
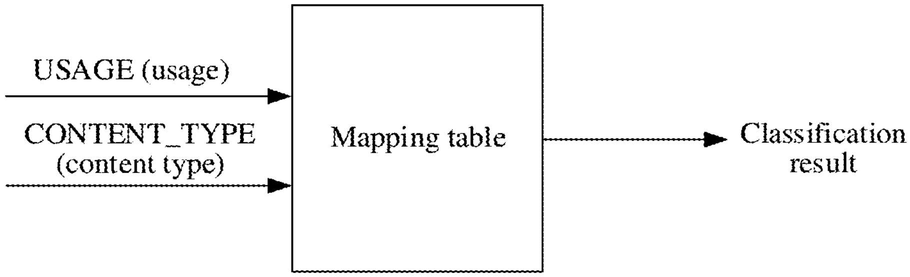
FIG. 15A is a schematic diagram of performing classification by using an audio attribute according to an embodiment of this application.

In this embodiment of this application, after the first audio stream and the second audio stream are obtained, an audio attribute of each audio stream may be obtained. Then, the audio source classifier in the electronic device may classify the audio stream based on the audio attribute of the audio stream, to determine a category corresponding to the audio stream. For example, as shown in FIG. 15A, the audio source classifier may classify the audio attribute (including a USAGE attribute/CONTENT_TYPE attribute) of the audio stream according to a mapping table, and determine a category to which the audio attribute belongs as the category corresponding to the audio stream.

In a possible implementation, for the category to which the audio attribute of the audio stream belongs (that is, the foregoing mapping table), refer to Table 4.

TABLE 4

| Audio attribute | Category |
|---|---|
| USAGE_VOICE_COMMUNICATION | Voice communication |
| USAGE_ALARM | Alarm |
| USAGE_ASSISTANCE_NAVIGATION_GUIDANCE | Voice navigation |
| USAGE_MEDIA | Media tone |
| USAGE_GAME | Game |

TABLE 4-continued

| Audio attribute | Category |
|---|---|
| CONTENT_TYPE_MOVIE | Movie |
| CONTENT_TYPE_MUSIC | Music |
| USAGE_VOICE_COMMUNICATION_SIGNALLING | Dial tone |
| USAGE_NOTIFICATION_TELEPHONY_RINGTONE | Incoming call ringtone |
| USAGE_NOTIFICATION_COMMUNICATION_REQUEST | |
| USAGE_ASSISTANCE_SONIFICATION | Operation/Event Tone |
| CONTENT_TYPE_SONIFICATION | |
| USAGE_NOTIFICATION_EVENT | Notification tone |
| USAGE_NOTIFICATION_COMMUNICATION_DELAYED | |
| USAGE_NOTIFICATION_COMMUNICATION_INSTANT | |
| USAGE_NOTIFICATION | |
| CONTENT_TYPE_SPEECH | Other |
| USAGE_ASSISTANCE_ACCESSIBILITY | |
| USAGE_ASSISTANT | |
| USAGE_UNKNOWN | |
| CONTENT_TYPE_UNKNOWN | |

It may be understood that Table 4 may be pre-stored in the electronic device. Certainly, a storage form is not limited to a form of the foregoing table. This is not limited in this application.

It should be noted that each audio stream may include a USAGE attribute and a CONTENT_TYPE attribute, and priorities of the USAGE attribute and the CONTENT_TYPE attribute may be the same or may be different. This is not limited in this application.

In some embodiments, the priorities of the USAGE attribute and the CONTENT_TYPE attribute are that the priority of the USAGE attribute is higher than the priority of the CONTENT_TYPE attribute. In this case, after obtaining the audio stream, the audio source classifier may first determine whether the USAGE attribute has a corresponding category. If the USAGE attribute has a corresponding category, the audio stream is assigned to the corresponding category. If the USAGE attribute has no corresponding category, whether the CONTENT_TYPE attribute has a corresponding category is determined. If the CONTENT_TYPE attribute has a corresponding category, the audio stream is assigned to the corresponding category.

For example, it is assumed that audio streams obtained by the audio source classifier include an audio stream 1 and an audio stream 2. The audio stream 1 is used as an example. For example, a USAGE attribute and a CONTENT_TYPE attribute included in the audio stream 1 are respectively USAGE_VOICE_COMMUNICATION and CONTENT_TYPE_MUSIC. In this case, the electronic device may determine whether the USAGE attribute, that is, USAGE_VOICE_COMMUNICATION, has a corresponding category. It can be learned from Table 4 that USAGE_VOICE_COMMUNICATION may be classified into a voice communication category. That is, if the USAGE attribute has a corresponding category, a category of the audio stream 1 may be determined as the voice communication category.

The following begins to describe a process of determining a play policy of an audio stream.

Figure 15B:
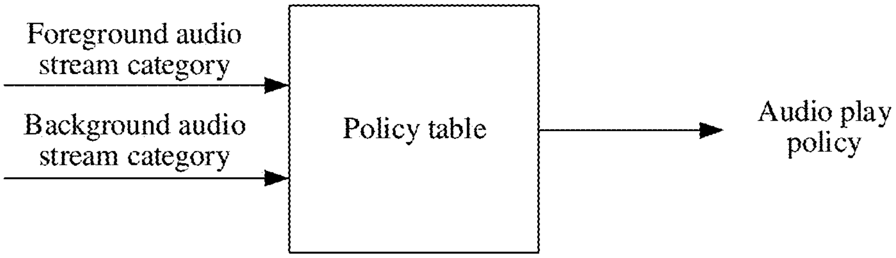
FIG. 15B is a schematic diagram of determining a play policy by using an audio category according to an embodiment of this application.

In some embodiments, after determining the categories to which the first audio stream and the second audio stream belong in S1403, the electronic device may determine a specific play policy of the audio streams based on the categories to which the two audio streams belong. For example, as shown in FIG. 15B, a foreground audio category and a background audio category may be input into a policy library, and then a specific audio play policy is obtained according to the policy library.

For example, it is assumed that a background application is KuGoo, and a foreground application is Himalaya. When KuGoo plays music, if a user opens Himalaya, KuGoo loses an audio focus and continues playing in the background. In this case, the electronic device identifies types of foreground and background audio streams. For example, if the type of the background audio stream is music (for example, heavy metal music), and the type of the foreground audio stream is media, it is necessary to determine how to play the audio streams when the types of the audio streams are music and media, to improve user experience.

It should be understood that "opening" an application in this embodiment of this application may mean starting the application and displaying the application in the foreground, or switching an application running in the foreground to the background for running.

In some embodiments, the electronic device may store a correspondence (that is, the foregoing policy table) between an audio category and an audio play policy. In a possible implementation, refer to the following Table 5.

It should be noted that the audio play policy in the following Table 5 is a policy specified for some scenarios with a relatively high probability of occurrence, or a scenario with a relatively high frequency of use by a user.

TABLE 5

| | Foreground audio source type | | | | | | | | | | | |
|---|---|---|---|---|---|---|---|---|---|---|---|---|
| Background audio source type | Voice communication | Alarm | Voice navigation | Media tone | Game | Movie | Music | Dial tone | Incoming call ring tone | Operation/Event tone | Notification tone | Other |
| | Recommened audio making policy | | | | | | | | | | | |
| Voice communication | — | — | — | — | — | — | — | — | — | — | — | — |
| Alarm | — | — | — | — | — | — | — | — | — | — | — | — |

TABLE 5-continued

| Background audio source type | Foreground audio source type: Voice communication | Alarm | Voice navigation | Media tone | Game | Movie | Music | Dial tone | Incoming call ring tone | Operation/ Event tone | Notification tone | Other |
|---|---|---|---|---|---|---|---|---|---|---|---|---|
| | Recommened audio making policy | | | | | | | | | | | |
| Voice navigation | Foreground | Foreground | — | Background | Background | Background | Background | Foreground | Foreground | Foreground | Foreground | Mixed |
| Media tone | Preemptive | Foreground | Preemptive | Preemptive | Preemptive | Preemptive | Preemptive | Preemptive | Preemptive | Foreground | Foreground | Mixed |
| Game | Preemptive | Foreground | Preemptive | Preemptive | Preemptive | Preemptive | Preemptive | Preemptive | Preemptive | Foreground | Foreground | Mixed |
| Movie | Preemptive | Foreground | Preemptive | Preemptive | Preemptive | Preemptive | Preemptive | Preemptive | Preemptive | Foreground | Foreground | Mixed |
| Music | Preemptive | Foreground | Foreground | Preemptive | Preemptive | Preemptive | Preemptive | Preemptive | Preemptive | Foreground | Foreground | Mixed |
| Dial tone | — | — | — | — | — | — | — | — | — | — | — | — |
| Incoming call ringtone | — | — | — | — | — | — | — | — | — | — | — | — |
| Operation/ Event tone | — | — | — | — | | — | — | — | — | — | — | — |
| Notification tone | — | — | — | — | — | — | — | — | — | — | — | — |
| Other | Foreground | Foreground | Foreground | Foreground | Foreground | Foreground | Foreground | Foreground | Foreground | Foreground | Foreground | Foreground |

It should be noted that "-" in the foregoing Table 5 indicates that a scenario occurrence probability is relatively low, and a default policy is used, that is, a foreground audio stream is played. "Foreground" indicates that only a foreground audio stream is output and a background audio stream is discarded. "Background" indicates that only a background audio stream is output and a foreground audio stream is discarded. "Mixed" indicates that foreground and background audio streams are mixed for output, that is, played at the same time. "Preemptive" indicates that a background audio stream is stopped and a foreground audio stream is played.

It should be understood that "discard" means that an audio stream is being played without a pause. For example, when a prompt tone is played during music listening, background music may continue to be played at this moment, but a user can hear only the prompt tone. "Stop" refers to suspending playing of an audio stream. For example, when a prompt tone is played during music listening, playing of background music may be suspended at this moment. After the prompt tone ends, playing of the background music may be continued.

The following conclusions can be learned from Table 5 (policy table).

Conclusion 1: If a foreground audio source type is short tone, such as an operation/event tone or a notification tone, a play policy is partial to "foreground". A main consideration is that duration of the short tone is short, and playing in the background can be continued after output is completed.

Conclusion 2: When voice navigation is in the background and music/video/game is in the foreground, a play policy is partial to a background navigation sound. A main consideration is that the navigation sound is a discontinuous medium/short sound and an application priority of the navigation sound is high. The navigation sound can be output during simultaneous occurrence, and a foreground sound can be output when there is no navigation sound.

Conclusion 3: When both a foreground sound and a background sound are of a game/video/music type, a play policy is partial to "preemptive". A sound from a background application is directly stopped, and only a foreground sound is retained.

Conclusion 4: A voice call has the highest priority, and a play policy is partial to preempt all background sounds. If a type of a background audio stream is navigation, only a call sound is output during the call, and a navigation sound can be output after the call ends.

Considering that preferences of different users may be different, in some other embodiments of this application, after the policy library provides the corresponding play policy according to Table 5, prompt information may be displayed on a display of the electronic device, to prompt the user whether to choose to play audio according to the policy recommended by the policy library. It should be noted that after the policy library provides the play policy, the prompt information may be displayed after preset duration (for example, 30 s).

Figure 16A:
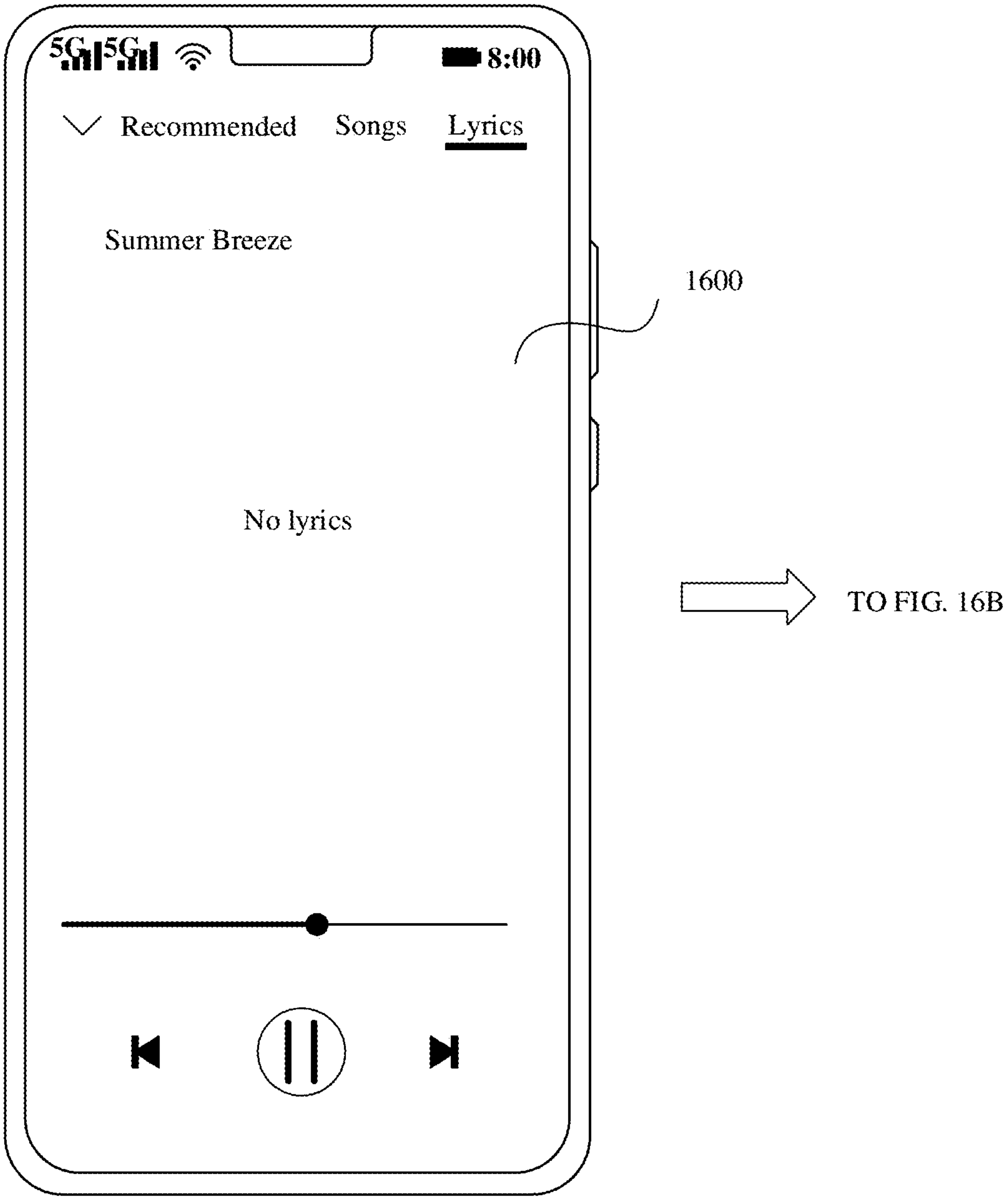
Figure 16C:
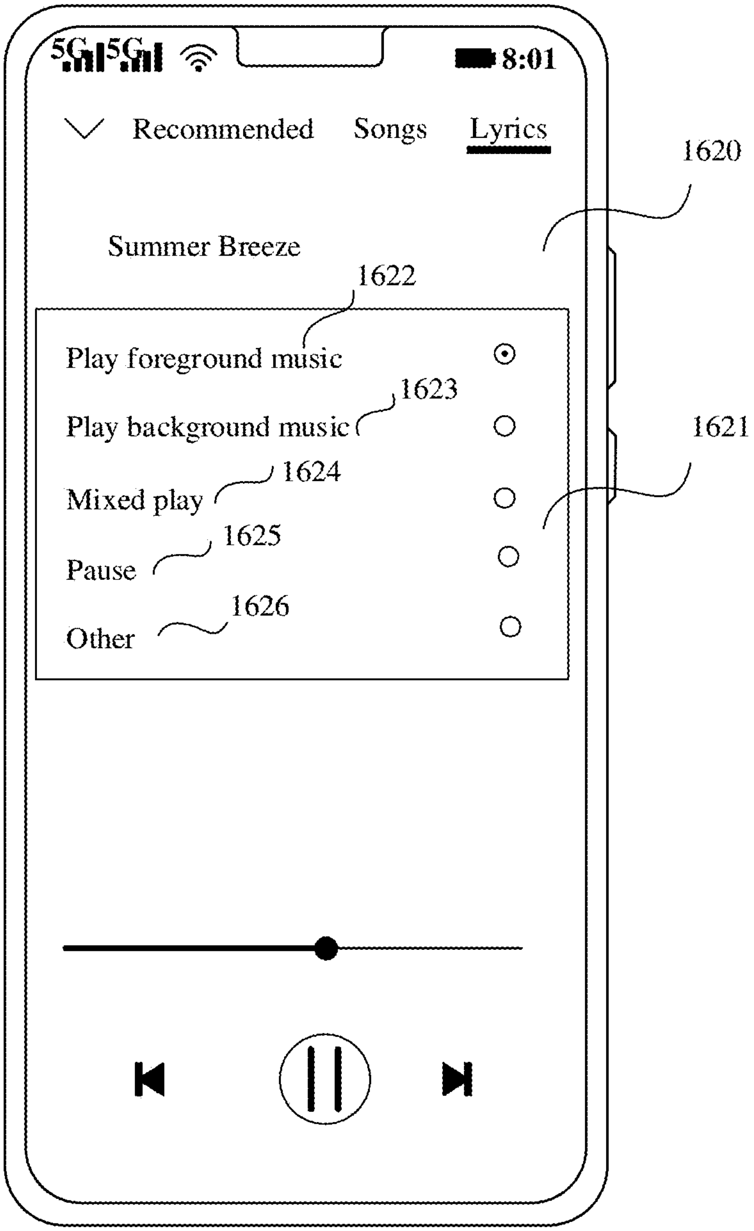

For example, as shown in FIG. 16A to FIG. 16C, it is assumed that the foreground application is Huawei Music. For example, a song currently played by the foreground application is "Summer Breeze", an interface 1600 is displayed on the display of the electronic device, and the background application is NetEase CloudMusic. In this case, a play policy provided by the electronic device is playing music of the foreground application and suspending background music. In this case, the electronic device may play foreground music, and after preset duration, a user interface 1610 may be displayed on the display of the electronic device. The user interface 1610 may include a prompt box 1611. For example, content of the prompt box may include prompt information "Do you want to play music as recommended?" 1612, a selection button "Yes" 1613, and a selection button "No" 1614. The user may tap a selection button to choose whether to play foreground music.

If the user taps the selection button “Yes” 1613, the electronic device may continue to play the foreground music and suspend background music. If the user taps the selection button “No” 1614, the electronic device may stop the foreground music, that is, both the foreground music and background music are suspended. Then, the user may reselect a music play policy according to a preference of the user and the like. Certainly, if the user taps the selection button “No” 1614, the electronic device may simultaneously play the foreground music and background music, that is, play mixed audio.

In a possible implementation, after the user taps the selection button “No” 1614, a user interface 1620 may be displayed on the display. The user interface 1620 may include an audio play policy list 1621, for example, may include “Play foreground music” 1622, “Play background music” 1623, “Mixed play” 1624, “Pause” 1625, and “Other” 1626. Then, the user may select a play policy in the foregoing selection box. For example, the user selects “Play foreground music” 1622. In the user interface 1620, playing of the foreground music in this case may be suspended. Then, after the user performs selection, whether to continue playing is determined based on the selection of the user. Certainly, in this case, the foreground music may alternatively be always played without a pause. This is not limited in this application.

It should be noted that “Other” 1626 may include the following policies: lowering background music volume, increasing foreground music volume, recommending soothing music, recommending play music, and the like.

It may be understood that the electronic device may set display duration, for example, 1 minute, for the prompt box 1611 displayed in the user interface 1610. When 1 minute expires, if the user does not select a play policy, the prompt box may automatically disappear.

It should be understood that the prompt information 1612 may alternatively be provided for the user in a form of voice broadcast, and then the user may select a play policy in a voice manner. This is not limited in this application. In addition, the content and the form of the prompt information 1612 are merely an example, and may vary according to an actual scenario. For example, if the mobile phone is in a mute mode and music is being played on the mobile phone, when a call is received in the foreground, a voice assistant of the mobile phone may utter prompt information “Do you want to answer the incoming call?”. In this way, it can be convenient for the user to answer the incoming call in time.

The following describes the foregoing process by using some specific scenarios as examples. For example, refer to Table 6.

TABLE 6

| | | | | | |
|---|---|---|---|---|---|
| Foreground application | Himalaya | Game for Peace | KaDa Story | Bilibili | Huawei Music |
| Background application | Huawei Music | NetEase CloudMusic | Himalaya | Huawei Music | NetEase CloudMusic |
| Recommended play policy | Lower volume of background music | Stop background music | Lower volume of background music | Stop background music | Stop background music |

The foregoing table is merely an example. In an actual scenario, another play policy may be used. This is not limited in this application. For example, in a children’s story scenario, cheerful music suitable for children may be provided. Alternatively, in audio effect scenarios of some games, background music may be stopped or a matched music may be provided. Alternatively, in a video playing scenario, background music may be stopped.

Considering that there are many styles of music, for example, music may include pop music, rock music, folk music, and the like, when a plurality of audio streams are played simultaneously, music of different styles may have different play policies. Therefore, the following embodiments of this application continue to describe a special scenario in which an audio stream of a background application is of a music category, and an audio stream of a foreground application is of a book listening/story telling category (for example, a media tone category).

After the audio source classifier classifies the audio stream, if it is determined that the category of the first audio stream is a first specified category and the category of the second audio stream is a second specified category, a specific style of music (or a specific type of music) may be further determined, and the second audio stream continues to be classified. Then, a play policy is determined based on the type of the second audio stream.

For ease of description, in this embodiment of this application, the media tone category, such as book listening/story telling, may be denoted as the “first specified category”, and the music category may be denoted as the “second specified category”.

Figure 17A:
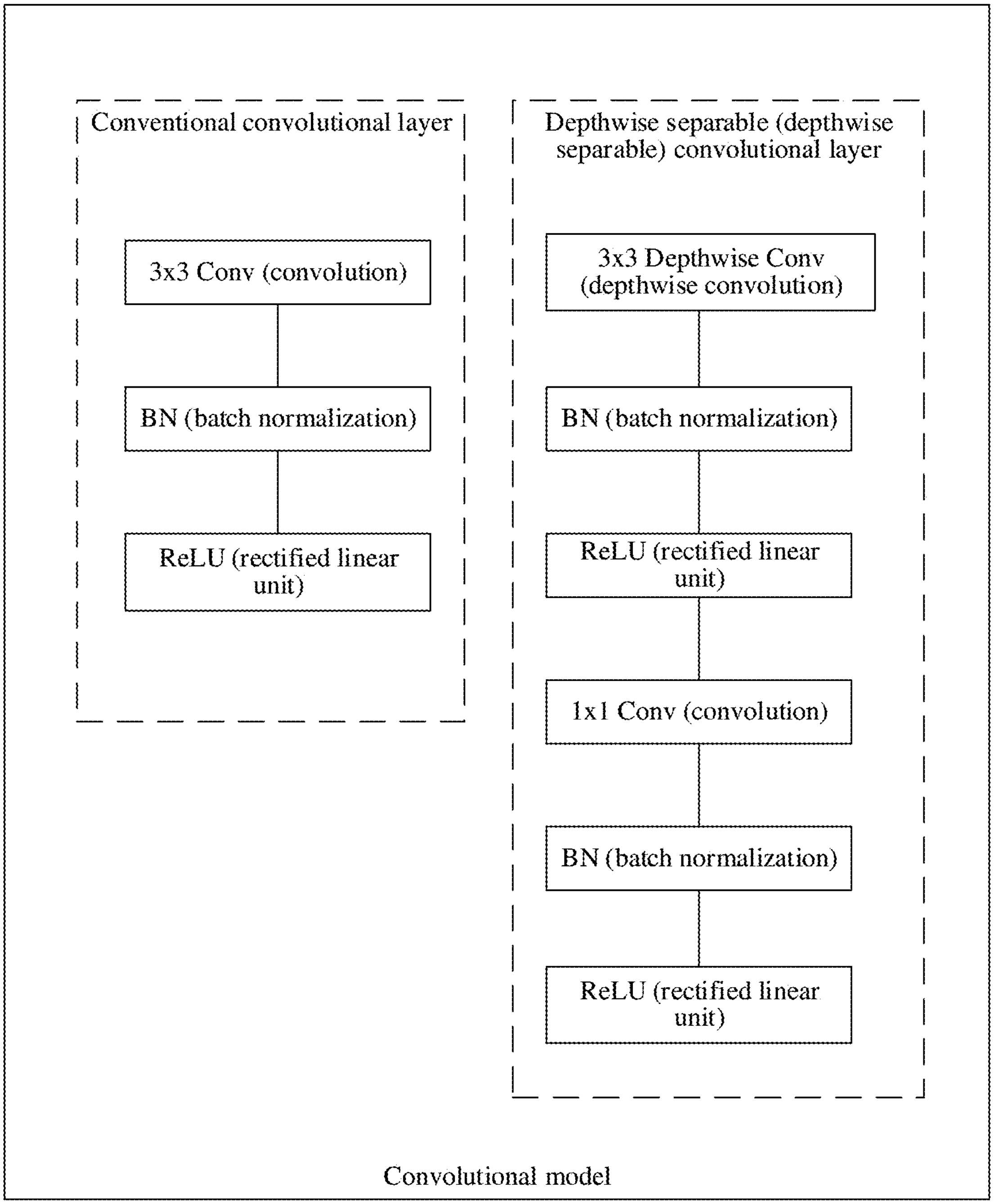
FIG. 17A is a schematic diagram of an audio classification model according to an embodiment of this application.

In some embodiments, the audio stream may be classified by using an audio classification model (for example, a YAMNet audio classification model). For example, FIG. 17A is a schematic diagram of an audio classification model according to an embodiment of this application. It should be understood that the YAMNet audio classification model uses a depthwise-separable convolutional architecture, and has characteristics such as a small scale and a high speed. A size of the entire model is about 14.5 M, a quantity of network weights is about 1.9 M, and an operation amount is 69.2 M times of multiplication operations.

Figure 17B:
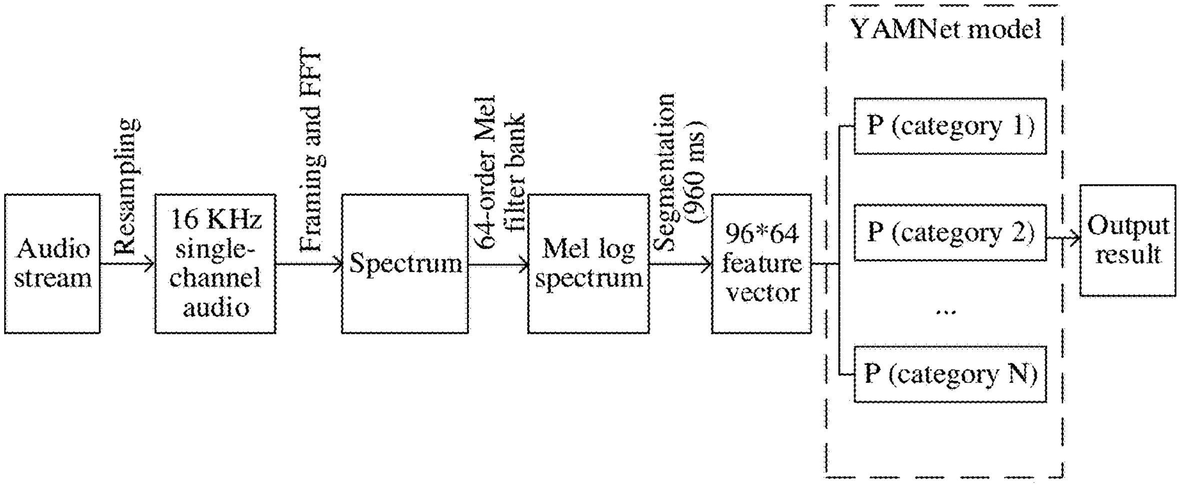
FIG. 17B is a schematic diagram of a processing procedure of classifying an audio stream by using an audio classification model according to an embodiment of this application.

FIG. 17B is a schematic diagram of a processing procedure of classifying an audio stream by using an audio classification model according to an embodiment of this application. Specifically, an audio stream of a background application may be first captured, and then the captured audio stream is resampled to obtain 16 KHz mono audio. Then, the 16 KHz mono audio is framed, and fast Fourier transform (fast Fourier transform, FIT) is performed to obtain a spectrum. Then, a 64-order Mel filter bank is used to process the spectrum to obtain a Mel logarithmic spectrum. Finally, the Mel logarithmic spectrum is segmented by 960 ms to obtain a 96*64 feature vector. Then, the feature vector is input into the YAMNet audio classification model. The YAMNet audio classification model classifies the audio stream, calculates a probability of each style category, and finally outputs a style category with a highest probability.

It should be noted that for the YAMNet audio classification model in FIG. 17A and FIG. 17B, refer to the conventional technology. This is not described in detail in this application.

In some other embodiments, the electronic device may not classify the audio stream by using an audio classification model. For example, the electronic device may obtain a category of classifying a music style by an application, and use the category of classifying the music style by the application as a final category.

In a possible implementation, a corresponding audio play policy may be set in the electronic device for the music category. For example, different audio play policies may be recommended for different music styles (types). For example, refer to Table 7.

TABLE 7

| Music style | Play policy |
|---|---|
| Pop | Preemptive |
| Rock | Preemptive |
| Folk | Preemptive |
| Electronic | Preemptive |
| Dance music | Preemptive |
| Rap | Preemptive |
| Englon | Preemptive |
| Metal | Preemptive |
| Punk | Preemptive |
| Blues | Mixed |
| Reggae | Preemptive |
| World music | Preemptive |
| Light music | Mixed |
| Jazz | Mixed |
| Country | Preemptive |
| R&B/Soul | Mixed |
| Classical | Mixed |
| National | Preemptive |
| Latin | Preemptive |
| New age | Preemptive |
| Music style | Play policy |
| Ancient style | Preemptive |
| Post-rock | Mixed |
| Bossa Nova | Preemptive |

It can be learned from Table 7 that if a background music type is soothing music such as blues, R&B/Soul, classical music, light music, or post-rock music, that is, a style suitable for listening to a book, a play policy may be "mixed", that is, a mixed audio is played, and policies for the other categories remain unchanged.

In other words, in this embodiment of this application, when audio streams of background music and foreground music are played at the same time, if a style of the background music does not cause played audio to be noisy and chaotic, the background music may be used as background music of the foreground audio stream, to improve user experience.

S1403: The electronic device plays the first audio stream and the second audio stream according to the determined audio stream play policy.

After the policy library determines the audio stream play policy based on the categories of the audio streams of the foreground and background applications, the electronic device may play the audio streams according to the play policy. For example, if the play policy is stopping background music, the electronic device may play foreground music, and suspend background music. If the play policy is mixed play, the electronic device may play foreground music and background music at the same time.

According to the solution in this embodiment of this application, when simultaneously playing a plurality of audio streams, the electronic device may play the plurality of audio streams according to an audio stream play policy determined by the policy library based on categories of the audio streams, to avoid noise and chaos, and improve user experience.

Figure 18:
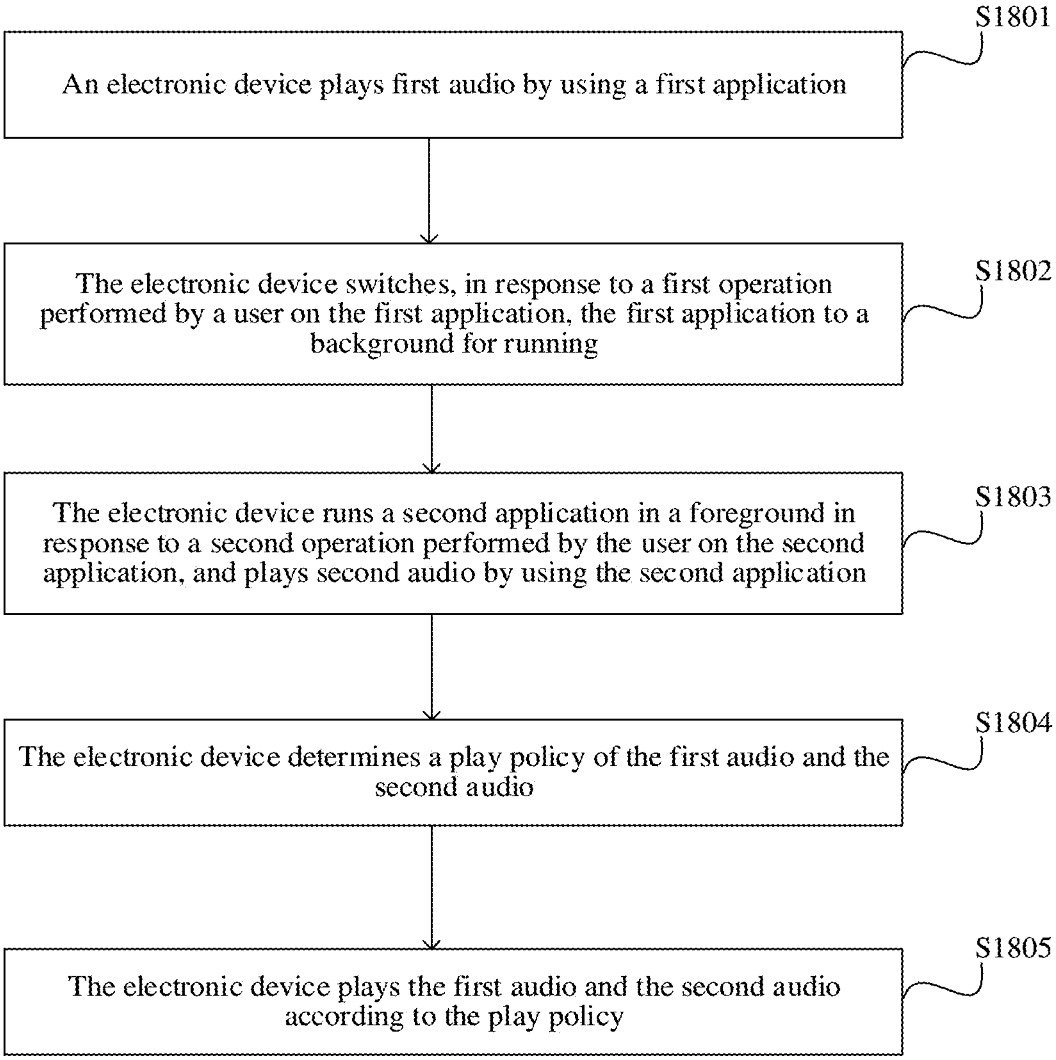
FIG. 18 is a flowchart of an audio playing method according to an embodiment of this application.

Based on the foregoing embodiments, an embodiment of this application further provides an audio playing method. As shown in FIG. 18, the method may include the following steps.

S1801: An electronic device plays first audio by using a first application.

S1802: The electronic device switches, in response to a first operation performed by a user on the first application, the first application to a background for running.

S1803: In response to a second operation performed by the user on a second application, the electronic device runs the second application in a foreground, and plays second audio by using the second application.

S1804: The electronic device determines a play policy of the first audio and the second audio.

S1805: The electronic device plays the first audio and the second audio according to the play policy.

For specific implementation of the foregoing steps, refer to the detailed description in the foregoing embodiment, and details are not described herein again.

Further, when the audio playing method is applied to a multi-device connection scenario, for example, a mobile phone is separately connected to a sound box and a smart screen, the mobile phone may project a sound onto the sound box and the smart screen, so that the mobile phone, the sound box, and the smart screen can simultaneously play a same audio file. In this scenario, because audio effect processing capabilities, audio effect processing manners, or the like of different electronic devices are different, audio playing effect of a same audio file on different electronic devices is different, resulting in poor user experience.

Based on this technical problem, this application further provides an audio effect processing method applied to a multi-device connection scenario. Audio effect configuration information used by different electronic devices may be determined with reference to the audio effect configuration information of the electronic devices. Therefore, corresponding audio effect processing may be performed based on the foregoing determined audio effect configuration information, and playing may be performed on a corresponding electronic device, thereby reducing an audio play effect difference between different electronic devices, so that a user hears basically the same audio effect.

For example, the audio effect configuration information may include audio effect algorithm information, audio effect status information, audio effect mode information, an audio parameter, equalizer setting information, gain setting information, and the like. The audio effect algorithm information is used to indicate an audio effect algorithm, for example, a Dolby (Dolby) algorithm or a digital theater system (digital theater system, DTS) algorithm. The audio effect status information is used to indicate an audio effect status, and the audio effect status may include on and off. The audio effect mode information is used to indicate an audio effect mode, for example, a music mode, a movie mode, or a game mode. The audio effect parameter is a parameter used in the audio effect algorithm with respect to a corresponding audio effect mode, equalizer setting, and gain setting. For example, the audio effect parameter may include a product name (PRODUCT), an audio effect module name (NAME), and the like. For example, a part or all of the audio effect parameter used in the audio effect algorithm may be customized by an audio effect algorithm vendor. For example, the product name may be customized by the audio effect algorithm vendor, and the audio effect module name is defined in a standard. The equalizer setting information is used to set an equalizer, and may include Profile1, Profile2, or the like. The gain setting information is used to set a gain, for example, +3 db or +2 db.

Audio effect configuration information corresponding to different devices may be different or may be the same. For example, details are shown in Table 8.

TABLE 8

| Device identifier | Audio effect algorithm | Audio effect status | Audio effect mode | Audio effect parameter | Equalizer setting | Gain setting | . . . |
|---|---|---|---|---|---|---|---|
| ID1 | Dolby | On | Music | Parameter 1 | Profile1 | +3 db | . . . |
| ID2 | DTS | Off | Movie | Parameter 2 | Profile2 | +2 db | . . . |
| ID3 | Dolby | On | Music | Parameter 1 | Profile1 | +3 db | . . . |

It should be noted that different electronic devices may use audio effect algorithms of different vendors. Therefore, for a same audio effect algorithm, audio effect mode, equalizer setting, and gain setting, used audio parameters may be different. However, for a same audio effect algorithm, audio effect mode, equalizer setting, and gain setting, audio play effect of different electronic devices is roughly the same.

In a multi-device connection scenario, electronic devices may include a master electronic device (briefly referred to as a master device below for ease of description, which may also be referred to as a master device) and a slave electronic device (briefly referred to as a slave device below for ease of description, which may also be referred to as a slave device). Specifically, one master device may be connected to one or more slave devices. The master device and the slave device may be connected in a wireless manner, or may be connected in a wired manner. This is not limited. For example, the master device and the slave device may transmit at least one of data, messages, information, parameters, files (such as an audio file, a video file, a picture file, and a document file), or control instructions to each other through a Wi-Fi connection and/or a Bluetooth connection. The master device is an audio delivery party, and the slave device is an audio receiving party. When a master device is connected to N slave devices, where for example, a value of N is a positive integer greater than or equal to 2, the master device may send an audio file or audio data to some of the N slave devices or the N slave devices. A specific slave device to which the master device sends data is related to a data type, a device capability of the slave device, a user setting, and the like. For example, a master device is connected to a large-screen device, a sound box, and a socket, the socket does not have an audio playing function, and a user selects only the sound box and does not select the large-screen device. In this case, if the master device receives an operation of playing an audio file by the user, the master device may send the audio file or audio data of the audio file to only the sound box in response to the operation of playing the audio file by the user, so that the sound box plays the audio file.

Figure 19:
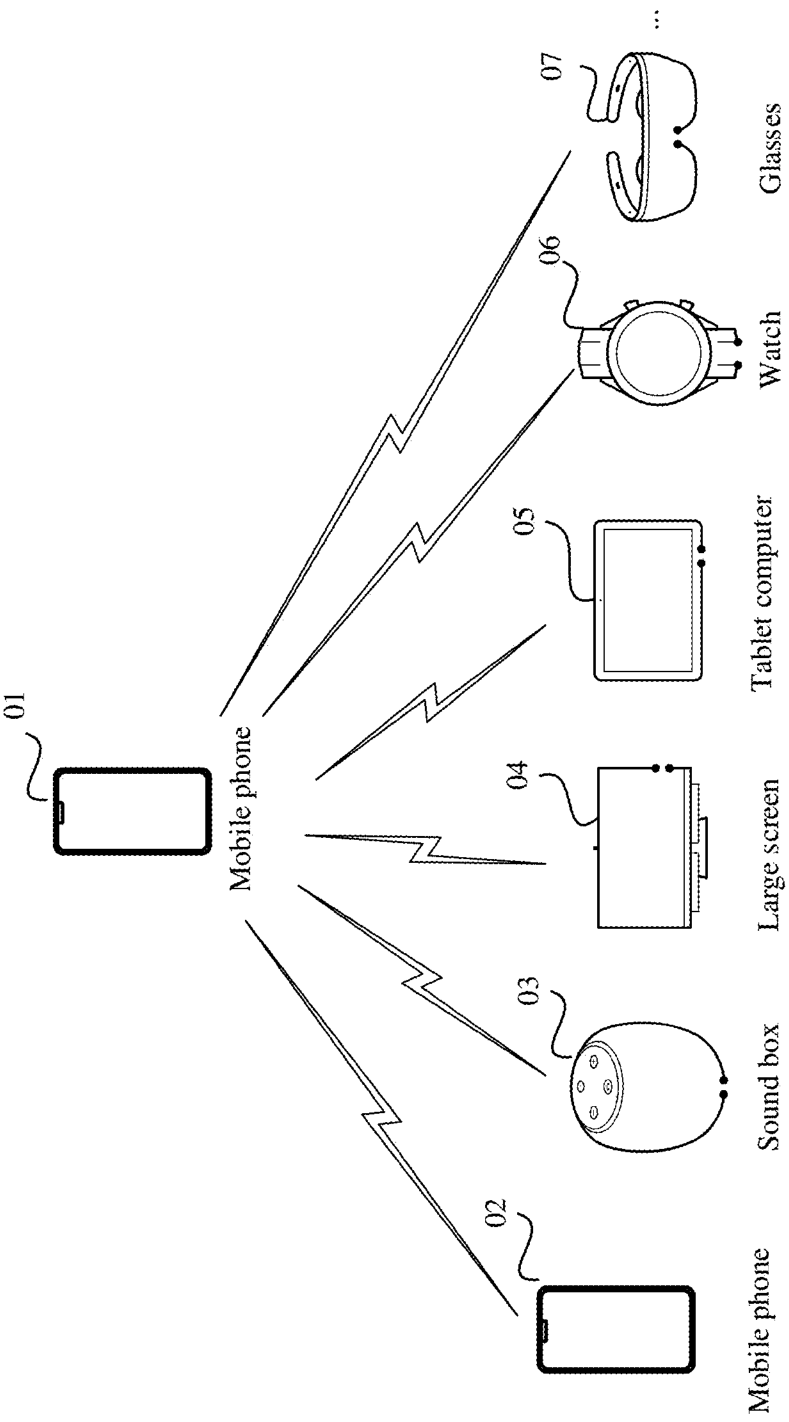
FIG. 19 is a schematic diagram of a multi-device connection scenario according to an embodiment of this application.

This embodiment of this application is applicable to a multi-device connection application scenario. Usually, a multi-device connection application scenario includes one master device and at least one slave device. For example, FIG. 19 shows a multi-device connection application scenario according to an embodiment of this application, including a master device 01, a slave device 02, a slave device 03, a slave device 04, a slave device 05, a slave device 06, a slave device 07, and the like. It should be noted that the multi-device connection application scenario shown in FIG. 19 is merely an example for description. A quantity of master devices, a quantity of slave devices, and the like in the multi-device connection application scenario are not limited in this embodiment of this application.

In this scenario, the master device 01 may be interconnected to a plurality of slave devices based on a communication network, and then the master device 01 may control at least one electronic device in the slave device 02, the slave device 03, the slave device 04, the slave device 05, the slave device 06, and the slave device 07 to play audio. For example, the communication network may be a local area network, for example, may be a Wi-Fi hotspot network, a wireless fidelity-peer to peer (wireless fidelity-peer to peer, Wi-Fi P2P) network, a Bluetooth network, a ZigBee network, or an NFC network. In a possible implementation, the plurality of electronic devices may alternatively establish a wireless connection based on a mobile network. For example, the mobile network includes a mobile network established based on 2G, 3G, 4G, 5G, and a subsequent standard protocol. In a possible implementation, the plurality of electronic devices may further establish a connection to at least one server by using a mobile network, and the devices transmit data, and/or messages, and/or information, and/or signaling, and/or instructions through the server. In a possible implementation, the plurality of electronic devices may alternatively be connected by using a data cable.

It should be noted that the master device 01 may control other electronic devices to play same audio, or the master device 01 may control other electronic devices to play different audio. This is not limited in this application.

A software system of an electronic device to which the audio effect processing method is applied is described by using a Harmony operating system with a layered architecture as an example.

Figure 20:
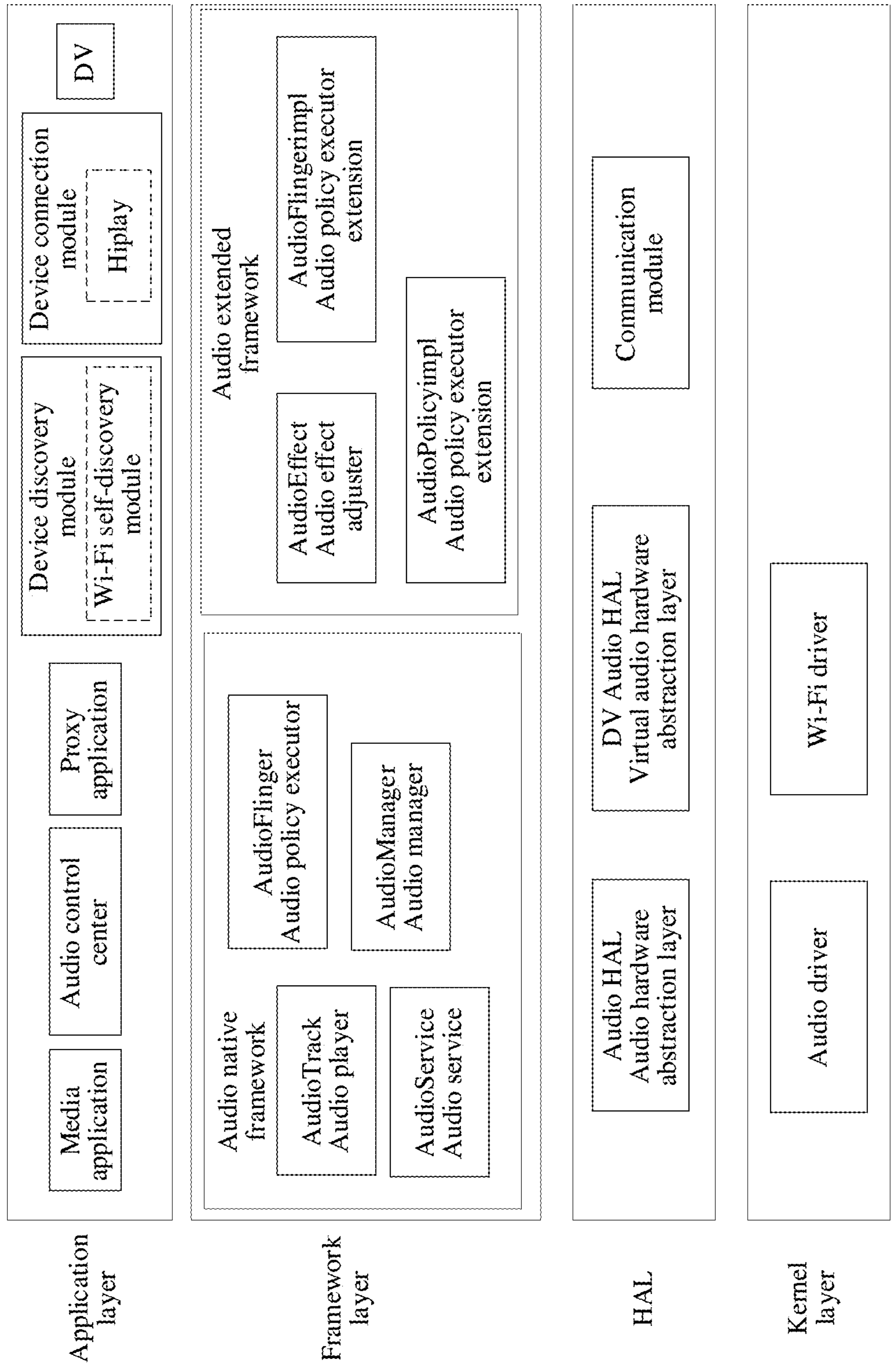
FIG. 20 is a schematic diagram of a structure of a software system of an electronic device according to an embodiment of this application.

For example, FIG. 20 is a diagram of a software system of an electronic device according to an embodiment of this application. As shown in FIG. 20, an application layer includes applications such as a media application (for example, a camera application, a music application, a video application, or an audio application), a proxy application, and a virtual device application (device virtual, DV). The proxy application is configured to exchange information between devices, for example, audio effect configuration information and audio data. It should be noted that the proxy application may be preconfigured before delivery of the electronic device. In addition, the application layer may further include an audio control center, configured to implement audio effect control and control an audio device. The audio device herein may be an electronic device that is connected to the electronic device and has an audio playing capability, for example, a sound box, a large-screen device, or a mobile phone, or may be an audio playing device of the electronic device, for example, a speaker. Alternatively, the application layer includes a device discovery module (for example, a Wi-Fi self-discovery module) and a device connection module (for example, Hiplay).

A framework layer provides an application programming interface API framework for the applications at the application layer. For example, the API framework may include an audio native framework and an audio extended framework. The audio native framework may be a built-in audio framework of the Harmony operating system. For example, the audio native framework includes an audio manager (AudioManager), an audio service (AudioService), an audio policy executor (AudioFlinger), an audio player (AudioTrack), and the like. The audio extended framework is an extended framework of an audio function, and may include an audio effect adjuster (AudioEffect or AudioEffectimpl), an audio policy extension (AudioPolicyimpl), and an audio policy executor extension (AudioFlingerimpl).

A hardware abstraction layer is located between the framework layer and a kernel layer, and may include an audio hardware abstraction layer (Audio HAL), a virtual audio playing device (also referred to as a virtual audio device, such as DV Audio HAL), a Wi-Fi module, or another communication module. The virtual audio playing device is an abstraction of an external audio device (such as a sound box or a large-screen device), and is configured to communicate with the corresponding external audio device.

It may be understood that the software system of the electronic device shown in FIG. 20 is merely a schematic description, and does not constitute a limitation on the software system of the electronic device. It should be noted that, when the audio native framework in the software system of the electronic device shown in FIG. 20 is a built-in audio framework of an Android operating system, the software system of the electronic device shown in FIG. 20 may alternatively be the Android operating system.

The following describes in detail the audio effect processing method in embodiments of this application with reference to specific examples.

Example 1: In a multi-device connection scenario, a master device is responsible for parsing an audio file to obtain audio data, and performing corresponding audio effect processing on the audio data for different devices. A slave device does not need to parse an audio file or perform audio effect processing.

Figure 21:
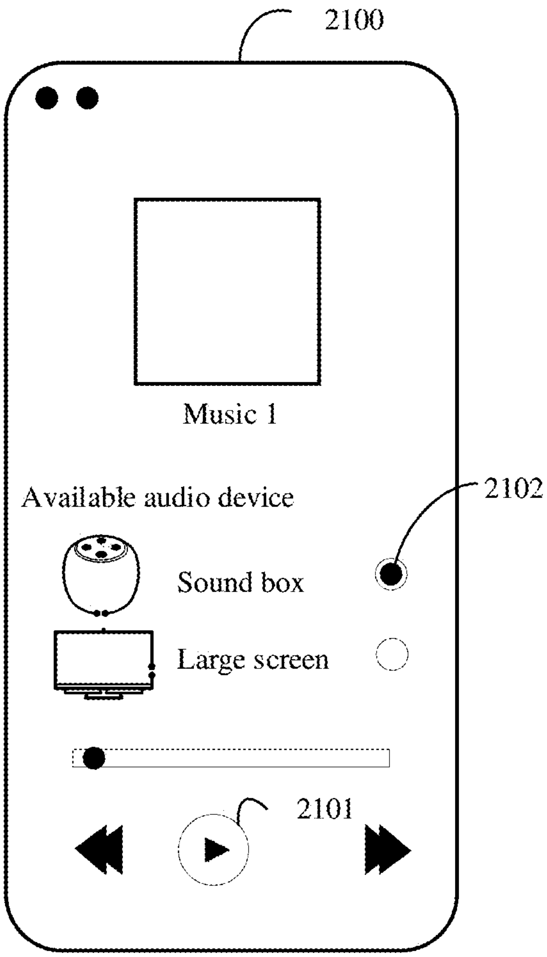
FIG. 21 is a schematic diagram of an interface of a music application according to an embodiment of this application.

For example, a mobile phone is a master device and a sound box is a slave device. As shown in FIG. 21, the mobile phone displays an interface 2100 of a music application. The interface 2100 includes an identifier (for example, a music name or a music icon) of a to-be-played audio file, a virtual control 2101, and a virtual control 2102. The virtual control 2101 is configured to control audio playing or suspending. The virtual control 2102 is used by a user to choose whether to play audio on the sound box. When the virtual control 2102 is selected, audio is played on the sound box. When the virtual control 2102 is not selected, audio is not played on the sound box. When the virtual control 2102 is selected, the mobile phone detects an operation of tapping the virtual control 2101 by the user. In response to the operation of tapping the virtual control 2101 by the user, the mobile phone parses the to-be-played audio file to obtain first audio data. Then, the mobile phone performs audio effect processing on the first audio data based on first audio effect configuration information, to obtain second audio data; and performs audio effect processing on the first audio data based on second audio effect configuration information, to obtain third audio data. Finally, the mobile phone plays the second audio data, and sends the third audio data to the sound box, so that the sound box can play the third audio data. Therefore, when the mobile phone and the sound box play the foregoing to-be-played audio file, audio effect heard by the user is basically the same. Further, in some embodiments, after sending the third audio data to the sound box, the mobile phone plays the second audio data after first duration. The first duration is a time period required for sending the third audio data from the mobile phone to the sound box for playing. For example, the first duration is a sum of first sub-duration and second sub-duration. The first sub-duration is a time period required for transmitting the third audio data from the mobile phone to the sound box, and the second sub-duration is a time period required for starting to play the third audio data after the third audio data arrives at the sound box. This helps the mobile phone and the sound box simultaneously play the to-be-played audio file.

For example, the first sub-duration may be obtained by the mobile phone through calculation based on a distance between the mobile phone and the sound box, and the second sub-duration may be indicated by the sound box to the mobile phone. For example, the sound box may send, to the mobile phone in a process of establishing a connection to the mobile phone or after establishing a connection to the mobile phone, information indicating the second sub-duration.

In some other embodiments of this application, the mobile phone may further send play time information to the sound box, where the play time information is used to indicate a play start time, so that the mobile phone and the sound box can simultaneously perform corresponding playing based on the play time information, to implement synchronous playing of the mobile phone and the sound box. For example, FIG. 21 is used as an example. When the virtual control 2102 is selected, the mobile phone detects an operation of tapping the virtual control 2101 by the user. In response to the operation of tapping the virtual control 2101 by the user, the mobile phone parses the to-be-played audio file to obtain first audio data. Then, the mobile phone performs audio effect processing on the first audio data based on first audio effect configuration information, to obtain second audio data. The mobile phone performs audio effect processing on the first audio data based on second audio effect configuration information, to obtain third audio data, and sends the third audio data and the play time information to the sound box. Then, the mobile phone plays the second audio data based on the play time information. After receiving the third audio data and the play time information, the sound box plays the third audio data based on the play time information, so that when the mobile phone and the sound box simultaneously play an audio file, audio effect heard by the user is basically the same when the mobile phone and the sound box play the foregoing to-be-played audio file.

In addition, it should be noted that, after the sound box receives the second audio data sent by the mobile phone, the sound box no longer performs audio effect processing on the second audio data. In this case, an audio effect status of the sound box may be off, that is, the sound box is in an audio effect disabled state. In some embodiments, the mobile phone further sends, to the sound box, a message or an instruction used to disable audio effect. The message or the instruction triggers the sound box to disable the audio effect, so that the audio effect status is off. This prevents the sound box from repeatedly performing audio effect processing on audio data. For example, when the audio effect status of the sound box is off, the mobile phone may not send a message or an instruction for disabling the audio effect to the sound box. The audio effect status of the sound box may be obtained by the mobile phone from the sound box when the mobile phone establishes a connection to the sound box. For example, when the mobile phone initiates a connection establishment request to the sound box, the sound box may send the audio effect status to the mobile phone by using a connection establishment response. For another example, when the sound box initiates a connection establishment request to the mobile phone, the sound box may send the audio effect status to the mobile phone by using the connection establishment request. Alternatively, the audio effect status of the sound box may be obtained by the mobile phone from the sound box in response to an operation of tapping the virtual control 2101. For example, in response to the operation of tapping the virtual control 2101, the mobile phone obtains audio effect configuration information currently used by the sound box.

In some other embodiments, when the audio effect status of the mobile phone is off, the mobile phone does not perform audio effect processing on the first audio data. That is, the mobile phone sends the first audio data to the sound box, and triggers the sound box to play the first audio data. After sending the first audio data to the sound box, the mobile phone plays the first audio data after the first duration. In this case, if the audio effect status of the sound box is on, the mobile phone sends a message or an instruction for disabling the audio effect to the sound box, where the message or the instruction triggers the sound box to disable the audio effect. Alternatively, when an audio effect status of the mobile phone is off, and the audio effect status of the sound box is on, the mobile phone enables audio effect, and sends a message or an instruction for disabling audio effect to the sound box.

The first audio effect configuration information includes first audio effect algorithm information, first audio effect mode information, a first audio effect parameter, first equalizer setting information, and first gain setting information. The second audio effect configuration information includes the first audio effect algorithm information, the first audio effect mode information, a second audio effect parameter, the first equalizer setting information, and the first gain setting information. The first audio effect algorithm information indicates a first audio effect algorithm, the first audio effect mode information indicates a first audio effect mode, the first equalizer setting information indicates a first equalizer setting, and the first gain setting information indicates a first gain setting. The first audio effect parameter is an audio effect parameter used by the mobile phone in the first audio effect algorithm with respect to the first audio effect mode, the first equalizer setting, and the first gain setting. The second audio effect parameter is an audio effect parameter used by the sound box in the first audio effect algorithm with respect to the first audio effect mode, the first equalizer setting, and the first gain setting.

For example, the first audio effect mode is an audio effect mode currently used by the mobile phone, the first audio effect algorithm is an audio effect algorithm currently used by the mobile phone, the first equalizer setting is an equalizer setting currently used by the mobile phone, and the first gain setting is a gain setting currently used by the mobile phone. Alternatively, the first audio effect mode is an audio effect mode currently used by the sound box, the first audio effect algorithm is an audio effect algorithm currently used by the sound box, the first equalizer setting is an equalizer setting currently used by the sound box, and the first gain setting is a gain setting currently used by the sound box. In this case, the audio effect configuration information currently used by the sound box may be obtained by the mobile phone from the sound box when the mobile phone establishes a connection to the sound box or after the mobile phone establishes a connection to the sound box. Alternatively, in response to the operation of tapping the virtual control 2101, the mobile phone obtains the audio effect configuration information currently used by the sound box. A manner of obtaining the audio effect configuration information currently used by the sound box is not limited in this embodiment of this application.

For example, the audio effect configuration information of the mobile phone and the audio effect configuration information of the sound box are shown in Table 9.

TABLE 9

| Device identifier | Audio effect algorithm | Audio effect status | Audio effect mode | Audio effect parameter | Equalizer setting | Gain setting |
|---|---|---|---|---|---|---|
| ID1 (mobile phone) | Dolby | On | Music | Parameter 1 | Profile1 | +3 db |
| ID1 (mobile phone) | Dolby | On | Movie | Parameter 4 | Profile2 | +2 db |
| ID2 (sound box) | Dolby | Off | Movie | Parameter 2 | Profile2 | +2 db |
| ID2 (sound box) | Dolby | Off | Music | Parameter 3 | Profile1 | +3 db |

The first audio effect configuration information is audio effect configuration information currently used by the mobile phone, and in the audio effect configuration information currently used by the mobile phone, the audio effect algorithm is Dolby, the audio effect mode is music, the audio effect parameter is parameter 1, the equalizer setting is Profile1, and the gain setting is +3 db. In this case, the audio effect mode of the sound box is set to music, the audio effect parameter of the sound box is set to parameter 3, the equalizer setting of the sound box is Profile1, and the gain setting of the sound box is +3 db.

In some embodiments, audio effect configuration information supported by the sound box may be pre-stored in the mobile phone. For example, the audio effect configuration information supported by the sound box may be stored in the mobile phone in a form of a list. The mobile phone may search an audio effect configuration information list for the second audio effect configuration information based on an identifier of the sound box and the audio effect configuration information currently used by the mobile phone. The second audio effect configuration information is audio effect configuration information corresponding to the sound box identifier and the audio effect algorithm, the audio effect mode, the equalizer setting, and the gain setting that are currently used by the mobile phone.

For example, the audio effect configuration information supported by the sound box may be sent by the sound box to the mobile phone in a process of establishing a connection between the sound box and the mobile phone or after a connection between the sound box and the mobile phone is established. For example, the sound box may send the audio effect configuration information to the mobile phone in a process of establishing a connection to the mobile phone for the first time or after establishing a connection to the mobile phone for the first time. When the sound box subsequently establishes a connection to the mobile phone, if the audio effect configuration information supported by the sound box does not change, the audio effect configuration information supported by the sound box does not need to be sent to the mobile phone. In some embodiments, when the audio effect configuration information supported by the sound box changes, if the sound box is connected to the mobile phone, or the sound box is being connected to the mobile phone, the sound box may send changed audio effect configuration information supported by the sound box to the mobile phone. For example, the sound box updates a software system version, and therefore the audio effect configuration information supported by the sound box changes.

Figure 22:
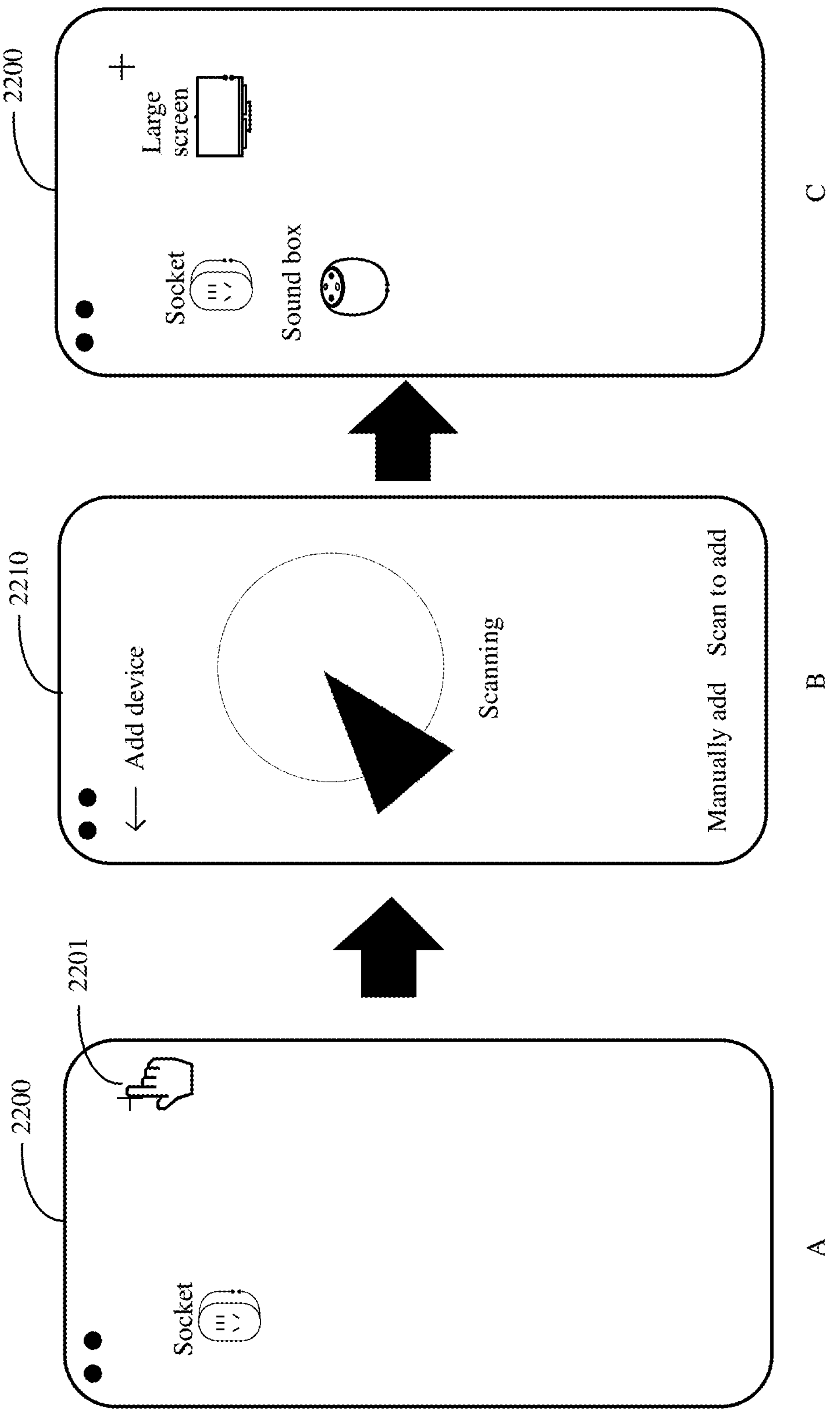
FIG. 22 is a schematic diagram of an electronic device discovery interface according to an embodiment of this application.

For example, as shown in A in FIG. 22, the mobile phone displays an interface 2200 of a smart home application, and the interface 2200 includes a device addition option 2201. In response to tapping the addition option 2201 by a user, the mobile phone displays an interface 2210, as shown in B in FIG. 22. The interface 2210 is used to prompt the user that the mobile phone is currently in a state of automatically scanning to discover a nearby electronic device. After discovering an electronic device, the mobile phone displays, in the interface 2210, device information of the electronic device discovered through scanning. For example, the device information of the electronic device may include a device name, a device model, and/or a device icon. For example, the mobile phone discovers a sound box and a large-screen device through scanning. As shown in C in FIG. 22, the mobile phone displays an icon and a device name of the sound box and a device icon and a device name of the large-screen device in the interface 2210. In response to tapping the device name of the sound box by the user, the mobile phone sends a connection establishment request to the sound box. The sound box receives the connection establishment request, and sends a connection establishment response to the mobile phone. The connection establishment response may include audio effect configuration information supported by the sound box and/or audio effect configuration information currently used by the sound box.

Further, in some embodiments, the connection establishment response may further include device hardware attribute information. For example, the device hardware attribute information is used to identify a hardware device capability of the sound box, for example, an audio sampling rate or a frame rate. This helps the mobile phone identify the hardware device capability of the sound box.

Figure 23A:
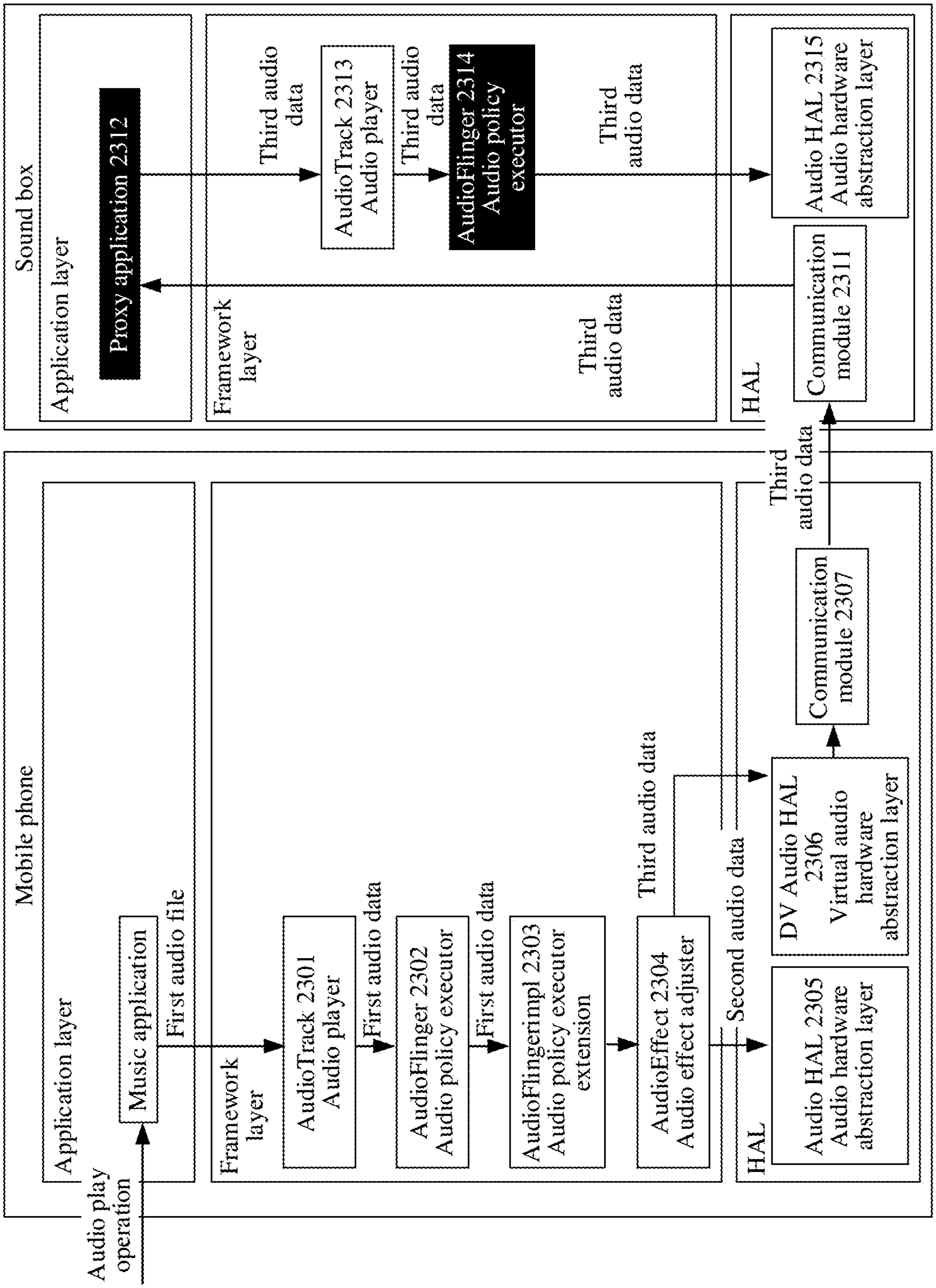
FIG. 23A is a schematic diagram of an audio data transmission procedure according to an embodiment of this application.

For example, a to-be-played audio file is a first audio file. As shown in FIG. 23A, a music application sends the first audio file to AudioTrack 2301 in response to an operation of playing the first audio file. AudioTrack 2301 parses the first audio file to obtain first audio data of the first audio file, and transfers the first audio data to AudioFlinger 2302. AudioFlinger 2302 transfers the first audio data to AudioFlingerimpl 2303. AudioFlingerimpl 2303 obtains first audio effect configuration information and second audio effect configuration information, and sends the first audio data, the first audio effect configuration information, and the second audio effect configuration information to AudioEffect 2304. AudioEffect 2304 performs audio effect processing on the first audio data based on the first audio effect configuration information, to obtain second audio data; and performs audio effect processing on the first audio data based on the second audio effect configuration information, to obtain third audio data. AudioEffect 2304 sends the second audio data to Audio HAL 2305, and invokes a speaker of the mobile phone by using Audio HAL 2305 to play the second audio data. AudioEffect 2304 sends the third audio data to DV Audio HAL 2306, and DV Audio HAL 2306 sends the third audio data to a communication module 2307. The communication module 2307 sends the third audio data to a communication module 2311. Then, the communication module 2311 sends the third audio data to a proxy application 2312. Then, the proxy application 2312 transfers the third audio data to Audio HAL 2315 through AudioTrack 2313 and AudioFlinger 2314, and invokes a speaker of the sound box by using Audio HAL 2315 to play the third audio data. For the first audio effect configuration information and the second audio effect configuration information, refer to the foregoing related description. Details are not described herein again.

Figures 1, 23B:
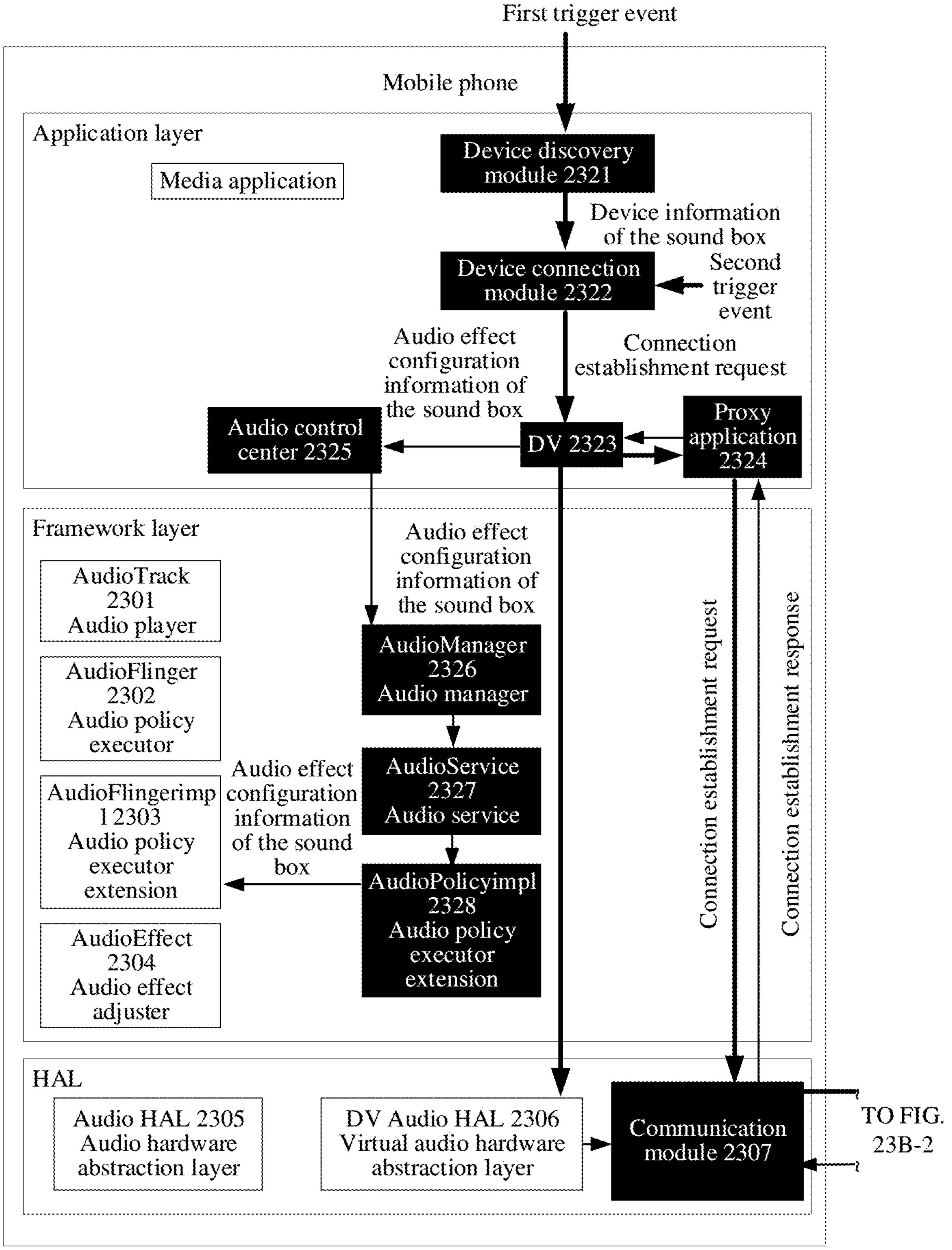
Figures 2, 23B:
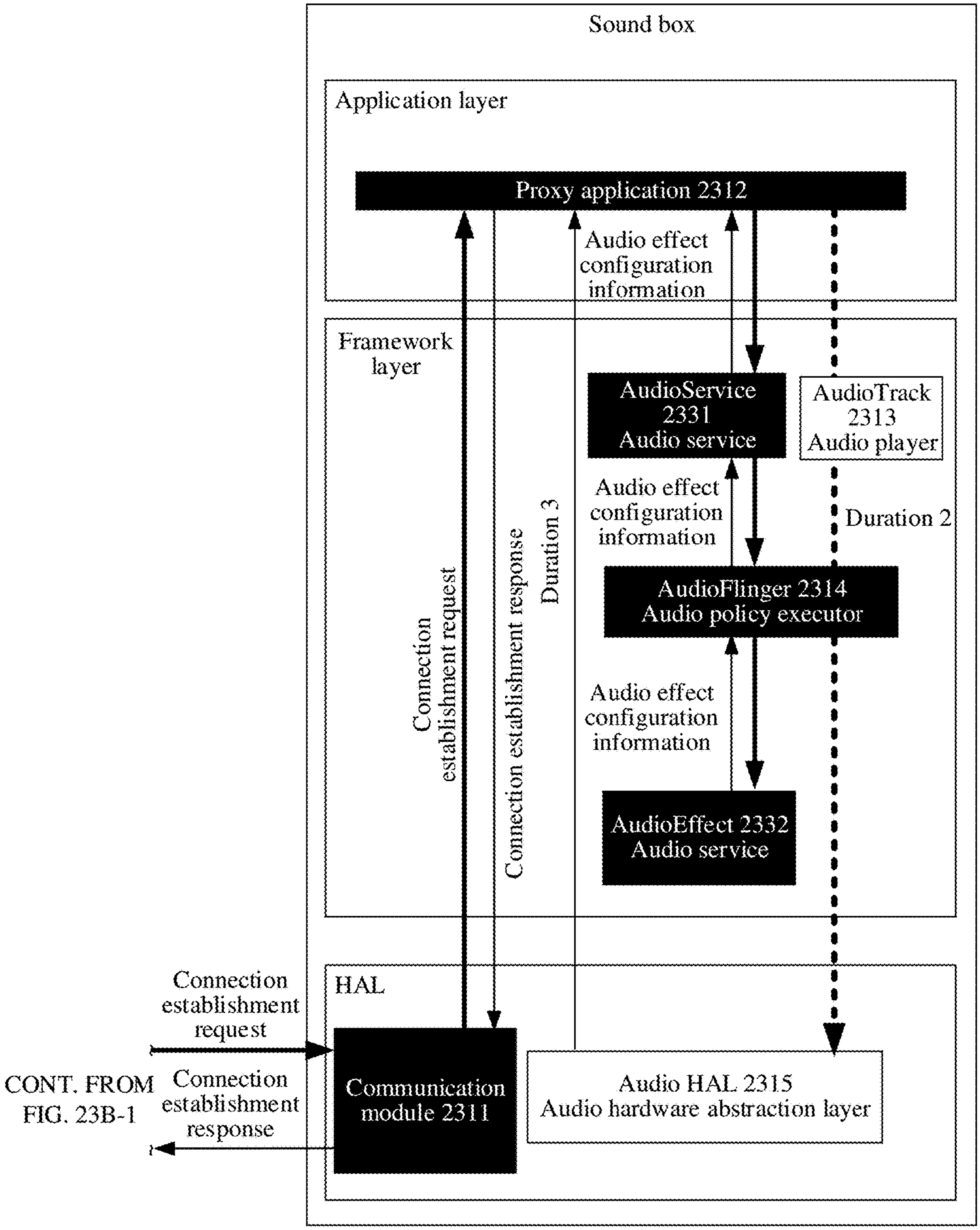

In some embodiments, as shown in FIG. 23B-1 and FIG. 23B-2, a device discovery module 2321 performs a device discovery procedure in response to a first trigger event. The first trigger event is used to trigger the device discovery procedure. After discovering the sound box, the device discovery module 2321 transfers device information of the sound box, such as a device identifier, a device model, and/or a device icon, to a device connection module 2322. The device connection module 2322 sends a connection establishment request to a proxy application 2324 through DV 2323 in response to a second trigger event. The proxy application 2324 sends the connection establishment request to the communication module 2307. Then, the communication module 2307 sends the connection establishment request to the proxy application 2312 through the communication module 2311. After receiving the connection establishment request, the proxy application 2312 obtains, from AudioEffect 2332 by using AudioService 2331 and AudioFlinger 2314, audio effect configuration information currently used by the sound box, audio effect configuration information supported by the sound box, and the like. Then, the proxy application 2312 sends a connection establishment response to the communication module 2307 through the communication module 2311. The connection establishment response includes the audio effect configuration information currently used by the sound box and the audio effect configuration information supported by the sound box. The communication module 2307 returns the connection establishment response to the proxy application 2324. The proxy application 2324 sends the audio effect configuration information of the sound box to DV 2323, and DV 2323 registers DV Audio HAL 2306 at a hardware abstraction layer, and sends the audio effect configuration information of the sound box to AudioManager 2326 through an audio control center 2325. AudioManager 2326 sends the audio effect configuration information of the sound box to AudioPolicyimpl 2328 through AudioService 2327. AudioPolicyimpl 2328 sends the audio effect configuration information of the sound box to AudioFlingerimpl 2303, so that when receiving audio data, AudioFlingerimpl 2303 may perform corresponding audio effect processing on the audio data based on the audio effect information currently used by the mobile phone and the audio effect configuration information of the sound box. Further, in some embodiments, the proxy application 2312 obtains second sub-duration, where the second sub-duration is a time period required for starting to play the third audio data on the sound box after the third audio data arrives at the sound box. The second sub-duration is a sum of duration 1, duration 2, and duration 3. Duration 1 is a time period required by the third audio data to arrive at the proxy application 2312 from the communication module 2311. Duration 2 is a time period required by the third audio data to arrive at Audio HAL 2315 from the proxy application 2312, that is, duration 2 is a time period required by the third application data to arrive at Audio HAL 2315 from the proxy application 2312 through AudioTrack 2313 and AudioFlinger 2314. Duration 3 is a time period required by the third audio data to arrive at an audio playing device (such as a speaker) of the sound box from Audio HAL 2315. Duration 3 is obtained by the proxy application 2312 from Audio HAL 2315.

The foregoing is merely an example for description, and constitutes no limitation on this embodiment of this application.

Example 2: In a multi-device connection scenario, a master device sends a to-be-played audio file, or an identifier or an address of the to-be-played audio file to a slave device. The slave device parses the to-be-played audio file, and then performs audio effect processing. Audio effect configuration information used by the slave device to perform audio effect processing may be sent by the master device to the slave device after the master device makes a decision.

For example, a mobile phone is a master device and a sound box is a slave device. As shown in FIG. 21, the mobile phone displays an interface 2100 of a music application. The interface 2100 includes an identifier of a to-be-played audio file, a virtual control 2101, and a virtual control 2102. When the virtual control 2102 is selected, the mobile phone receives an operation of tapping the virtual control 2101 by the user. In response to the operation of tapping the virtual control 2101 by the user, the mobile phone parses the to-be-played audio file to obtain first audio data. Then, the mobile phone performs audio effect processing on the first audio data based on first audio effect configuration information, to obtain second audio data. Then, the mobile phone plays the second audio data, and sends second audio effect configuration information and the to-be-played audio file to the sound box, so that the sound box can parse the to-be-played audio file to obtain fourth audio data, perform audio effect processing on the fourth audio data based on the second audio effect configuration information, to obtain third audio data, and play the third audio data. Further, in some embodiments, after sending the second audio effect configuration information and the to-be-played audio file to the sound box, the mobile phone plays the second audio data after second duration. The second duration is a sum of third sub-duration and fourth sub-duration. The third sub-duration is a time period required for transmitting the second audio effect configuration information and the to-be-played audio file from the mobile phone to the sound box. The fourth sub-duration is a time period required for starting to play the third audio data on the sound box after the second audio effect configuration information and the to-be-played audio file arrive at the sound box.

For the first audio effect configuration information and the second audio effect configuration information, refer to related descriptions in example 1. Details are not described herein again.

It may be understood that the audio configuration information used for audio playing on the master device and the audio configuration information used for audio playing on the slave device are determined based on the audio configuration information used by the master device, to reduce an audio play effect difference between the master device and the slave device.

Certainly, in this embodiment of this application, the audio configuration information used for audio playing on the master device and the audio configuration information used for audio playing on the slave device may alternatively be determined based on the audio configuration information used by the slave device. For example, Table 2 is used as an example. A mobile phone is a master device and a sound box is a slave device. In audio configuration information currently used by the sound box, when an audio effect algorithm is Dolby, an audio effect mode is movie, an audio effect parameter is parameter 2, an equalizer setting is Profile2, and a gain setting is +2 db, audio configuration information used by the mobile phone is set as follows: An audio effect algorithm is Dolby, an audio effect mode is movie, an audio effect parameter is parameter 4, an equalizer setting is Profile2, and a gain setting is +2 db.

In a scenario in which a master device is connected to two or more slave devices, a specific slave device whose audio configuration information is used to determine audio configuration information used for audio playing on the master device and audio configuration information used for audio playing on the slave device may be randomly selected by the master device, or may be selected by the master device according to a specific policy. For example, the audio configuration information used for audio playing on the master device and the audio configuration information used for audio playing on the slave device are determined based on audio configuration information used by a slave device with a highest device priority. A device priority may be preconfigured in the master device. For example, a priority of a sound box is higher than a priority of a mobile phone, a priority of a mobile phone is higher than a priority of a tablet, and a priority of a tablet is higher than a priority of a large-screen device.

Further, because different devices have different vendors, and have different parameters, functions, volume levels, product performance, and volume curves, volume of different electronic devices at a same volume level may be different. Based on the foregoing embodiment, if volume is adjusted on the master device, volume of the slave device may be different from the volume of the master device.

For example, an electronic device 1 may transmit audio on the electronic device 1 to a plurality of devices such as an electronic device 2 and an electronic device 3 for playing. For example, the electronic device 1 is a mobile phone and the electronic device 2 is a sound box. The mobile phone may connect to the sound box by using a communication network, and then may transmit audio on the mobile phone to the sound box for playing. Because power amplifiers, volume levels, volume curves, and the like of the mobile phone and the sound box are greatly different, when volume is adjusted on the mobile phone, volume of same audio played on the mobile phone and the sound box is different, resulting in poor user experience.

Based on this technical problem, an embodiment of this application further provides a volume adjustment method. An absolute volume conversion table is configured. After volume is adjusted on the electronic device 1, the electronic device 1 may report, to the electronic device 2, a volume level 1 corresponding to the volume on the electronic device 1. Then, the electronic device 2 may determine, according to the absolute volume conversion table, a volume level 2 corresponding to the volume level 1, and play audio on the electronic device 2 based on the volume level 2, so that volume consistency is implemented when the electronic device 1 and the electronic device 2 play the audio.

Two devices, for example, a first device and a second device, are used as an example to describe a process in which one device controls another device to perform volume adjustment, so that volume of the two devices is the same when the two devices play same audio. A principle in which one device controls a plurality of devices to adjust volume is similar to the principle in which one device controls another device to adjust volume. It is assumed that the first device needs to control the second device to perform volume adjustment, so that the first device and the second device can reach a consistent volume level when playing same audio. The first device may be a mobile phone, a tablet computer, or the like, and the second device may be a sound box, a watch, a large-screen device (for example, a smart screen), or the like. This is not limited in this application.

It should be understood that for hardware structures of the first device and the second device, refer to the description of the electronic device shown in FIG. 2. Details are not described herein again.

Figure 24:
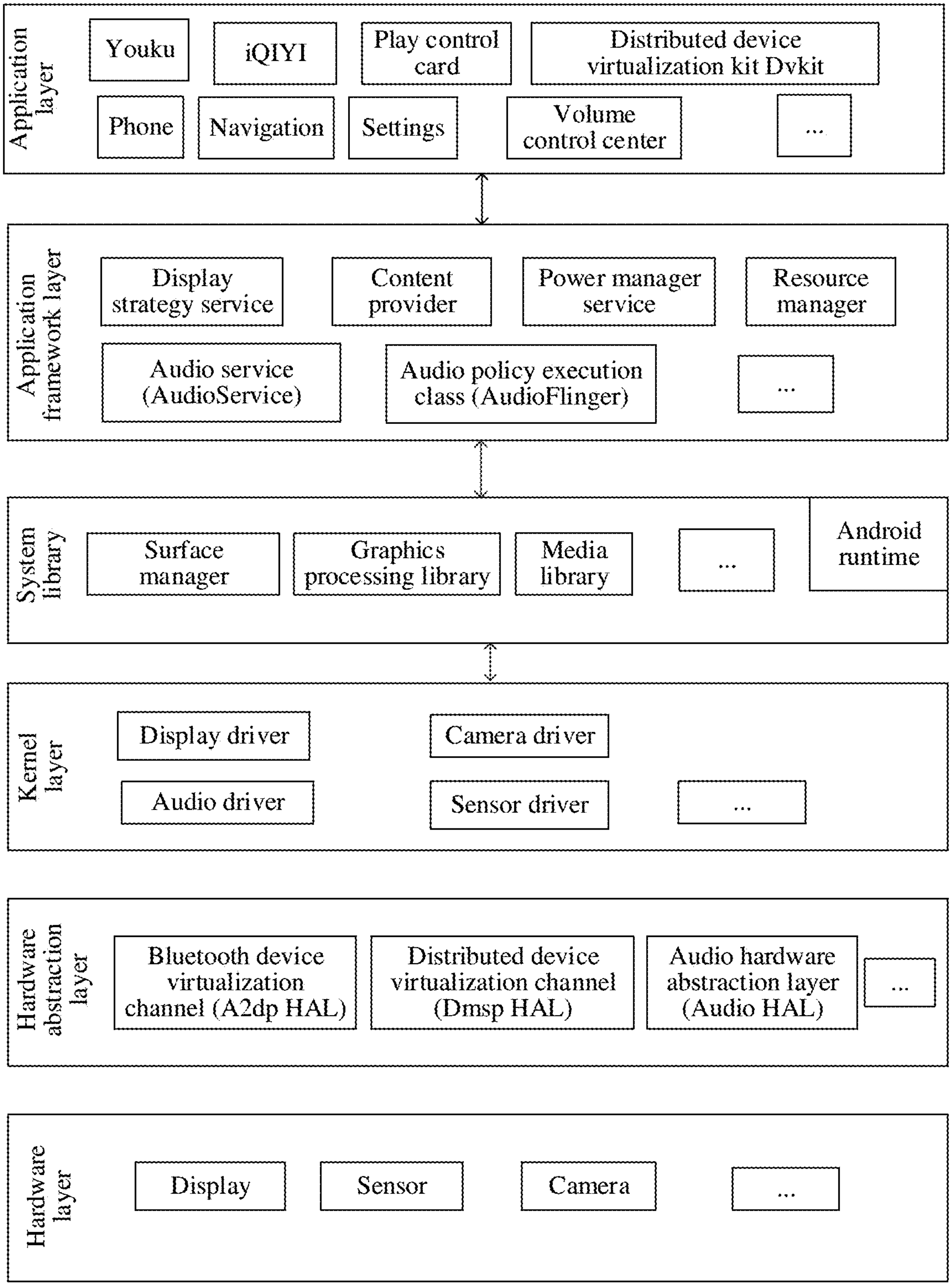
FIG. 24 is a schematic diagram of a software architecture according to an embodiment of this application.

An Android system with a layered architecture is used as an example to describe a software structure of an electronic device. As shown in FIG. 24, an application layer may include applications such as Youku, iQIYI, Navigation, a distributed device virtualization kit (device virtualization kit, Dvkit) (or referred to as a "proxy service"), a volume control center, Settings, and a play control card. It may be understood that an application at the application layer may be a device system-level application, or may be a third-party application (application, APP).

An application framework layer provides an application programming interface (application programming interface, API) and a programming framework for applications at the application layer. The application framework layer includes some predefined functions.

As shown in FIG. 24, the application framework layer may include a display strategy service, a power manager service (power manager service, PMS), a display manager service (display manager service, DMS), an audio service (AudioService), and an audio policy executor (AudioFlinger). Certainly, the application framework layer may further include an activity manager, a window manager, a content provider, a view system, a resource manager, a notification manager, and the like.

The audio service (AudioService) is configured to receive a volume adjustment instruction.

The audio policy executor (AudioFlinger) is an executor of an audio policy, and is responsible for management of a stream input/output device and processing and transmission of audio stream data.

A Bluetooth audio transmission model protocol (Advanced Audio Distribution Profile, A2dp) HAL is a virtualized channel of a Bluetooth device.

A distributed device virtualization channel (Distributed Mobile Sensing Hardware Abstraction Layer, Dmsp HAL) is a virtualization channel of a virtual audio device (for example, a Wi-Fi sound box).

An audio hardware abstraction layer (Audio HAL) is responsible for interacting with an audio hardware device, and is directly invoked by the audio policy executor AudioFlinger at the framework layer.

In this embodiment of this application, after a user adjusts volume on the electronic device 1, the electronic device 1 may receive the volume adjustment information, and send the volume adjustment information to an audio service (AudioService) module at the framework layer. The AudioService module transfers the volume adjustment information to a distributed absolute volume module. Then, the distributed absolute volume module reports a volume level on the electronic device 1 to the electronic device 2. Correspondingly, after receiving the volume level A reported by the electronic device 1, the electronic device 2 may determine, according to the volume conversion table, a volume level B corresponding to the volume level A, and then the electronic device 2 plays audio based on volume corresponding to the volume level B.

In the following embodiments, an architecture applied to the electronic device shown in FIG. 2 and an application scenario shown in FIG. 19 are used as examples for description. It should be understood that the "master device" in the schematic diagram shown in FIG. 19 may be understood as a "source end device" in the following embodiment, and the "slave device" may be understood as a "sink end device".

In this embodiment of this application, the electronic device may store a correspondence between a volume level and absolute volume. For example, refer to Table 10.

TABLE 10

| Volume level | Absolute volume (db) | Audio stream type |
|---|---|---|
| 1 | 1 | Media stream |
| 2 | 2 | Media stream |
| 3 | 3 | Media stream |
| . . . | . . . | Media stream |
| 100 | 100 | Media stream |
| 1 | 1 | Ringtone stream |
| . . . | . . . | Ringtone stream |
| 100 | 100 | Ringtone stream |

It can be learned from Table 10 that, for each audio stream type, there is a correspondence between a volume level and absolute volume. It should be noted that, at a same volume level, absolute volume corresponding to different audio stream types may be the same or different. This is not limited in this application.

Further, based on Table 10, the electronic device may further store a conversion relationship between a volume level of a control end electronic device and a volume level of a controlled end electronic device. It should be noted that the control end electronic device may also be denoted as a "source end device", that is, an electronic device that initiates a connection, and the controlled end electronic device may also be denoted as a "sink end device", that is, a connected electronic device. For example, a media stream is used as an example. For a conversion relationship between absolute volume of the source end device and absolute volume of the sink end device, refer to Table 11.

TABLE 11

| Volume level (source) | Volume level (sink) |
|---|---|
| 1 | 10 |
| 2 | 15 |
| 3 | 22 |
| 4 | 30 |
| 5 | 35 |
| 6 | 40 |
| . . . | . . . |
| 15 | 100 |

It can be learned from Table 11 that when the volume level of the source end electronic device is 1, the volume level of the sink end electronic device is 10.

For example, in the application scenario shown in FIG. 19, the master device 01 may establish a connection to another electronic device. When the master device 01 performs volume adjustment, for example, the master device 01 may send a volume level corresponding to the volume adjustment to the slave device 02. For example, the volume level is 3. Then, the slave device 02 determines, according to a stored conversion relationship between volume levels, that a volume level corresponding to the slave device 02 is 22 when the volume level of the master device 01 is 3, and then the slave device 02 plays audio based on volume corresponding to the volume level 22.

The volume adjustment method in embodiments of this application is described in detail below by using a first device and a second device as an example.

Figure 25:
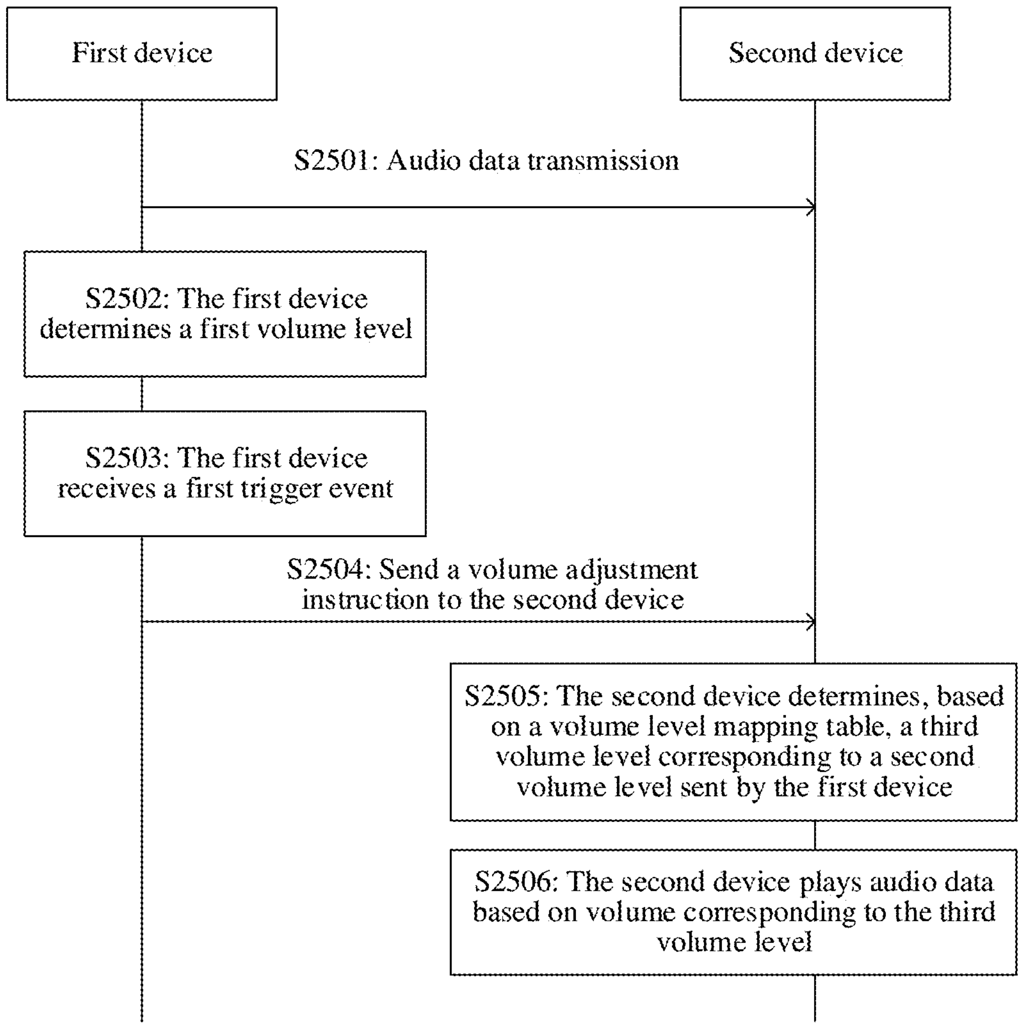
FIG. 25 is a flowchart of a volume adjustment method according to an embodiment of this application.

FIG. 25 is a flowchart of a volume adjustment method according to an embodiment of this application. As shown in FIG. 25, the method may include the following steps.

S2501: A first device transmits audio data to a second device.

Optionally, before the first device transmits the audio data to the second device, the first device may play the audio data. In other words, the first device may transmit the audio data after playing the audio data. Certainly, the first device may first establish a connection to the second device, and then transmit audio data to the second device. For example, the first device may play first audio, and then switch the first audio to the second device for playing in response to a first operation of a user.

It should be understood that the first audio is audio data played by an application on the first device, and the first operation may be a tap operation performed by the user on a button (for example, an "audio switching" button) in a display interface.

First, a process of establishing a connection between the first device and the second device is described by using an example in which the first device is a mobile phone and the second device is a smart screen.

Figures 1, 26A:
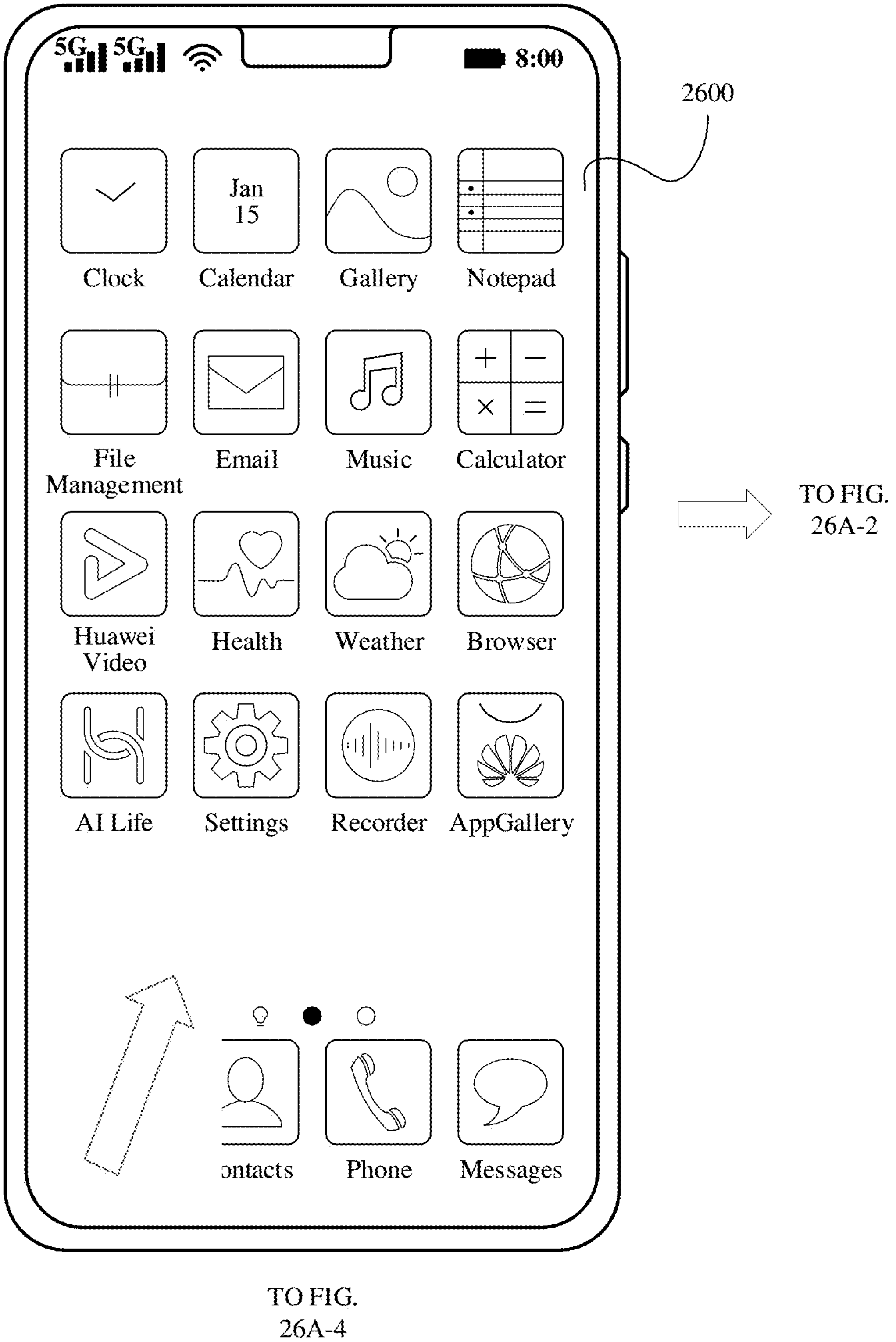
Figures 1, 2, 26A:
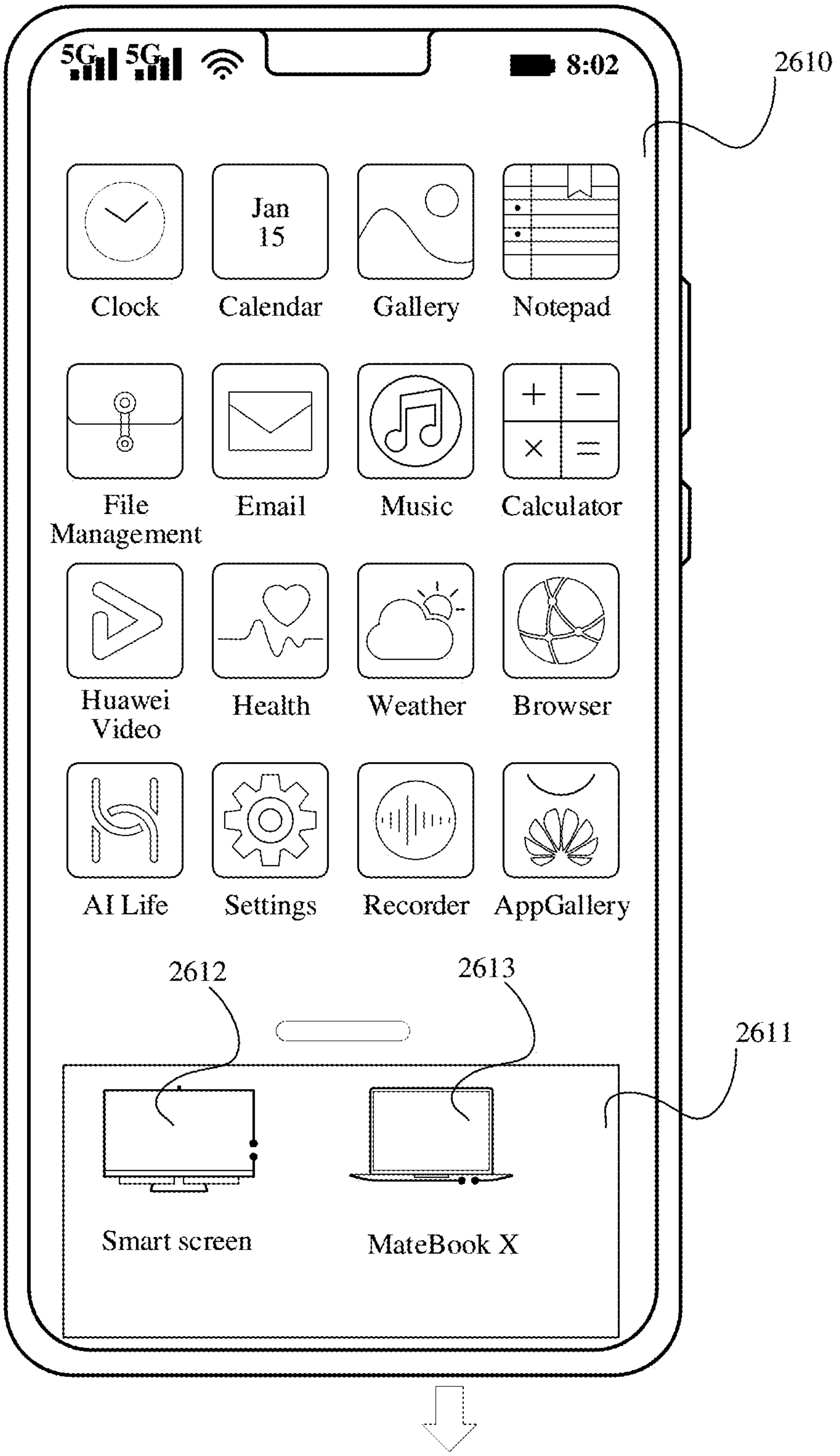
Figures 2, 3, 26A:
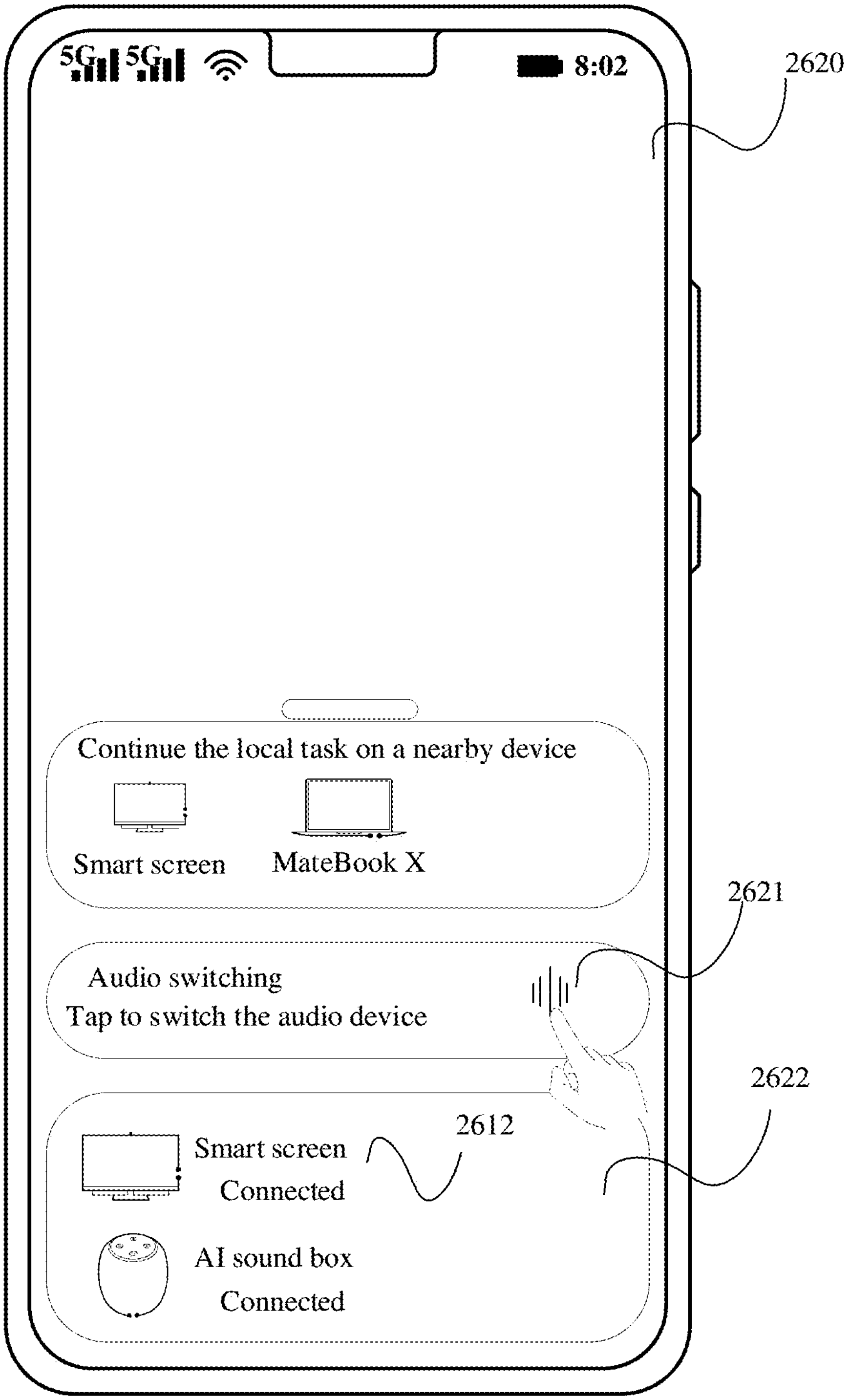
Figures 1, 3, 4, 26A:
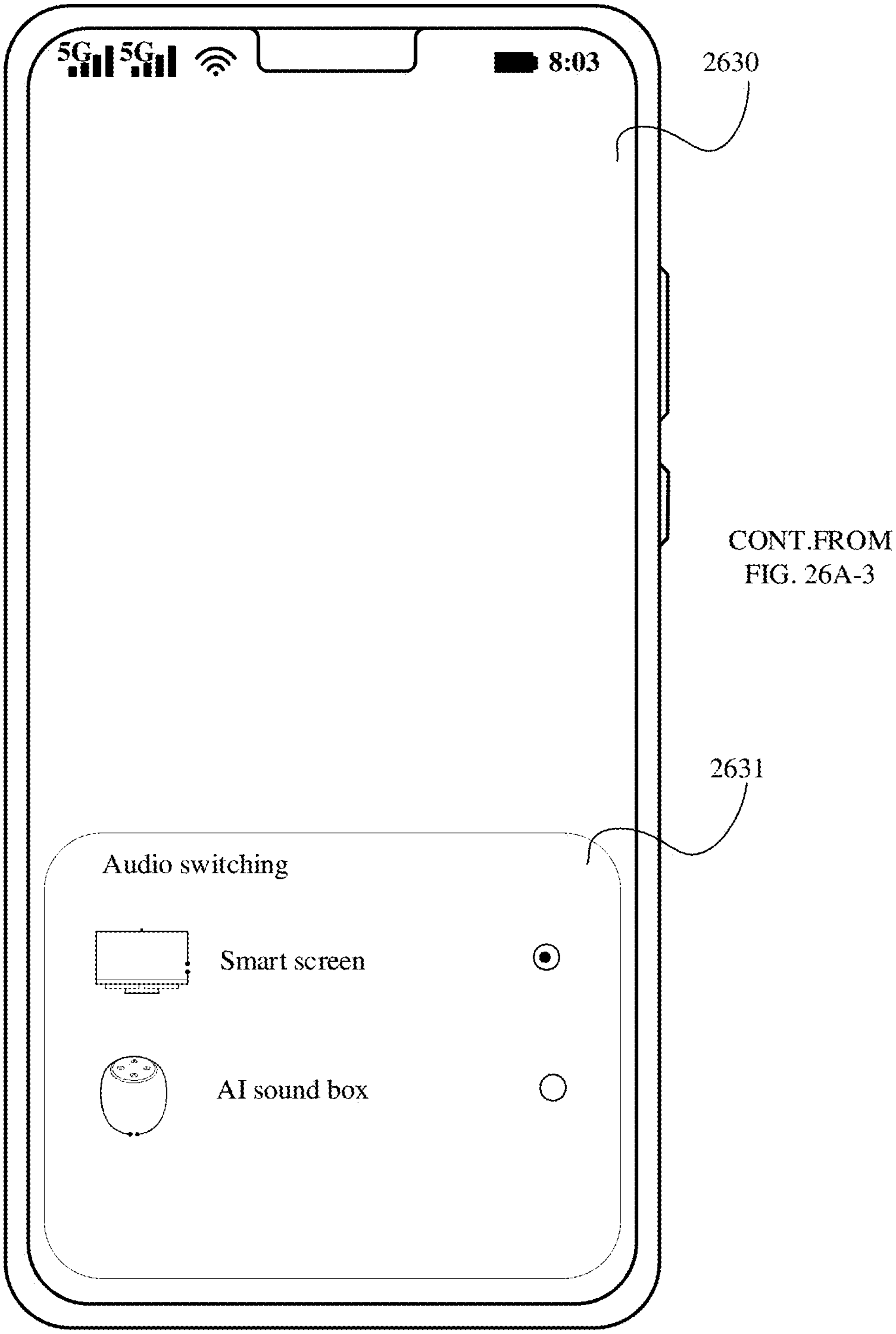

As shown in FIG. 26A-1 to FIG. 26A-4, the mobile phone displays a home screen 2600. The home screen 2600 may include a plurality of applications, such as Email, Clock, and Gallery. The user may invoke a control bar on the home screen 2600 by using a gesture operation, and then select a target device in the control bar. For example, the gesture operation may be a slide operation performed by the user from a lower left corner upward on the home screen 2600 of the mobile phone. When detecting the gesture operation, the mobile phone may display a user interface 2610 on the home screen. The user interface 2610 may include a control bar 2611. The control bar 2611 includes at least one connectable device list, for example, may include "Smart screen" 2612 and "MateBook X" 2613. The user may tap "Smart screen" 2612 in the connectable device list, and the mobile phone may send a connection request instruction to "Smart screen" in response to the tap operation of the user on "Smart screen" 2612.

It should be noted that, in this embodiment of this application, an electronic device in the connectable device list displayed in the user interface 2610 may be another electronic device in a same local area network as the first device (mobile phone). Alternatively, an electronic device in the connectable device list displayed in the user interface 2610 may be an electronic device that logs in to a same user account as the first device (mobile phone).

In some other embodiments, the gesture operation may alternatively be another operation, for example, a slide operation performed from the lower right corner upward. In other embodiments, the gesture operation may alternatively be a slide operation performed from the lower left corner upward/from the lower right corner upward with specific pressure. For example, the mobile phone displays the control bar 2611 only when the mobile phone detects a slide operation performed from the upper left corner downward and a pressure sensor disposed on a display detects that a pressure value generated by the slide operation is greater than a threshold.

In another embodiment, the gesture operation may alternatively be a slide operation performed from the lower left corner upward/from the lower right corner upward, or the like, and the slide operation stays at the end point without an interval or touches and holds for preset duration. For example, the mobile phone displays the control bar 2611 only when the mobile phone detects a slide operation performed from the upper left corner downward and the mobile phone detects that the slide operation arrives at the end point and stays at the end point or touches and holds for preset duration (for example, 2 seconds).

In another embodiment, the gesture operation may be another operation, for example, an operation of drawing a circle or a polygon on the display. Alternatively, the gesture operation may be an operation such as "shake" or any specified air gesture. This is not limited in this embodiment of this application.

In a possible implementation, a voice instruction may alternatively be used to replace the foregoing gesture operation.

Figure 26B:
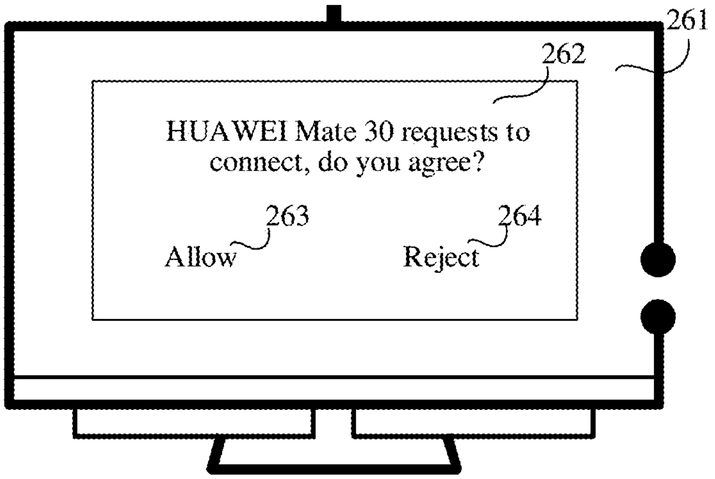
FIG. 26B is a schematic diagram of a user interface according to an embodiment of this application.

Correspondingly, "Smart screen" 2612 may receive the connection request instruction sent by the mobile phone (for example, HUAWEI Mate 30). For example, as shown in FIG. 26B, an interface 261 may be displayed on "Smart screen", and the interface 261 may include a prompt box 262. For example, content of the prompt box 262 may be "HUAWEI Mate 30 requests to connect, do you agree?", an "Allow" button 263, and a "Reject" button 264.

Specifically, after receiving the connection request instruction, a proxy service on "Smart screen" 2612 may collect parameters such as a power amplifier, a volume level, and a volume curve of "Smart screen". After the user taps the "Allow" button 263 in the interface 261 of "Smart screen", the proxy service on "Smart screen" 2612 may send the parameters such as the power amplifier, the volume level, and the volume curve of "Smart screen" to the mobile phone. FIG. 26A-1 to FIG. 26A-4 are still used as an example. A user interface 2620 may be displayed on the display of the mobile phone. The user interface 2620 may include an "Audio switching" button 2621 and a list 2622 of at least one connected device, for example, "Smart screen" 2612.

For example, if the user wants to transmit a piece of audio in the mobile phone to "Smart screen" 2612, the user may tap the "Audio switching" button 2613 in the interface 2620. In this case, the mobile phone may respond to the tap operation, and a user interface 2630 may be displayed on the display. The user interface 2630 may include a list 2631 of at least one device on which audio switching can be performed. The user may select "Smart screen" 2612 from the list 2631 of devices on which audio switching can be performed, to switch the audio on the mobile phone to "Smart screen" 2612 for playing.

Specifically, the mobile phone may write pulse code modulation (Pulse Code Modulation, PCM) data from an application to which the audio data belongs to an audio system, and then the audio system selects "Smart screen" 2612, and transfers the audio data to "Smart screen" 2612 by using a local area network (or a Wi-Fi direct connection). After receiving the audio data, the proxy service on "Smart screen" 2612 plays the audio data by using a player.

It should be noted that, the foregoing description is provided by using an example in which the mobile phone transmits audio data to one device. If the mobile phone needs to transmit audio data to two devices (for example, a device 1 and a device 2), one piece of audio data may be copied into two pieces of audio data, for example, audio data 1 and audio data 2. Then, the audio data 1 is transmitted to the device 1 and the audio data 2 is transmitted to the device 2. It should be understood that the audio data 1 and the audio data 2 are same audio data. Alternatively, one piece of binaural audio data on the mobile phone may be split into two channels, where audio data of one channel is transmitted to the device 1, and audio data of the other channel is transmitted to the device 2, thereby implementing audio data transmission.

S2502: The first device determines a first volume level.

In S2501, the first device may switch the audio data to the second device for playing, and then the first device may obtain a current volume level of the second device, and determine a first volume level of the first device corresponding to the current volume level of the second device. Specifically, the first device obtains the current volume level of the second device, and converts, according to the volume level conversion table, the current volume level of the second device to the volume level corresponding to the first device. For example, if the current volume level of the second device is 100, it can be learned, according to the correspondence in Table 2, that the corresponding volume level of the first device is 15.

It should be noted that the current volume level of the second device may be understood as a volume level at which the second device plays audio last time before the current connection is established.

S2503: The first device receives a trigger event.

The trigger event is an operation event that the user performs volume adjustment on the first device. For example, the user may perform a volume adjustment operation by using a physical button, a play control card, Settings, or the like on the first device (for example, a mobile phone).

It should be noted that the trigger event may be an event generated by a user operation performed on the mobile phone. For example, the user operation may be recorded as a "second operation".

It should be understood that, after the audio data of the first device is switched to the second device for playing, the user adjusts volume of the second device instead of local volume of the first device when adjusting volume on the first device.

S2504: The first device sends a volume adjustment instruction to the second device in response to the trigger event.

The volume adjustment instruction may include a second volume level of the first device, and the second volume level may be understood as a volume level corresponding to volume currently adjusted by the user on the first device.

Optionally, the volume adjustment instruction may further include an audio stream type of the audio data transmitted by the first device to the second device. For example, the audio stream type is media stream or ringtone stream. It should be noted that the audio stream type of the audio data may alternatively be transferred by the first device to the second device in a process of connecting the first device to the second device.

After the user adjusts the volume by using a physical button, a play control card, Settings, or the like, the first device may receive volume adjustment information, and then the first device may send a volume level (for example, the second volume level) corresponding to the volume adjustment to the second device. For example, the volume level of the first device determined in S2502 is 15, which is corresponding to a maximum volume level of the first device. In this case, when the volume is adjusted, the volume can only be decreased. That is, when the user adjusts the volume, for example, adjusts the volume level to 13, the volume level 13 may be sent to the second device, so that the second device determines a volume level required for audio playing.

S2505: The second device determines, according to a volume level mapping table, a third volume level corresponding to the second volume level sent by the first device.

It may be understood that the absolute volume conversion table may also be denoted as the "volume level mapping table", which may be used interchangeably sometimes in this application. It should be understood that meanings are consistent.

In this embodiment of this application, after receiving the volume adjustment instruction sent by the first device, the second device may find, based on the audio stream type, the absolute volume conversion table corresponding to the audio stream type, and then determine, based on the absolute volume conversion table stored in the second device, the third volume level corresponding to the second volume level included in the volume adjustment instruction. For example, if the second volume level is 13, that is, a volume level of a source end is 13, a volume level of a sink end may be obtained according to the mapping relationship in Table 2. For example, the third volume level may be 80. Certainly, the foregoing table is merely an example description. When the volume level of the source end is 13, the volume level of the sink end may alternatively be 85 or the like. This is not limited in this application.

It should be noted that, in this embodiment of this application, after the first device casts the audio data to the second device, if the audio stream type changes, for example, after the user changes audio data of a media stream to audio data of a ringtone stream on the mobile phone, an updated audio stream type may be sent to the second device. It should be understood that, when the updated audio stream type is sent to the second device, the updated audio stream type may be sent to the second device before the volume adjustment information. This is not limited in this application.

The following describes the foregoing process by using specific scenarios as examples.

Scenario 1: Audio data on a mobile phone is transmitted to a sound box.

In this scenario, a volume adjustment manner may include: adjustment through a physical button, adjustment on a play control card, and adjustment through a setting (for example, volume adjustment may be performed through "Sound & Vibration" in Settings on the mobile phone).

Figure 27A:
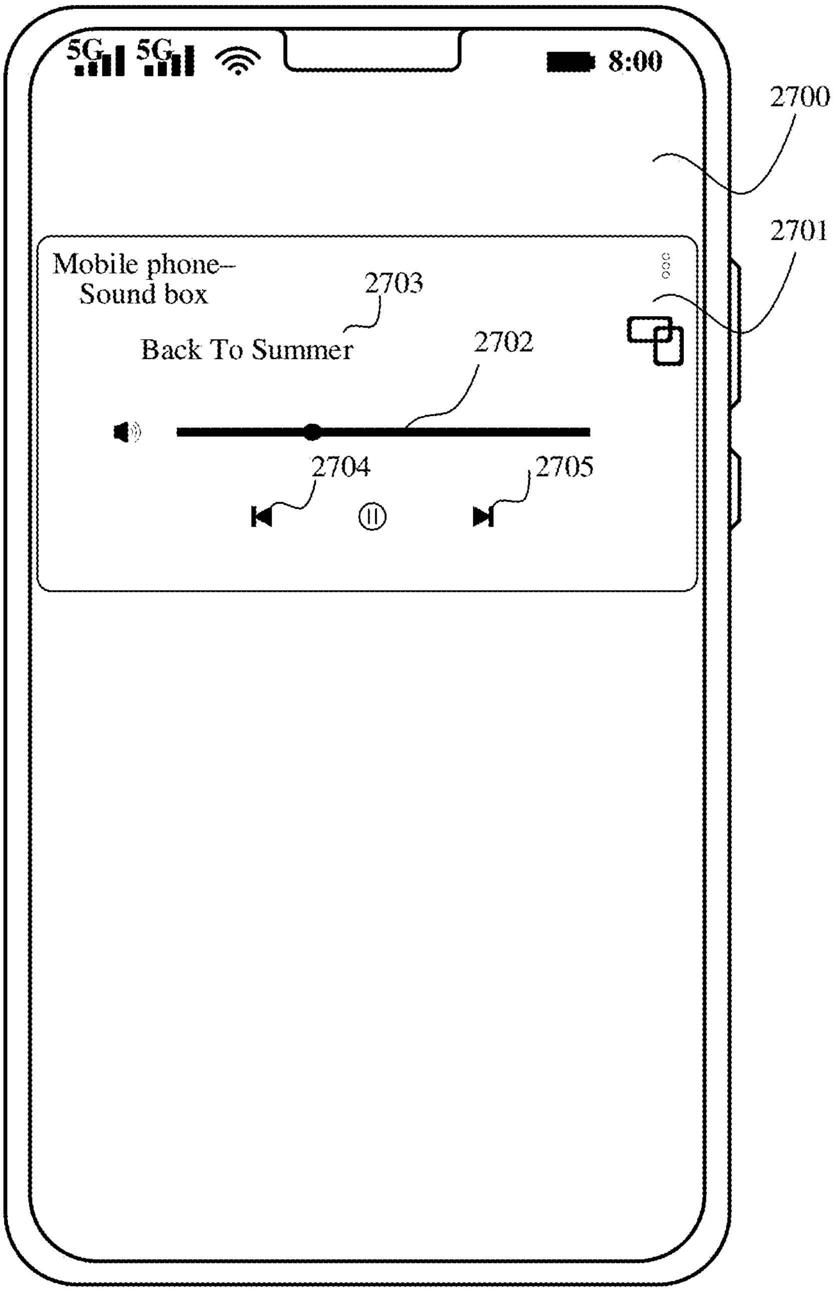
FIG. 27A is a schematic diagram of a user interface according to an embodiment of this application.

For example, as shown in FIG. 27A, a play control card is used as an example. It is assumed that a user interface 2700 is displayed on the mobile phone. The user interface 2700 may include a play control card 2701 of audio currently played by the sound box connected to the mobile phone. The play control card may include a volume touch button 2702, and the user may adjust volume by using the volume touch button 2702. Certainly, the play control card may further include the audio currently played by the sound box, for example, "Back To Summer" 2703, and audio switching buttons, including a forward audio switching button 2704 and a backward audio switching button 2705.

For example, the user may slide left or right on the volume touch button 2702 on the mobile phone to implement volume adjustment. In this process, when the user slides the volume touch button 2702, the mobile phone may transfer, to the sound box, a current volume level (for example, A1) corresponding to the volume touch button 2702. Correspondingly, after receiving the volume level A1 sent by the mobile phone, the sound box may determine, according to an absolute volume conversion table stored in the sound box, a volume level B1 matching the volume level A1, and then set volume corresponding to the volume level B1 on the sound box. In this way, the volume of the sound box is adjusted.

It should be understood that the volume touch button 2702 displayed on the mobile phone is a touch button corresponding to a volume level range of the mobile phone. The volume level range of the mobile phone is 0 to 15, and a volume level range of the sound box is 0 to 70. FIG. 27A is used as an example. It is assumed that a current volume level of the volume touch button in FIG. 27A is 5, that is, a volume level on the mobile phone corresponding to the volume level of the sound box is 5. In this case, the volume level 5 is sent to the sound box. The sound box may determine, according to the absolute volume conversion table, that when the volume level on the mobile phone is 5, the volume level on the sound box is 35.

Scenario 2: Audio data on a mobile phone is transmitted to a smart screen.

Figure 27B:
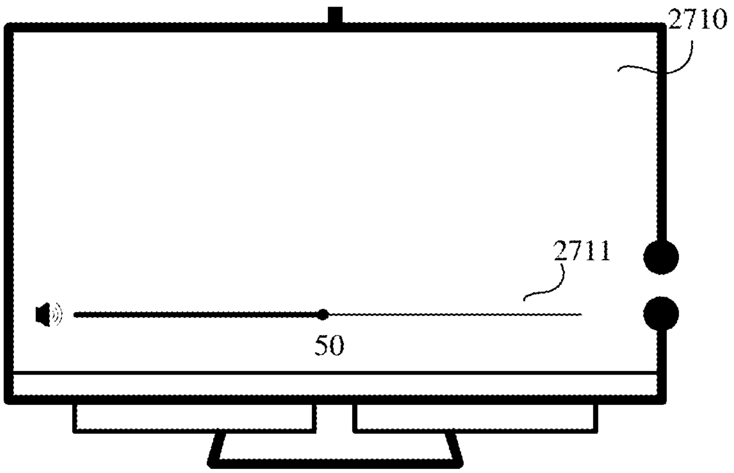
FIG. 27B is a schematic diagram of a user interface according to an embodiment of this application.

When audio on the mobile phone is sent to the smart screen, volume adjustment may be performed by using a physical button or a play control card. Adjustment through a physical button is used as an example. As shown in FIG. 27B, after a user triggers volume adjustment information on the mobile phone by using the physical button, the smart screen may receive the volume adjustment information, determine a volume level based on an absolute volume conversion table, and display a volume bar on a display of the smart screen. For example, refer to an interface 2710 shown in FIG. 27B. The interface 2710 may include a volume bar 2711. The user can view current volume of the smart screen based on a number displayed on the volume bar. For example, a volume level currently displayed on the volume bar is 50.

S2506: The second device plays the audio data based on volume corresponding to the third volume level.

After determining the corresponding volume level according to the absolute volume conversion table, the second device may play, based on absolute volume corresponding to the determined volume level, the audio data delivered by the first device. Because the absolute volume conversion table is a table of conversion between volume levels of two devices that is preconfigured based on an absolute volume baseline, volume of an audio delivery device can be consistent when two devices perform volume adjustment, thereby implementing collaborative volume adjustment of a plurality of devices.

Figure 28:
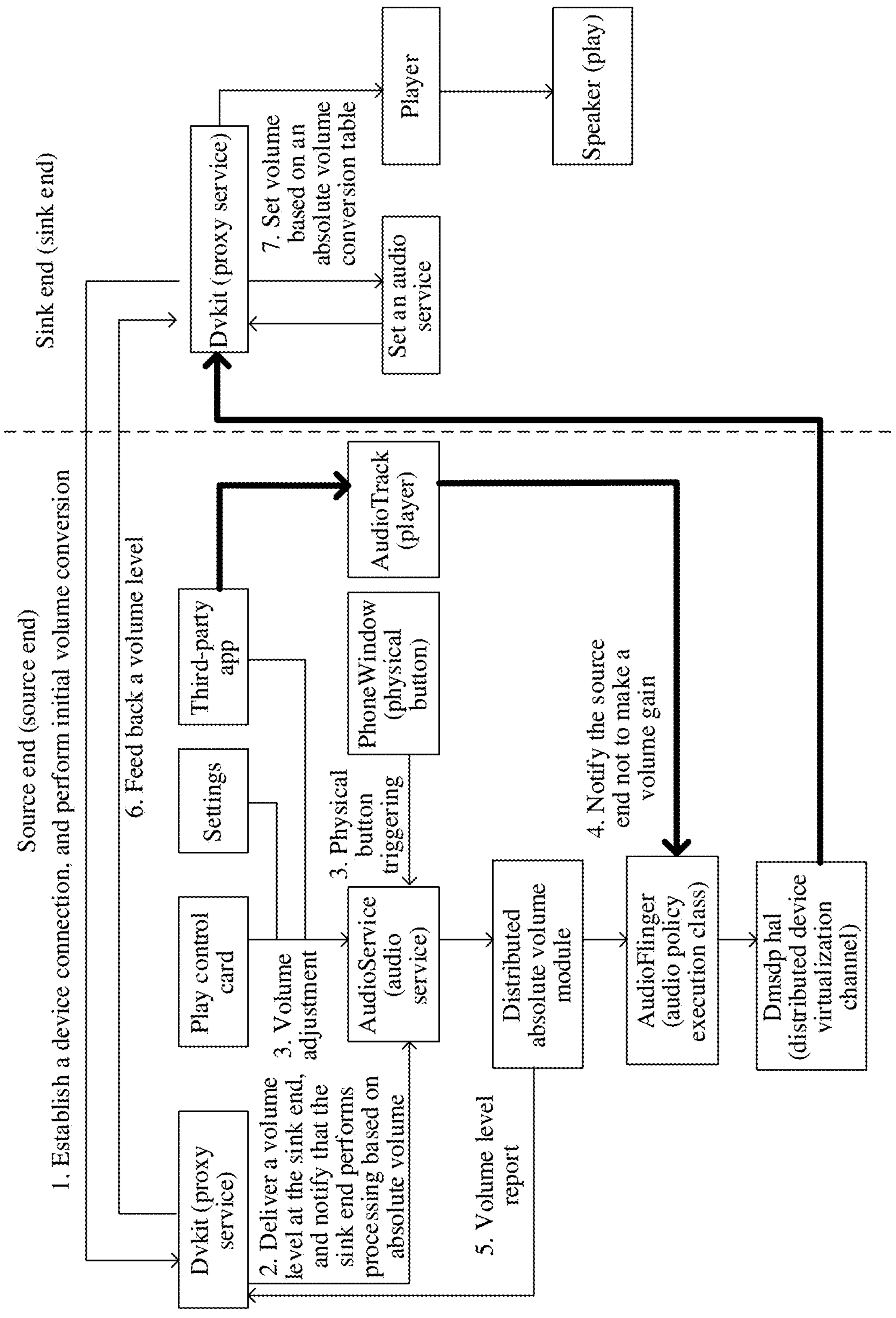
FIG. 28 is a flowchart of another volume adjustment method according to an embodiment of this application.

FIG. 28 is a flowchart of another volume adjustment method according to an embodiment of this application. An implementation process of the method shown in FIG. 28 is described by using an example in which there is one sink end device. Specifically, the method may include the following steps.

1. Establish a connection between a source end and a sink end, and perform initial volume conversion, that is, convert a current volume level of the sink end to a volume level of the source end, to adjust volume at the source end.

2. A proxy service (Dvkit) of a source end device notifies an audio service (AudioService) of the source end device to perform processing for the sink end device based on absolute volume, and delivers a volume level of the sink end device to the audio service (AudioService).

3. A user triggers volume adjustment information on the source end device by using a play control card, a setting, a physical button, or the like. After receiving the volume adjustment information, the audio service (AudioService) may send the volume adjustment information to a distributed absolute volume module.

4. The distributed absolute volume module notifies AudioFlinger of the device not to make a volume gain on the device.

5. The distributed absolute volume module reports a volume level corresponding to the volume adjustment information to the proxy service (Dvkit).

6. The proxy service (Dvkit) of the source end device feeds back the volume level to a proxy service of the sink end device.

7. Correspondingly, after receiving the volume level, the proxy service of the sink end device may determine a corresponding volume level according to an absolute volume conversion table stored in the sink end device, then specify volume, and notify a player to play audio based on the specified volume.

It should be noted that a thick line in FIG. 28 represents a data flow, and another line represents a control flow.

It can be learned from the description of the foregoing embodiment that, in a multi-device connection scenario, an audio play effect difference between different electronic devices for a same audio file can be reduced, that is, consistency of audio play effect can be implemented. In addition, volume consistency of audio played by a plurality of devices can be implemented. That is, synchronous playing of a sound can be implemented.

However, with development of distributed technologies, there are more scenarios of multi-device connection. For example, a mobile phone is connected to virtual reality VR glasses, so that a user can watch a video in the mobile phone by using the VR glasses. For another example, a mobile phone is connected to a game controller, so that a user can use the game controller to play a mobile game. There may be some vibration scenarios such as pressing a button, shooting, or drumming in a game or video, and simulation may be performed through vibration in combination with sound playing, to enhance realistic experience of the user.

Because human touch is usually more sensitive than hearing and vision, if there is an error between vibration and sound playing, poor user experience may be easily caused. Therefore, how to implement synchronous playing of a sound and vibration across devices has important practical value for enhancing realistic experience of a user.

It should be understood that vibration is generated by a linear motor in an electronic device. Vibration of the linear motor can be controlled, so that the electronic device can simulate vibration in different scenarios, such as shooting, or vibration generated when a button is pressed.

Based on this, this application further provides an audio and vibration synchronized playing method. A master device parses an audio and vibration file, and sends audio data and vibration data to a corresponding slave device, so that the slave device does not need to parse the audio and vibration file. When receiving the audio data and the vibration data from the master device, the slave device may play a sound and vibration in a synchronous playing manner corresponding to an audio device capability of the slave device. This implements audio and vibration synchronized playing. In this embodiment of this application, the audio device capability is used to indicate whether an audio device supports distribution of audio data and vibration data. For example, the audio device capability may be specifically understood as whether a power amplifier (for example, a smart PA) in the electronic device supports distributing vibration data to a motor, or may be understood as whether an audio hardware abstraction layer (for example, Audio HAL) supports distributing vibration data to a vibrator (that is, a vibration playing device such as a motor). That the power amplifier supports distribution of audio data and vibration data is used as an example. That the power amplifier supports distribution of audio data and vibration data may be understood as that the power amplifier supports distributing audio data to an audio playing device (such as a speaker) and distributing vibration data to a vibrator (such as a motor).

Figure 29:
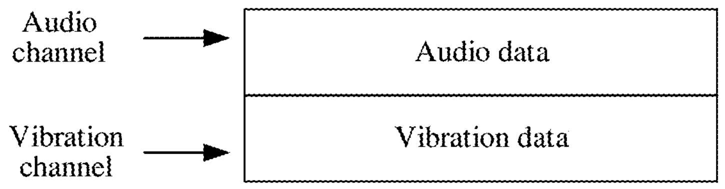
FIG. 29 is a schematic diagram of a structure of an audio and vibration file according to an embodiment of this application.

In this embodiment of this application, the vibration data (haptic data) is used to represent vibration, and is obtained by processing a vibration file. For example, the vibration file includes the vibration data. In this embodiment of this application, a vibration file and an audio file may be different files. To be specific, the vibration file includes vibration data, the audio file includes audio data, and the audio file does not include vibration data. Alternatively, the audio file may include audio data and vibration data, that is, the vibration data is added to the audio file. In this case, the electronic device may obtain the audio data and the vibration data by processing the audio file. For example, in this embodiment of this application, a sound channel may be added to the audio file to carry the vibration data. The sound channel used to carry vibration data may be referred to as a vibration channel, and a sound channel used to carry audio data may be referred to as an audio channel. For example, as shown in FIG. 29, an audio file includes audio data and vibration data, where the audio data is carried on an audio channel, and the vibration data is carried on a vibration channel. It should be noted that, in this embodiment of this application, one audio file may include audio data carried on one or more audio channels. FIG. 29 is merely an example illustration of one audio file, and does not constitute a limitation on an example of an audio file including vibration data.

For ease of description, an audio file that includes only audio data but does not include vibration data is referred to as an audio file, and an audio file that includes vibration data and audio data is referred to as an audio and vibration file.

Figure 30:
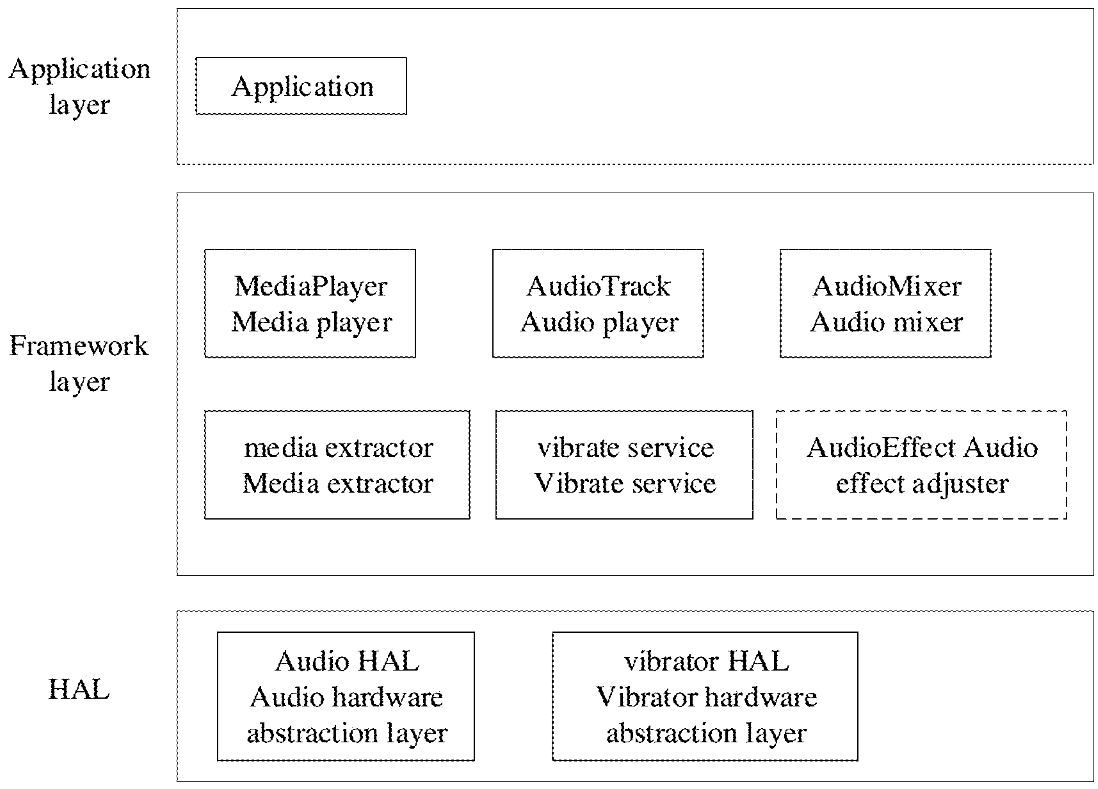
FIG. 30 is a schematic diagram of a structure of a software system of an electronic device according to an embodiment of this application.

In embodiments of this application, a Harmony operating system with a layered architecture is used as an example to describe the software system of the electronic device. As shown in FIG. 30, an application layer includes applications such as Camera, Gallery, Map, a game application, and Music. The application may be configured to obtain a file, for example, an audio and vibration file (such as a haptic ogg file), a vibration file (haptic file), or an audio file (ogg file).

A framework layer may include a media player (MediaPlayer), an audio player (AudioTrack), an audio mixer (AudioMixer), a media extractor (media extractor), a vibrate service (vibrate service), and the like.

MediaPlayer may be configured to play audio and a video. The media extractor is configured to perform processing such as decoding or decompression on an audio file. AudioTrack may be configured to play audio in a specific format, for example, an audio file in a wav format. AudioMixer mixes audio data from different AudioTracks. The vibrate service is configured to provide an interface for controlling vibration.

In some embodiments, the framework layer further includes an audio effect adjuster (AudioEffect, which may also be referred to as an audio effect processor). AudioEffect is configured to add corresponding audio effect, such as pop, classical, jazz, vocal, or the like. Certainly, the framework layer may not include AudioEffect.

A hardware abstraction layer includes an audio hardware abstraction layer (Audio HAL), a vibrator hardware abstraction layer (vibrator HAL), a Wi-Fi module, or another communication module. Audio HAL is configured to invoke a power amplifier (such as a smart PA) to adjust power and output the power to an audio playing device (such as a speaker) to play a sound. The vibrator HAL is configured to invoke a motor or a vibration sensor to generate vibration.

The following uses the software system shown in FIG. 30 as an example. A method for implementing audio and vibration synchronized playing for an electronic device is described.

Figure 31A:
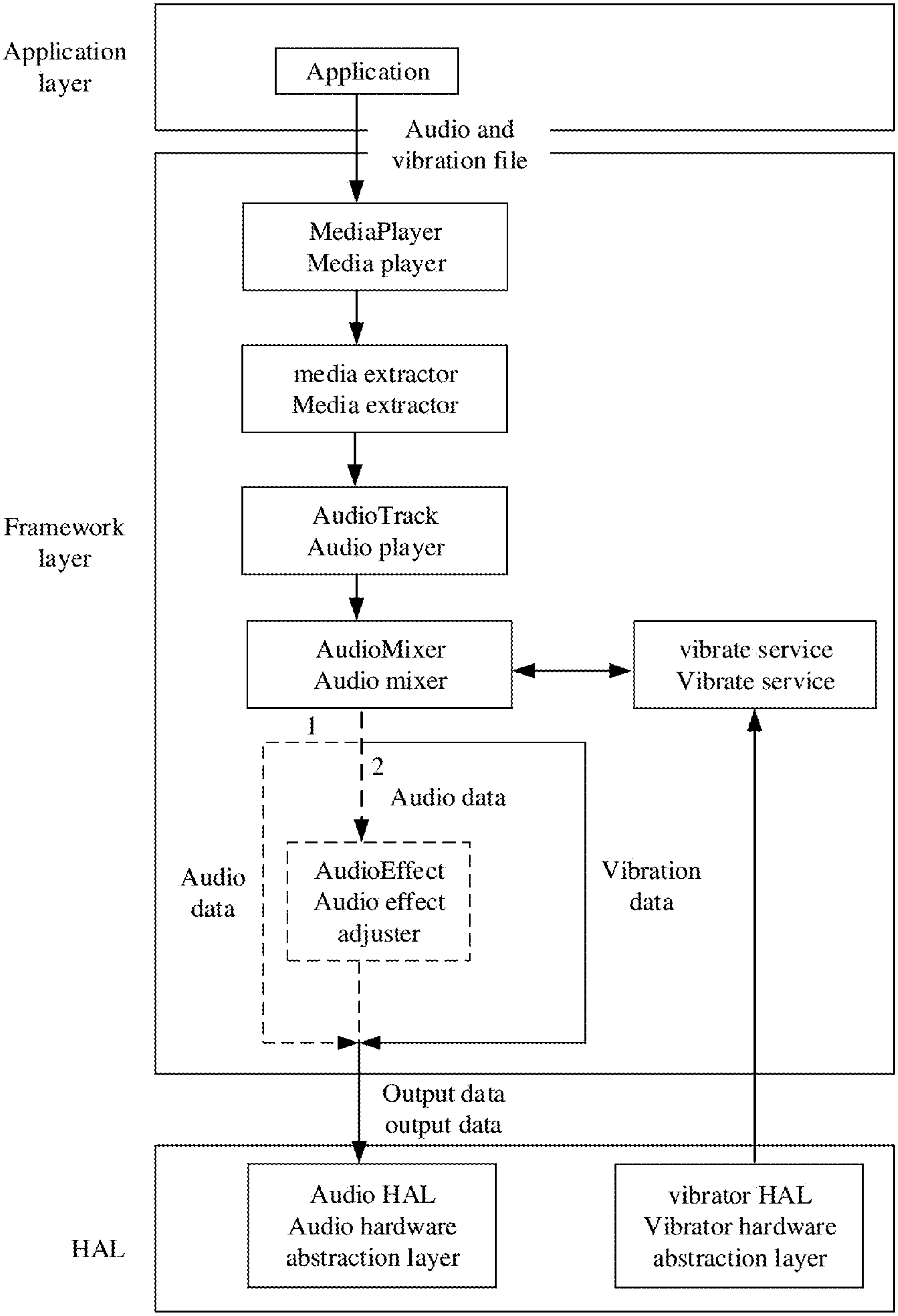
FIG. 31A is a schematic diagram of audio and vibration synchronized playing according to an embodiment of this application.

For example, when a power amplifier supports distribution of audio data and vibration data, that is, the power amplifier supports distributing audio data to an audio playing device (such as a speaker) and distributing vibration data to a vibrator (such as a motor), in this case, for an electronic device, an audio and vibration file may be obtained by adding vibration data to an audio file, to implement audio and vibration synchronized playing. The software system shown in FIG. 30 is used as an example. In this embodiment of this application, audio and vibration synchronization may be implemented in the following manner, as shown in FIG. 31A. An application at the application layer sends an audio and vibration file to MediaPlayer in response to a trigger event (such as a user operation or another trigger event). Then, MediaPlayer sends the audio and vibration file to the media extractor. The media extractor parses (for example, decodes or decompresses) the audio and vibration file. The media extractor sends data (vibration data and audio data) obtained by parsing the audio and vibration file to AudioTrack. AudioTrack outputs data obtained by parsing the audio file to AudioMixer. AudioMixer identifies whether vibration data is included in the data from AudioTrack. If the vibration data is included, an audio device capability is obtained from the vibrate service. When the audio device capability indicates that the power amplifier supports distribution of audio data and vibration data, AudioMixer outputs the audio data and the vibration data to Audio HAL as output data (output data). Audio HAL outputs the vibration data and the audio data to the power amplifier, and then the power amplifier distributes the vibration data to the vibrator for playing, and distributes the audio data to the audio player (such as a speaker) for playing. In a possible implementation, AudioMixer returns the audio data and the vibration data to AudioTrack, and AudioTrack outputs the audio data and the vibration data to Audio HAL as output data. In a possible implementation, AudioMixer returns the vibration data to AudioTrack, and sends the audio data to AudioEffect. AudioEffect processes the audio data to obtain audio data to which corresponding audio effect is added. Then, AudioEffect returns the audio data to which the corresponding audio effect is added to AudioTrack. If AudioTrack receives the audio data to which the corresponding audio effect is added, AudioTrack sends the audio data to which the corresponding audio effect is added and the vibration data from AudioMixer to Audio HAL as output data. Alternatively, AudioMixer sends the vibration data and the audio data to AudioEffect. AudioEffect processes the audio data to obtain audio data to which corresponding audio effect is added, and AudioEffect does not process the vibration data. Then, AudioEffect sends the vibration data and the audio data to which the corresponding audio effect is added to Audio HAL. Because the vibration data and the audio data are simultaneously output to Audio HAL, audio and vibration synchronized playing is implemented.

Figure 31B:
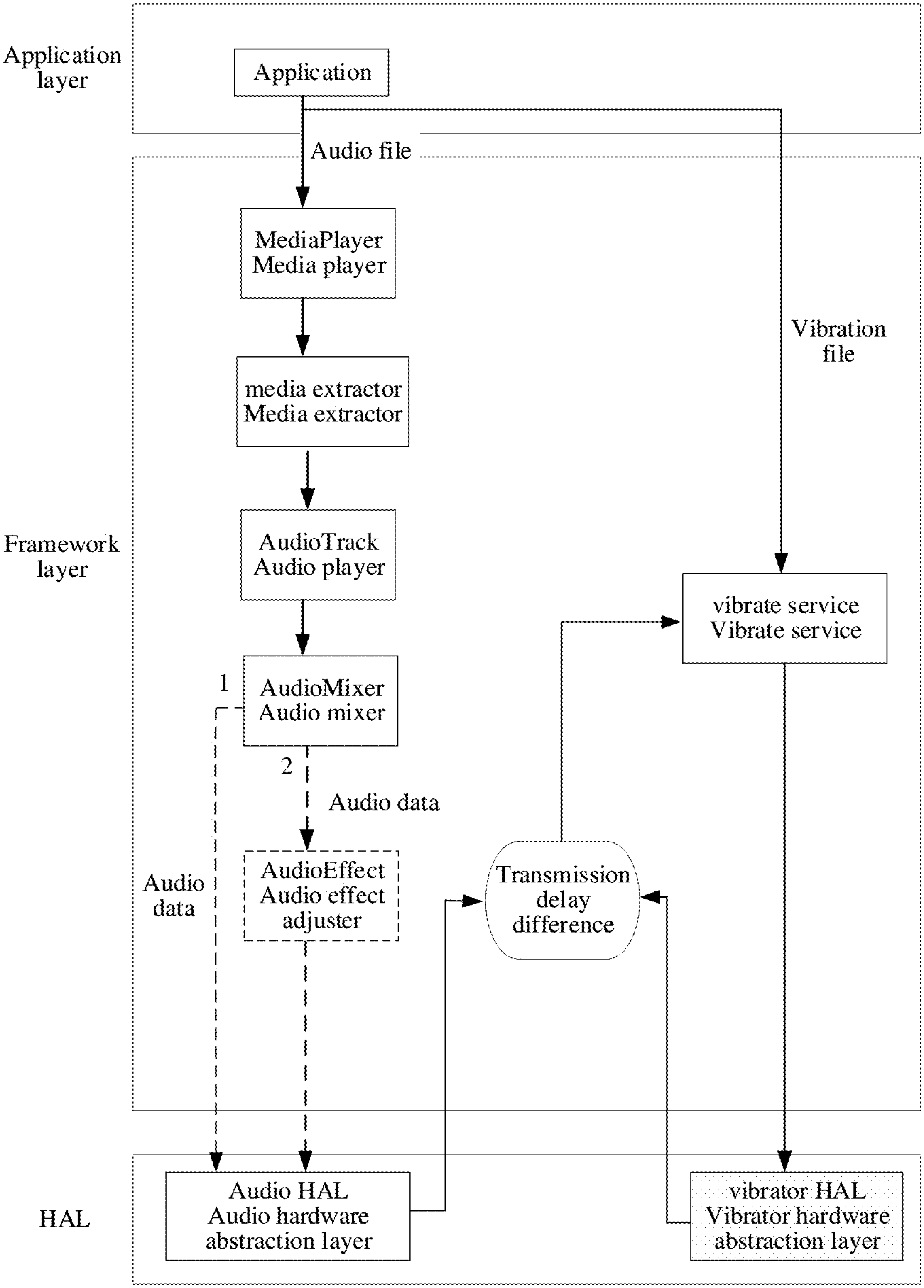
FIG. 31B is another schematic diagram of audio and vibration synchronized playing according to an embodiment of this application.

However, in some embodiments, if the power amplifier does not support distribution of audio data and vibration data, that is, the power amplifier supports only distribution of audio data to an audio playing device (such as a speaker), in this case, for an electronic device, a transmission delay difference between Audio HAL and the vibrator HAL may be calculated to implement audio and vibration synchronized playing. A transmission delay of Audio HAL refers to duration in which the audio data is transmitted from Audio HAL to the audio playing device (such as a speaker), and a transmission delay of the vibrator HAL refers to a delay of transmitting the vibration data from the vibrator HAL to the vibrator (such as a motor). The software system shown in FIG. 30 is used as an example. In this embodiment of this application, audio and vibration synchronization may be implemented in the following manner, as shown in FIG. 31B. An application at the application layer sends an audio file to MediaPlayer in response to a trigger event (such as a user operation or another trigger event). MediaPlayer sends the audio file to the media extractor. The media extractor parses (for example, decodes or decompresses) the audio file. The media extractor sends data obtained by parsing the audio file to AudioTrack. AudioTrack outputs data obtained by parsing the audio file to AudioMixer. After performing audio mixing processing, AudioMixer obtains corresponding audio data, and outputs the audio data to Audio HAL. Audio HAL outputs the audio data to the power amplifier, and the power amplifier distributes audio data that has undergone power amplification processing to the audio playing device to play a sound. In a possible implementation, AudioMixer may further send the audio data to AudioEffect, and AudioEffect processes the audio data to obtain audio data to which corresponding audio effect is added. Then, AudioEffect outputs the audio data to which the corresponding audio effect is added to Audio HAL. In addition, an application at the application layer sends a vibration file to the vibrator service in response to a trigger event (such as a user operation or another trigger event). The vibrator service parses the vibration file to obtain vibration data, and calculates a transmission delay difference between Audio HAL and the vibrator HAL based on a transmission delay of Audio HAL and a transmission delay of the vibrator HAL. Then, the vibrator service outputs the vibration data to the vibrator HAL based on the transmission delay difference between Audio HAL and the vibrator HAL. The vibrator HAL distributes the vibration data to the vibrator (such as a motor) for corresponding vibration. The vibrator service outputs the vibration data to the vibrator HAL based on the transmission delay difference between the audio HAL and the vibrator HAL, instead of distributing the vibration data to the vibrator upon receiving the vibration data, so that time points at which the audio playing device and the vibrator obtain the data are approximately the same. In this way, audio and vibration synchronized playing is implemented.

However, in a multi-device connection scenario, considering that device capabilities of slave devices differ, to implement cross-device audio and vibration synchronization, DV Audio HAL may be added to the hardware abstraction layer of the software system, and a proxy application may be added to the application layer, so that a master device sends vibration data and audio data to a slave device. For example, a master device is connected to one slave device. With reference to a diagram of structures of software systems of a master device and a slave device in FIG. 32A and FIG. 32B, an audio and vibration synchronized playing method in an embodiment of this application is described in detail.

Figure 32A:
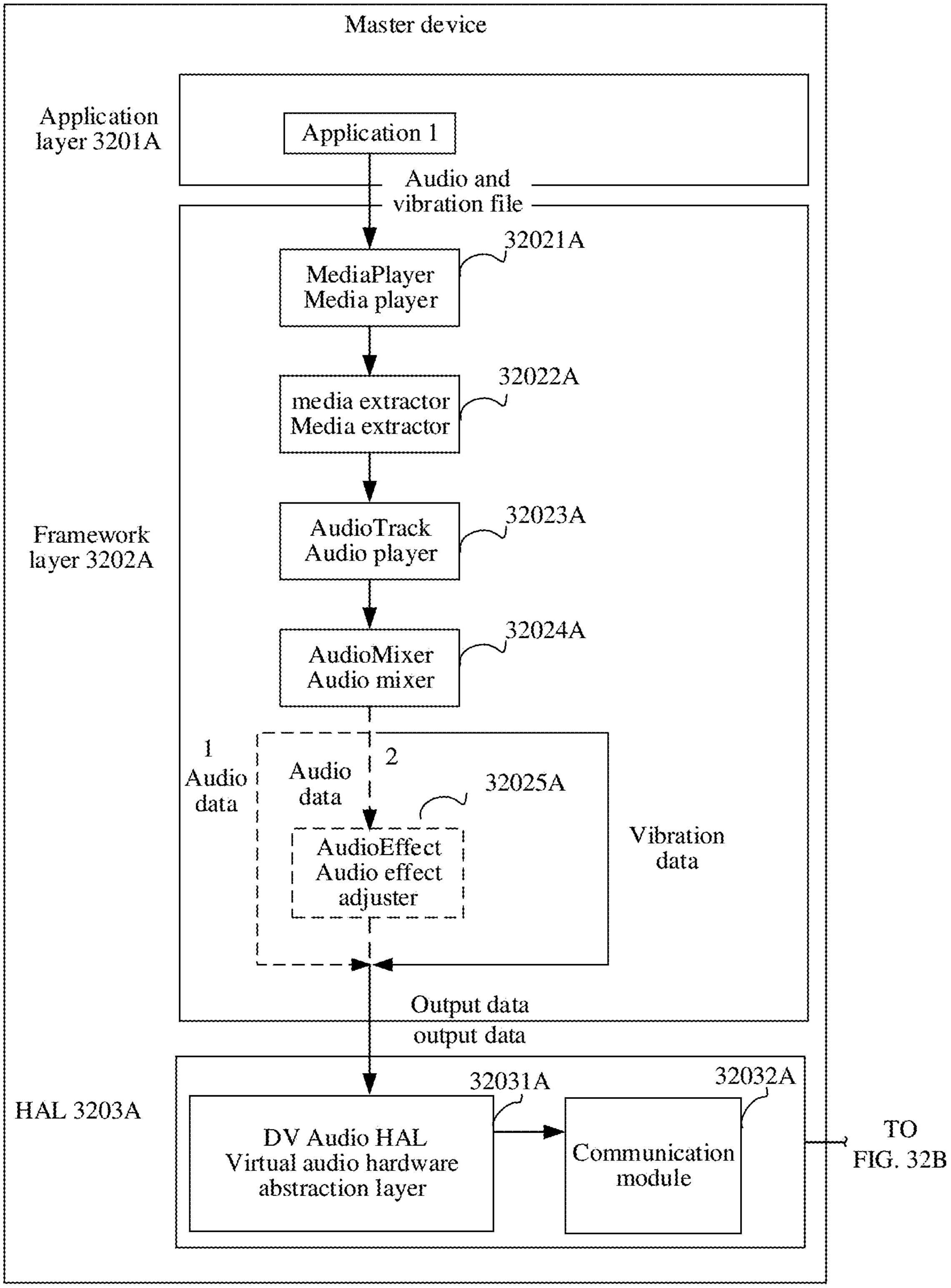
FIG. 32A and FIG. 32B are another schematic diagram of audio and vibration synchronized playing according to an embodiment of this application.
Figure 32B:
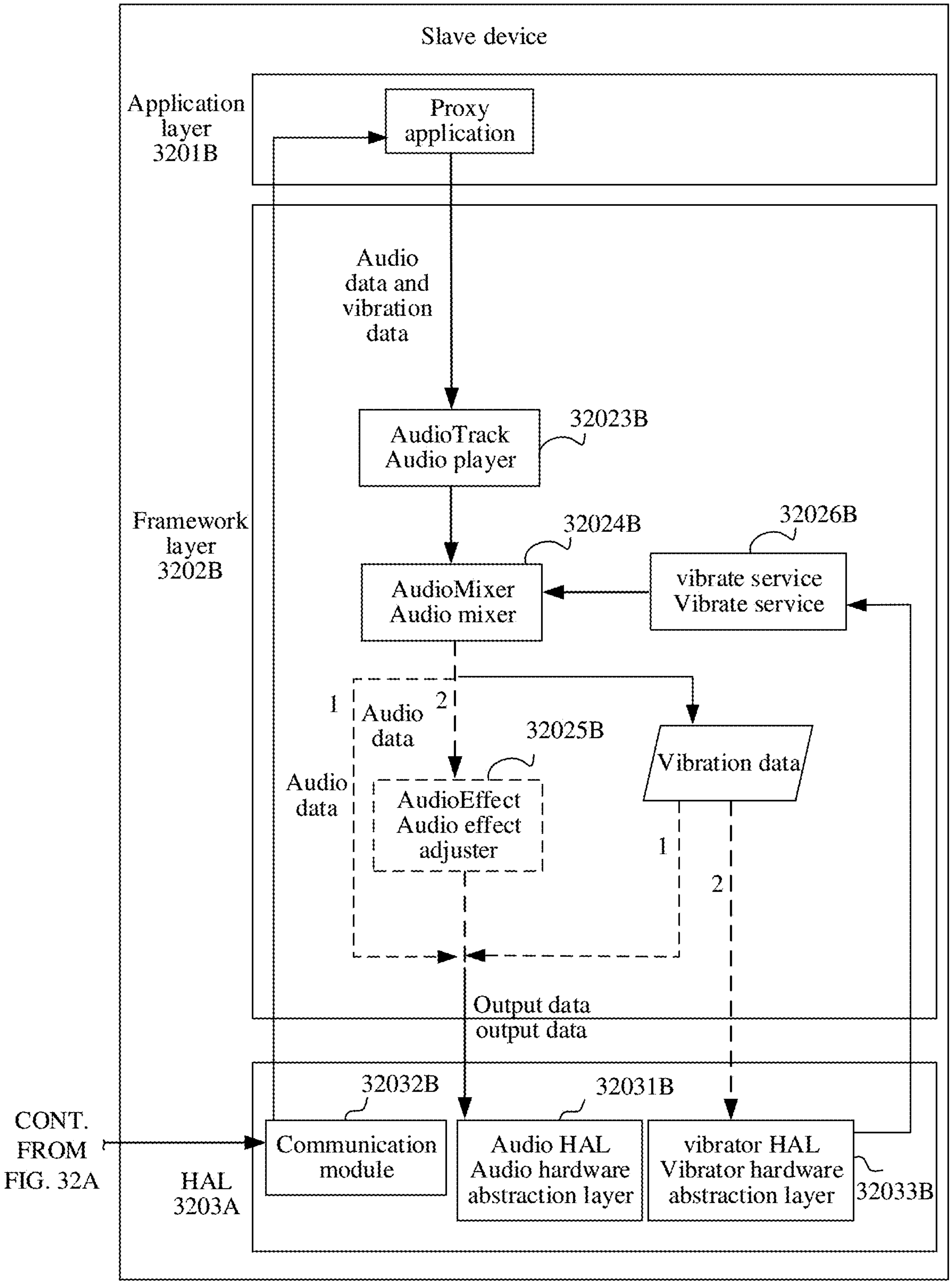

As shown in FIG. 32A and FIG. 32B, the software system of the master device includes an application layer 3201A, a framework layer 3202A, and a HAL 3203A. The application layer 3201A includes an application 1. The framework layer 3202A includes MediaPlayer 32021A, a media extractor 32022A, AudioTrack 32023A, AudioMixer 32024A, and AudioEffect 32025A. The HAL 3203A includes DV Audio HAL 32031A and a communication module 32032A. The software system of the slave device includes an application layer 3201B, a framework layer 3220B, and a HAL 3203B. The application layer 3201B includes a proxy application. The framework layer 3202B includes AudioTrack 32023B, AudioMixer 32024B, AudioEffect 32025B, and a vibrate service 32026B. The HAL 3203B includes Audio HAL 32031B, a communication module 32032B, and a vibrator HAL 32033B. It should be noted that DV Audio HAL 32031A may be understood as a virtual Audio HAL, which is configured to send vibration data and audio data to a slave device, and is a newly added module. The proxy application is configured to receive vibration data and audio data from the master device and is also a newly added module. It may be understood that, for the slave device, the software system may or may not include DV Audio HAL. This is optional. For the master device, the software system may or may not include the proxy application. This is optional. In addition, AudioEffect 32025A is optional for the master device. For the slave device, AudioEffect 32025B is optional.

In some embodiments, the application 1 receives a specific trigger event. The specific trigger event is used to trigger playing of an audio and vibration file. For example, the specific trigger event may include: an operation of playing a video or audio by a user, or receiving an audio and vibration file in a process of playing a video or running a game, or the like. In response to the specific trigger event, the application 1 sends a haptic ogg file (audio and vibration file) to MediaPlayer 32021A. MediaPlayer 32021A sends the haptic ogg file to the media extractor 32022A. The media extractor 32022A parses (for example, decodes or decompresses) the haptic ogg file. Then, the media extractor 32022A sends data obtained by parsing the haptic ogg file to AudioTrack 32023A. AudioTrack 32023A sends data obtained by parsing the haptic ogg file to AudioMixer 32024A. The data obtained by parsing the haptic ogg file by the media extractor 32022A includes vibration data and audio data. AudioMixer 32024 identifies an actual playing device of the vibration data and the audio data. When the actual playing device of the vibration data and the audio data is the slave device, AudioMixer 32024 sends the vibration data and the audio data as output data (output data) to DV Audio HAL 32031A. DV Audio HAL 32031A sends the vibration data and the audio data to the communication module 32032A. Then, the communication module 32032A sends the vibration data and the audio data to the communication module 32032B. The communication module 32032B sends the vibration data and the audio data to the proxy application. After receiving the vibration data and the audio data from the communication module 32032B, the proxy application outputs the vibration data and the audio data to AudioTrack 32023B. AudioTrack 32023B outputs the vibration data and the audio data to AudioMixer 32024B. AudioMixer 32024B recognizes that the data from AudioTrack 32023B includes the vibration data, and obtains an audio device capability from the vibrate service 32026B. When the audio device capability indicates that the power amplifier supports distribution of audio data and vibration data, AudioMixer 32024B sends the audio data and the vibration data to Audio HAL 32031B as output data (output data). Audio HAL 32031B outputs the vibration data and the audio data to the power amplifier, and then the power amplifier distributes the vibration data to the vibrator for playing, and distributes the audio data to the audio player (such as a speaker) for playing, to implement audio and vibration synchronization.

In some other embodiments, if the power amplifier does not support vibration data distribution, that is, the power amplifier supports only distribution of audio data to the audio playing device (such as a speaker), AudioMixer 32024B sends the audio data to Audio HAL 32031B. After sending the audio data to Audio HAL 32031B, AudioMixer 32024B sends the vibration data to the vibrator HAL 32033B after first duration. The first duration includes a transmission delay difference between Audio HAL 32031B and the vibrator HAL 32033B. Audio HAL 32031B outputs the audio data to the power amplifier, and the power amplifier distributes audio data that has undergone power amplification processing to the audio playing device to play a sound. The vibrator HAL 32033B distributes the vibration data to the vibrator (such as a motor) for corresponding vibration. Therefore, Audio HAL and the vibrator HAL obtain data at approximately the same time, thereby implementing audio and vibration synchronized playing.

For example, a transmission delay of Audio HAL 32031B is N1, that is, a time period required for transmitting the audio data from Audio HAL 32031B to the audio playing device is N1, and a transmission delay of the vibrator HAL 32033B is N2, that is, a time period required for transmitting the vibration data from the vibrator HAL 32033B to the audio playing device is N2. If N1 is greater than N2, AudioMixer 32024B outputs the audio data, and after N1-N2, outputs the vibration data. Therefore, a time point at which the audio data arrives at the audio player and a time point at which the vibration data arrives at the vibrator are approximately the same, thereby implementing audio and vibration synchronized playing.

In some embodiments, for the master device, before sending the audio data to Audio HAL 32031A, AudioMixer 32024A may further send the audio data to AudioEffect 32025A, and AudioEffect 32025A processes the audio data to obtain audio data to which corresponding audio effect is added, and then outputs the audio data to which the corresponding audio effect is added to DV Audio HAL 32031A. For example, to simultaneously send the vibration data and the audio data to which the corresponding audio effect is added to DV Audio HAL 32031A, in some embodiments, AudioMixer 32024A may further send the vibration data to AudioEffect 32025A. However, AudioEffect 32025A does not process the vibration data. After processing the audio data, AudioEffect 32025A sends the vibration data and the audio data to which the corresponding audio effect is added to DV Audio HAL 32031A as output data. In a possible implementation, AudioMixer 32024A returns the vibration data to AudioTrack 32023A, and AudioEffect 32025A also returns the audio data to which the corresponding audio effect is added to AudioTrack 32023A. After receiving the vibration data and the audio data to which the corresponding audio effect is added, AudioTrack 32023A sends the vibration data and the audio data to which the corresponding audio effect is added to DV Audio HAL 32031A as output data. In this case, DV Audio HAL 32031A sends the vibration data and the audio data to which the corresponding audio effect is added to the communication module 32032A as output data.

In some other embodiments, for the slave device, AudioMixer 32024B may alternatively send the audio data to AudioEffect 32025B before sending the audio data to Audio HAL 32031B. AudioEffect 32025B processes the audio data to obtain audio data to which corresponding audio effect is added. Then, AudioEffect 32025B outputs the audio data to which the corresponding audio effect is added to Audio HAL 32032B.

It should be noted that, in the foregoing embodiment, only one slave device in a multi-device connection scenario is used as an example for description, and this embodiment of this application may be further applied to a case in which a master device is connected to a plurality of slave devices.

Figure 33:
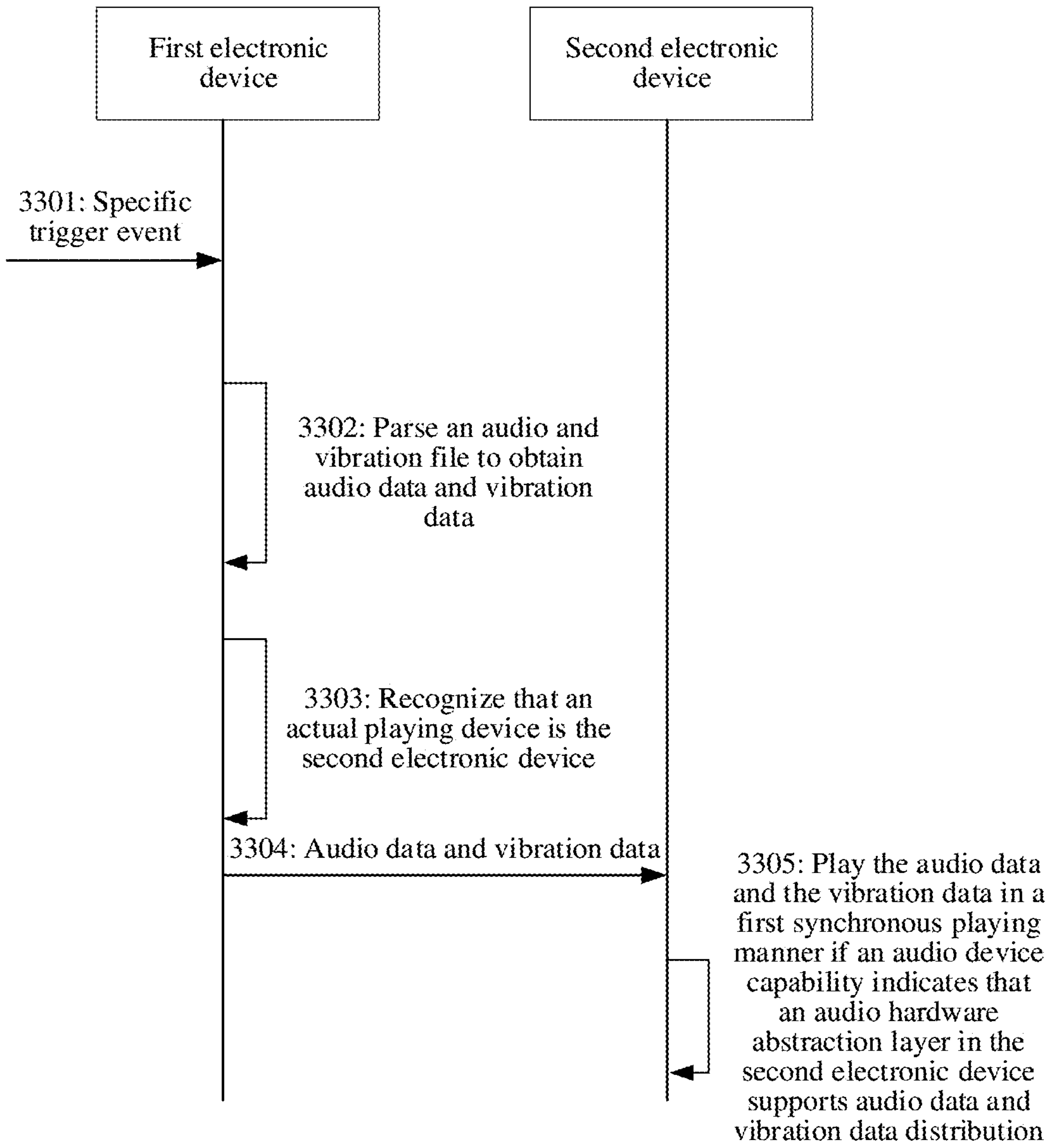
FIG. 33 is a schematic flowchart of an audio and vibration synchronized playing method according to an embodiment of this application.

Based on the foregoing embodiment, this application provides an audio and vibration synchronized playing method, applied to multi-device connection. For example, an audio device capability indicates whether an audio hardware abstraction layer supports distribution of vibration data and audio data. Specifically, as shown in FIG. 33, the method includes the following steps.

3301: A first electronic device receives a specific trigger event. The specific trigger event is used to trigger playing of an audio and vibration file.

3302: In response to the specific trigger event, the first electronic device parses an audio and vibration file to obtain vibration data and audio data.

3303: The first electronic device identifies that an actual playing device of the vibration data and the audio data includes a second electronic device.

For example, the first electronic device may determine the actual playing device of the vibration data and the audio data with reference to information such as a device capability identified by a device identifier in a device association list. The device association list includes at least one device identifier, and each device identifier is used to identify one electronic device connected to or associated with the first electronic device, that is, a slave device connected to the first electronic device.

3304: The first electronic device sends the vibration data and the audio data to the second electronic device.

3305: The second electronic device receives the vibration data and the audio data from the first electronic device, and if an audio device capability indicates that an audio hardware abstraction layer in the second electronic device supports audio data and vibration data distribution, plays the audio data and the vibration data in a first synchronous playing manner. When playing is performed in the first synchronous playing manner, both the audio data and the vibration data are distributed by the audio hardware abstraction layer to a corresponding playing device in the second electronic device.

For example, that both the audio data and the vibration data are distributed by the audio hardware abstraction layer to the corresponding playing device in the second electronic device may be implemented in the following manners.

Manner 1: Both the audio data and the vibration data are distributed by the audio hardware abstraction layer to a power amplifier in the second electronic device, and then the power amplifier distributes the audio data and the vibration data to the corresponding playing device in the second electronic device.

Manner 2: The audio data is distributed by the audio hardware abstraction layer to a power amplifier in the second electronic device, and then the power amplifier distributes the audio data to an audio playing device (such as a speaker). The vibration data is distributed by the audio hardware abstraction layer to a vibrator (that is, a vibration playing device such as a motor) in the second electronic device.

In some other embodiments, the second electronic device receives the vibration data and the audio data from the first electronic device, and if an audio device capability indicates that an audio hardware abstraction layer in the second electronic device does not support vibration data distribution, plays the audio data and the vibration data in a second synchronous playing manner. When playing is performed in the second synchronous playing manner, the audio data is distributed by the audio hardware abstraction layer in the second electronic device to an audio playing device in the second electronic device, and the vibration data is distributed by a vibrator hardware abstraction layer in the second electronic device to a vibrator in the second electronic device. A difference between a moment at which the vibrator hardware abstraction layer distributes the vibration data and a moment at which the audio hardware abstraction layer distributes the audio data is a difference between a first transmission delay and a second transmission delay, the first transmission delay is duration in which the audio data arrives at the audio playing device from the audio hardware abstraction layer, and the second transmission delay is duration in which the vibration data arrives at the vibrator from the vibrator hardware abstraction layer. In this way, audio and vibration synchronized playing is implemented.

It should be understood that in this embodiment of this application, in step 3303, the actual playing device identified by the first electronic device for playing the vibration data and the audio data may further include the first electronic device. In this case, the first electronic device and the second electronic device may simultaneously play audio and vibration. For a method for implementing audio and vibration synchronized playing by the first electronic device, refer to the method shown in FIG. 31A or FIG. 31B. Details are not described herein again. Alternatively, in step 3303, the first electronic device identifies that the actual playing device of the vibration data and the audio data may further include another slave device, for example, a third electronic device, so that a plurality of slave devices can implement audio and vibration synchronized playing.

In this embodiment of this application, the audio file is parsed by the master device, so that the master device can directly send the audio data and the vibration data to the slave device. Therefore, the slave device may not have an audio file (for example, an audio file including vibration data) parsing capability. After the slave device is connected to the master device, cross-device audio and vibration synchronized playing can also be implemented. Therefore, the audio file parsing capability of the slave device is not limited in the audio and vibration synchronized playing method provided in this embodiment of this application.

In addition, the audio and vibration synchronized playing method shown in FIG. 33 may be applied to a distributed audio scenario. For example, with reference to an audio and picture synchronization capability (that is, a capability for synchronous playing of audio and a video picture), audio, picture, and vibration synchronization may be implemented on a slave device. This can enhance visual, auditory, and tactile experience of a user, thereby providing immersive experience for the user. Alternatively, an audio and vibration file (that is, an audio file including vibration data) parsing capability on the master device is extended to diversified scenarios such as a video call, a small video, and online teaching, to bring better interaction experience to the user.

In the foregoing embodiments provided in this application, the method provided in embodiments of this application is described from a perspective of an electronic device serving as an execution body. To implement functions in the foregoing method provided in embodiments of this application, the electronic device may include a hardware structure and/or a software module, and the foregoing functions are implemented in a form of a hardware structure, a software module, or a combination of a hardware structure and a software module. Whether a function in the foregoing functions is performed in a manner of a hardware structure, a software module, or a hardware structure and a software module depends on specific applications and design constraints of the technical solutions.

Figure 34:
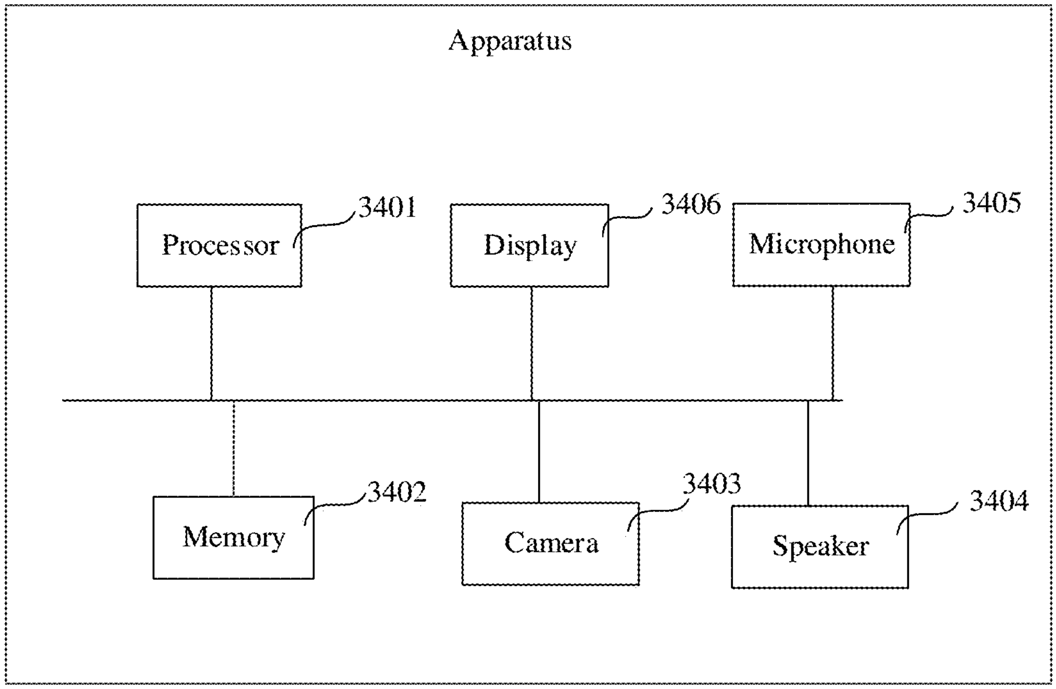
FIG. 34 is a schematic diagram of a structure of an apparatus according to an embodiment of this application.

In some embodiments, an embodiment of this application further provides an apparatus. As shown in FIG. 34, the apparatus includes one or more processors 3401 and one or more memories 3402. The memory 3402 stores one or more computer programs. When the one or more computer programs are executed by the processor 3401, the apparatus is enabled to perform the video recording method provided in embodiments of this application.

Further, in some embodiments, the apparatus may further include a camera 3403, a speaker 3404, and a microphone 3405.

In some other embodiments, the apparatus may further include a display 3406, configured to display a graphical user interface, for example, an interface of a media application.

A connection medium between the processor 3401, the memory 3402, the camera 3403, the speaker 3404, the microphone 3405, and the display 3406 is not limited in this embodiment of this application. For example, in this embodiment of this application, the processor 3401, the memory 3402, the camera 3403, the speaker 3404, the microphone 3405, and the display 3406 may be connected by using a bus. The bus may be classified into an address bus, a data bus, a control bus, and the like.

Figure 35:
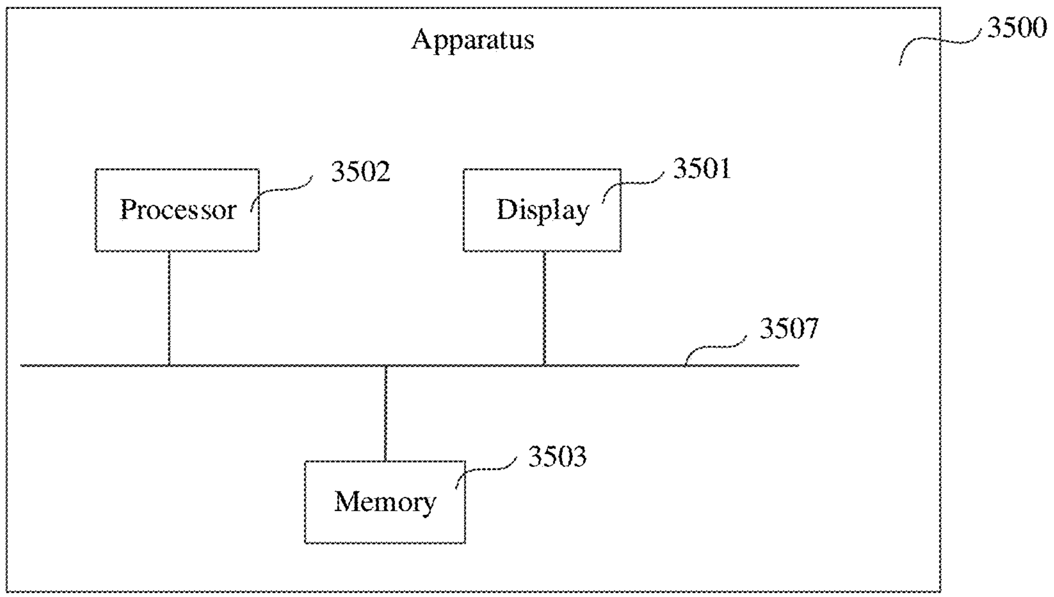
FIG. 35 is a schematic diagram of a structure of another apparatus according to an embodiment of this application.

In some other embodiments, as shown in FIG. 35, some other embodiments of this application disclose an apparatus. The apparatus may be an electronic device with an audio function. As shown in FIG. 35, the apparatus 3500 includes a display 3501; one or more processors 3502; one or more memories 3503; one or more sensors 3504 (not shown in the figure); a plurality of applications 3505 (not shown in the figure); and one or more computer programs 3506 (not shown in the figure). The foregoing components may be connected by using one or more communication buses 3507.

The display 3501 is configured to display a display interface of an application in the electronic device, or display prompt information. The memory 3503 stores one or more computer programs, and the one or more computer programs include instructions. The processor 3502 invokes the instructions stored in the memory 3503, so that the apparatus 3500 can perform the audio recording method, the audio playing method, and the volume adjustment method in the foregoing embodiments.

Figure 36:
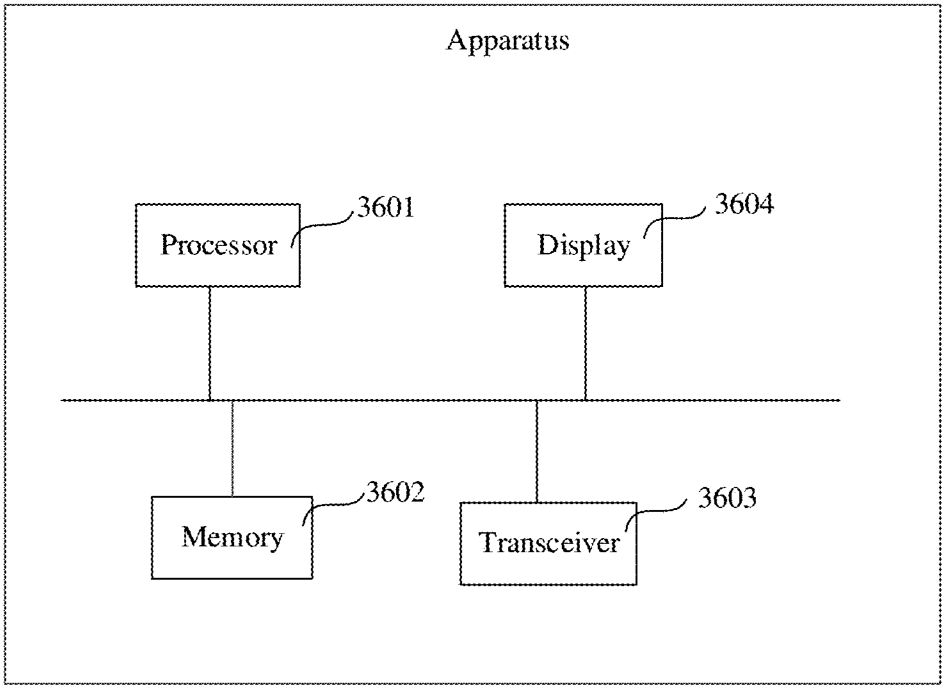
FIG. 36 is a schematic diagram of a structure of another apparatus according to an embodiment of this application.

In some other embodiments, an embodiment of this application further provides an apparatus. As shown in FIG. 36, the apparatus includes one or more processors 3601 and one or more memories 3602. The memory 3602 stores one or more computer programs. When the one or more computer programs are executed by the processor 3601, the apparatus is enabled to perform the audio effect processing method provided in embodiments of this application. Further, in some embodiments, the apparatus may further include a transceiver 3603, configured to communicate with another device by using a transmission medium, so that the apparatus can communicate with another device. For example, the transceiver 3603 may be a communication interface, a circuit, a bus, a module, or the like, and the another device may be a terminal, a server, or the like. For example, the transceiver 3603 may be configured to send audio data and the like.

In some other embodiments, the apparatus may further include a display 3604, configured to display a graphical user interface, for example, an interface of a media application.

Figure 37:
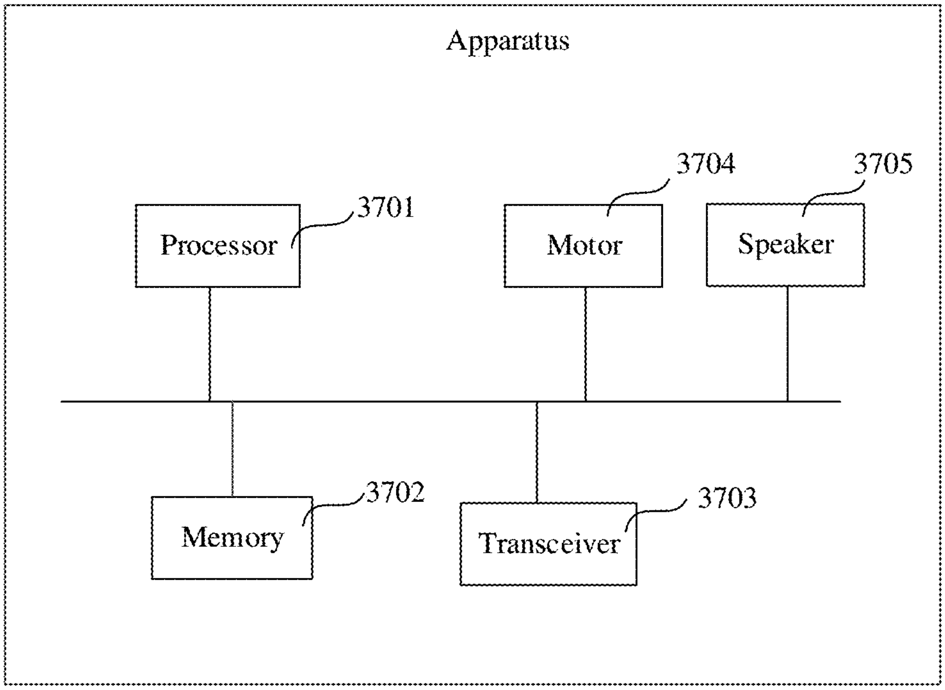
FIG. 37 is a schematic diagram of a structure of another apparatus according to an embodiment of this application.

In some other embodiments, an embodiment of this application further provides an apparatus. As shown in FIG. 37, the apparatus includes one or more processors 3701, one or more memories 3702, a transceiver 3703, a motor 3704, and a speaker 3705. The memory 3702 stores one or more computer programs. When the one or more computer programs are executed by the processor 3701, the apparatus is enabled to perform the audio and vibration synchronized playing method provided in embodiments of this application.

The transceiver 3703 is configured to communicate with another device by using a transmission medium, so that the apparatus can communicate with another device. For example, the transceiver 3703 may be a communication interface, a circuit, a bus, a module, or the like, and the another device may be a terminal, a server, or the like. For example, the transceiver 3703 may be configured to send audio data, vibration data, and the like.

A connection medium between the processor, the memory, the transceiver, and the display is not limited in this embodiment of this application. For example, in this embodiment of this application, the processor, the memory, the transceiver, and the display may be connected by using a bus. The bus may be classified into an address bus, a data bus, a control bus, and the like.

In addition, the foregoing apparatus provided in this embodiment of this application may further include a display, a touch sensor, and the like. This is not limited.

It should be noted that the foregoing apparatus provided in this embodiment of this application may be an electronic device, or the apparatus includes a chip system, a chip, an integrated circuit, or the like.

In this embodiment of this application, the display includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diodes, QLED), or the like.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware and software modules in the processor.

In embodiments of this application, the memory may be a non-volatile memory, such as a hard disk drive (hard disk drive, HDD) or a solid-state drive (solid-state drive, SSD), or may be a volatile memory (volatile memory), such as a random access memory (random access memory, RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store program instructions and/or data.

As used in the foregoing embodiments, according to the context, the term "when" or "after" may be interpreted as "if", "after", "in response to determining", or "in response to detecting". Similarly, according to the context, the phrase "when determining" or "if detecting (a stated condition or event)" may be interpreted as "if determining", "in response to determining", "when detecting (a stated condition or event)", or "in response to detecting (a stated condition or event)".

All or some of the foregoing embodiments may be implemented by software, hardware, firmware, or any combination thereof. When software is used to implement the foregoing embodiments, all or some of the foregoing embodiments may be implemented in a form of a computer program product. The computer program product includes one or more computer instructions. When the computer program instructions are loaded and executed on a computer, the procedures or functions according to embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semi-conductor medium (for example, a solid-state disk Solid State Disk (SSD)), or the like. In a case in which no conflict occurs, the solutions in the foregoing embodiments may be combined for use.

It should be noted that a part of this patent application document includes content protected by copyright. Except for making copies of patent documents of the Patent Office or recorded content of patent documents, the copyright owner reserves the copyright.

What is claimed is:

1. A method, comprising:

playing, by an electronic device by using a first application, audio corresponding to a first media file;

displaying, by the electronic device, a video recording interface of a second application, wherein the video recording interface comprises an image preview box, a background music setting option, and a virtual button, the virtual button is configured to be used to control to start or stop video recording, and the image preview box is configured to be used to preview an image captured by a camera;

in response to an operation on the background music setting option, setting, by the electronic device, background music as audio corresponding to a second audio file;

in response to a first operation on the virtual button, starting, by the electronic device, video recording, and processing the second audio file to obtain audio data of the second audio file, wherein the audio corresponding to the first media file is played during the video recording; and in response to a second operation on the virtual button, ending, by the electronic device, video recording, and generating a video file, wherein the video file comprises the audio data of the second audio file and image data of the image captured by the camera, and the video file does not comprise audio data of the first media file.

2. The method according to claim 1, wherein the first media file corresponds to an identifier of the first application, the second audio file corresponds to an identifier of the second application, and the method further comprises:

in response to the first operation on the virtual button, obtaining, by the electronic device, the audio data of the second audio file based on the identifier of the second application, and performing synthesis processing based on the audio data of the second audio file and the image data of the image captured by the camera.

3. The method according to claim 2, further comprising:

capturing, by the electronic device, a sound using a microphone in response to the first operation on the virtual button; and wherein performing, by the electronic device, synthesis processing based on the audio data of the second audio file and the image data of the image captured by the camera comprises:

performing, by the electronic device, synthesis processing based on the audio data of the second audio file, the image data of the image captured by the camera, and audio data of the sound captured by the microphone.

4. The method according to claim 1, wherein when a shooting mute function is in an enabled mode, the electronic device does not capture any sound using a microphone.

5. The method according to claim 1, wherein processing, by the electronic device, the second audio file to obtain the audio data of the second audio file comprises:

parsing, by the electronic device, the second audio file, and performing audio effect processing on audio data obtained by parsing the second audio file, to obtain the audio data of the second audio file.

6. The method according to claim 1, further comprising:

playing, by the electronic device, the audio data of the second audio file.

7. The method according to claim 2, further comprising:

playing, by the electronic device, the audio data of the second audio file.

8. An electronic device, comprising:

at least one processor; and a memory; and wherein the memory stores instructions that are executable by the at least one processor, and the at least one processor executing the instructions stored in the memory enables the electronic device to perform operations comprising:

playing, by using a first application, audio corresponding to a first media file;

displaying a video recording interface of a second application, wherein the video recording interface comprises an image preview box, a background music setting option, and a virtual button, the virtual button is configured to be used to control to start or stop video recording, and the image preview box is configured to be used to preview an image captured by a camera;

in response to an operation on the background music setting option, setting background music as audio corresponding to a second audio file;

in response to a first operation on the virtual button, starting video recording, and processing the second audio file to obtain audio data of the second audio file, wherein the audio corresponding to the first media file is played during the video recording; and in response to a second operation on the virtual button, ending video recording, and generating a video file, wherein the video file comprises the audio data of the second audio file and image data of the image captured by the camera, but does not comprise any audio data of the first media file.

9. The electronic device according to claim 8, wherein:

the first media file corresponds to an identifier of the first application, the second audio file corresponds to an identifier of the second application, and the operations further comprise:

in response to the first operation on the virtual button, obtaining the audio data of the second audio file based on the identifier of the second application, and performing synthesis processing based on the audio data of the second audio file and the image data of the image captured by the camera.

10. The electronic device according to claim 9, wherein the operations further comprise:

capturing a sound using a microphone in response to the first operation on the virtual button; and wherein performing synthesis processing based on the audio data of the second audio file and the image data of the image captured by the camera comprises:

performing synthesis processing based on the audio data of the second audio file, the image data of the image captured by the camera, and audio data of the sound captured by the microphone.

11. The electronic device according to claim 8, wherein when a shooting mute function is in an enabled mode, the electronic device does not capture a sound using a microphone.

12. The electronic device according to claim 8, wherein processing the second audio file to obtain the audio data of the second audio file comprises:

parsing the second audio file, and performing audio effect processing on audio data obtained by parsing the second audio file, to obtain the audio data of the second audio file.

13. The electronic device according to claim 8, wherein the operations further comprise:

playing the audio data of the second audio file.

14. The electronic device according to claim 9, wherein the operations further comprise:

playing the audio data of the second audio file.

15. A non-transitory computer-readable storage medium, comprising a computer program, wherein when the computer program is run on an electronic device, the electronic device is enabled to perform operations comprising:

playing, by using a first application, audio corresponding to a first media file;

displaying a video recording interface of a second application, wherein the video recording interface comprises an image preview box, a background music setting option, and a virtual button, the virtual button is configured to be used to control to start or stop video recording, and the image preview box is configured to be used to preview an image captured by a camera;

in response to an operation on the background music setting option, setting background music as audio corresponding to a second audio file;

in response to a first operation on the virtual button, starting video recording, and processing the second audio file to obtain audio data of the second audio file, wherein the audio corresponding to the first media file is played during the video recording; and in response to a second operation on the virtual button, ending video recording, and generating a video file, wherein the video file comprises the audio data of the second audio file and image data of the image captured by the camera, but does not comprise any audio data of the first media file.

16. The non-transitory computer-readable storage medium according to claim 15, wherein the first media file corresponds to an identifier of the first application, the second audio file corresponds to an identifier of the second application, and the operations further comprise:

in response to the first operation on the virtual button, obtaining the audio data of the second audio file based on the identifier of the second application, and performing synthesis processing based on the audio data of the second audio file and the image data of the image captured by the camera.

17. The non-transitory computer-readable storage medium according to claim 16, wherein the operations further comprise:

capturing a sound using a microphone in response to the first operation on the virtual button; and wherein performing synthesis processing based on the audio data of the second audio file and the image data of the image captured by the camera comprises:

performing synthesis processing based on the audio data of the second audio file, the image data of the image captured by the camera, and audio data of the sound captured by the microphone.

18. The non-transitory computer-readable storage medium according to claim 15, wherein when a shooting mute function is in an enabled mode, the electronic device does not capture a sound by using a microphone.

19. The non-transitory computer-readable storage medium according to claim 15, wherein processing the second audio file to obtain the audio data of the second audio file comprises:

parsing the second audio file, and performing audio effect processing on audio data obtained by parsing the second audio file, to obtain the audio data of the second audio file.

20. The non-transitory computer-readable storage medium according to claim 15, wherein the operations further comprise:

playing the audio data of the second audio file.

* * * * *